US011175368B1

(12) United States Patent
Erad et al.

(10) Patent No.: US 11,175,368 B1
(45) Date of Patent: Nov. 16, 2021

(54) SYSTEM AND METHOD FOR DETERMINING THE RELATIVE DIRECTION OF AN RF TRANSMITTER

(71) Applicant: Hisep Technology Ltd., Yavne (IL)

(72) Inventors: Yariv Erad, Kidron (IL); Gad Vered, Beer Yaacov (IL); Menachem Erad, Ashdod (IL); Uri Vered, Rishon Lezion (IL)

(73) Assignee: HISEP TECHNOLOGY LTD., Yavne (IL)

( * ) Notice: Subject to any disclaimer, the term of this patent is extended or adjusted under 35 U.S.C. 154(b) by 0 days.

(21) Appl. No.: 17/342,649

(22) Filed: Jun. 9, 2021

Related U.S. Application Data

(63) Continuation-in-part of application No. 17/103,383, filed on Nov. 24, 2020, which is a continuation-in-part of application No. 16/883,418, filed on May 26, 2020, now Pat. No. 10,884,093, which is a continuation of application No. 16/045,306, filed on Jul. 25, 2018, now Pat. No. 10,705,175, which is a continuation of application No. PCT/IL2017/050001, filed on Jan. 1, 2017.

(60) Provisional application No. 63/152,854, filed on Feb. 24, 2021, provisional application No. 62/286,987, filed on Jan. 26, 2016.

(51) Int. Cl.
 *G01S 3/28* (2006.01)
 *G01S 5/02* (2010.01)
 *G01S 3/04* (2006.01)

(52) U.S. Cl.
 CPC ............... *G01S 3/28* (2013.01); *G01S 3/043* (2013.01); *G01S 5/02* (2013.01)

(58) Field of Classification Search
 CPC ............... G01S 3/28; G01S 3/043; G01S 5/02
 See application file for complete search history.

(56) References Cited

U.S. PATENT DOCUMENTS

| 2011/0208036 | A1* | 8/2011 | Axelrod | .................... | C12Q 1/54 |
| | | | | | 600/407 |
| 2016/0174842 | A1* | 6/2016 | Hyde | ..................... | H01Q 1/273 |
| | | | | | 342/52 |

\* cited by examiner

*Primary Examiner* — Marc Anthony Armand
(74) *Attorney, Agent, or Firm* — The Roy Gross Law Firm, LLC; Roy Gross

(57) ABSTRACT

The subject matter discloses a method to determine a relative direction of a target RF transmitter, performed by a direction finding (DF) system comprising at least a pair of antennas having an electromagnetic-absorbing material between them, comprising conducting wireless communication between the target RF transmitter and each one of the antennas of the DF system, measuring the time of flight (TOF) of the target RF transmitter received at each antenna, calculating the difference between the TOFs measured at each one of the antennas in the pair, and determining a relative direction of the target RF transmitter based on the TOF required to reach each of the antennas.

11 Claims, 57 Drawing Sheets

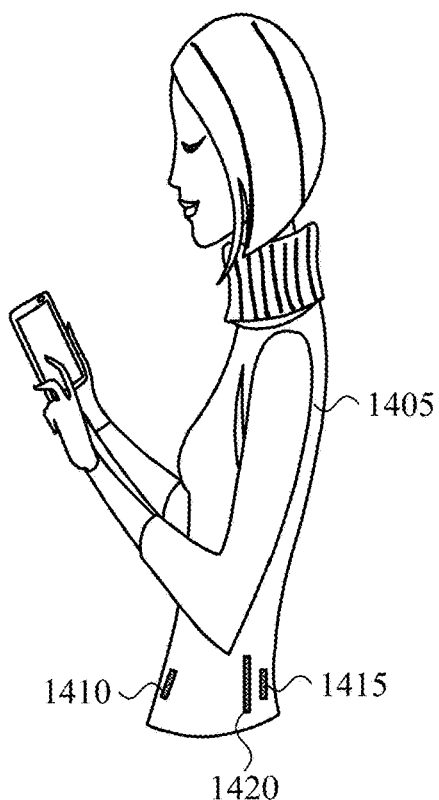
Fig. 14A
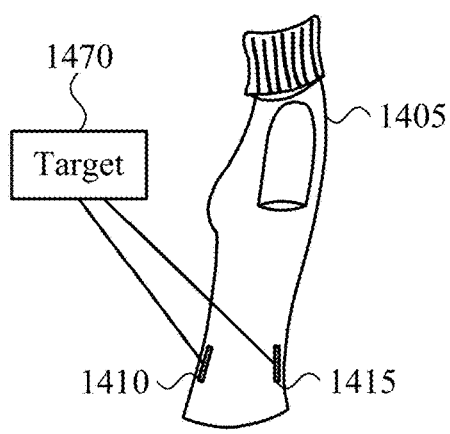 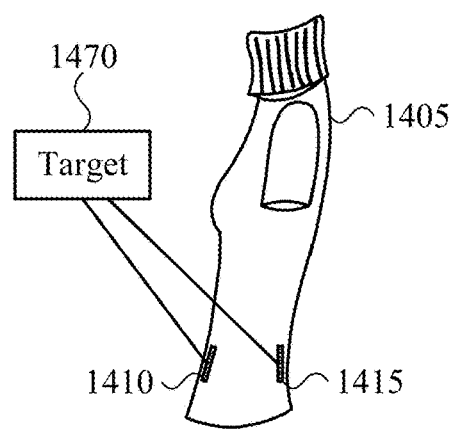
Fig. 14B  Fig. 14C

TABLE VIII: Total travel time for different human types

| Frequency | Total travel time in ns | | | | | |
| --- | --- | --- | --- | --- | --- | --- |
| | Type1 | | Type2 | | Type3 | |
| | Min | Max | Min | Max | Min | Max |
| 403.5 MHz | 0.782 | 1.269 | 0.942 | 1.349 | 1.036 | 1.711 |
| 916.5 MHz | 0.699 | 1.166 | 0.858 | 1.246 | 0.952 | 1.608 |
| 2.45 GHz | 0.661 | 1.124 | 0.820 | 1.204 | 0.915 | 1.566 |

3200

3220

SYSTEM AND METHOD FOR DETERMINING THE RELATIVE DIRECTION OF AN RF TRANSMITTER

CROSS REFERENCE TO RELATED APPLICATIONS

This application is a Continuation-in-Part of U.S. application Ser. No. 17/103,383 filed Nov. 24, 2021, which is a Continuation-in-Part of U.S. application Ser. No. 16/883,418 filed May 26, 2020 (now issued as U.S. Pat. No. 10,884,093), which is a Continuation of U.S. application Ser. No. 16/045,306 filed on Jul. 25, 2018 (now issued as U.S. Pat. No. 10,705,175), which is a Continuation of PCT/IL2017/050001 having International filing date of Jan. 1, 2017, which claims the benefit of priority of U.S. Provisional Application No. 62/286,987 filed on Jan. 26, 2016.

This application also claims the benefit of priority of U.S. Provisional Application No. 63/152,854 filed Feb. 24, 2021.

The contents of the above applications are all incorporated by reference as if fully set forth herein in their entirety.

FIELD OF THE INVENTION

The present invention relates to the use of wave absorbing material in general, and the use of electromagnetic-absorbing material in particular to create a Direction-Finding (DF) system and method.

BACKGROUND OF THE INVENTION

In recent years there is a growing usage of wireless connectivity in almost every device. The growing commercial adoption of the "Internet of Things" (IoT) leads to a situation which multiple device and object types are designed to be coupled with wireless transmitters or wireless sensor nodes in order to enable internet communication on one hand, and direct connectivity to other devices or objects on the other hand. In some cases, the objects comprising the wireless transmitters or the wireless sensor nodes can be electronic devices, such as a mobile telephone, a tablet personal computer, and the like. In some other cases, the objects comprising the wireless transmitters or the wireless sensor nodes may be wearables, clothing and apparel items, furniture's, decorative objects, and the like. Communication between objects and devices utilizing wireless communication has a number of usages. However, in some cases the direction/or the physical location of the objects is required. For example, determining the relative direction of a device measuring environmental conditions such as wind velocity or temperature has a considerable importance to the person who receives the information. Furthermore, in case the wireless sensor nodes transmitting the information are associated with a device carried by a person, the relative direction of the device transmitting the information changes constantly. In such cases, real time direction detection is required in order to determine the current relative direction of the device transmitting the information.

Prior art radio transmission and reception systems relate to the human body in what can be categorized as two contrary approaches: whereas one approach relates to the body as an obstacle that needs to be overcome, the other approach relates to it as an antenna per-se. The common factor of many DF techniques is that within the antennas array of the direction-finding device (DF), it is required that all the antennas will have the same free space towards the target, which direction is desired. It does not mean that there always must be a free line-of-sight between the DF and the target—it means that within the antenna array, there should be no absorbing material between the antennas, so they will be able to "see" the same, and based on the pattern radiations to determine the direction of the signal.

There are many methods known for a Radio Frequency (RF) detector to find the direction of an RF source (Target), mainly using wave analysis methods. These methods can be generally categorized as Direction-Finding (DF) techniques and Monopulse techniques.

DF techniques can be categorized in groups—those which find the target's direction based on received signal amplitude, based on received signal phase, based on received signal timing etc.

For the DF techniques described in general hereunder, the signal does not have to be modulated or bear any kind of information, and may be CW (Continuous Wave) or pulse.

Amplitude-based DF techniques use one or more antennas. An example of a single antenna DF is a rotational directional antenna. The direction, from which the Received Signal Strength (RSS) or Received Signal Strength Indication (RSSI) is the highest, is the expected direction of the target.

Amplitude DF which uses several antennas measure the RSS/RSSI at each antenna and calculates the AOA (Angle of Arrival) of the signal using the amplitude differences.

Typical examples of amplitude DF that use several antennas are amplitude monopulse, Adcock, etc. Additional techniques assess the distance of the target, based on the signal strength, and by triangulating several measurements calculate the location of the target.

Phase-based DF techniques use two or more antennas and measure the phase difference of the arrival of a signal in the antennas and calculate from these phase differences the AOA of the signal.

This group includes for example interferometer DF, correlative interferometer DF, etc.

Time-based DF techniques are best known as TOA (Time of Arrival) kind of DF. They use two or more antennas and measure the time difference of the arrival of a signal in the antennas and calculate from these differences the signal's AOA. This group includes for example short and long base TOA, DTOA (Differential Time of Arrival) etc.

Monopulse DF techniques mainly used in ELINT (Electronic Intelligence) systems and radars, to find the direction from which a pulsed radar signal or echo is received. The signal is received in two or more directional antennas. The signals in the antennas, usually highly directional antennas, are added in phase to compose a Sum or S signal and added in opposite phase to compose a Difference or D signal, in one or two dimensions, azimuth, elevation or both. Based on the S and D signal strengths, the direction of the target is found.

U.S. Pat. No. 7,323,996 titled "RFID reader having antenna with directional attenuation panels for determining RFID tag location" describes an antenna structure capable of determining the direction of a radiofrequency identification (RFID) tag, which includes a wide-angle antenna disposed within an attenuator that has regions of low attenuation. The attenuator may include a metal plate with holes. In this case, the antenna only detects RFID tags that are aligned with a hole, and hence the direction of the RFID tag is detected.

SUMMARY OF THE INVENTION

The present invention discloses a direction-finding system and method to determine the relative direction to an RF transmitter by using at least one pair of antennas, at least one of the antennas may be obstructed, or partly obstructed, by an electromagnetic-absorbing material. The RF transmitter may be a wireless device such as a wireless sensor node, a wireless transceiver, RF transmitter, an environmental sensor transmitting information via RF signals, and the like. Such an RF transmitter communicating with the direction-finding system is also defined as a target. The direction-finding system, also defined as a DF system, is designed to conduct a "relative direction determination" process, in order to determine the relative direction from the DF system to the target. In the "relative direction determination" process, the DF system can compare the strength of an absorbed RF signal received the antennas with the strength of a non-absorbed RF signal received by another part of the antennas. The RF signal absorption may result from the electromagnetic-absorbing material which may be associated with the DF system and obstruct at least some of the antennas from receiving the full strength of the RF signal.

At the "relative direction determination" process, the DF system is configured to group the antennas of the DF into antenna pairs having an electromagnetic-absorbing material between the antennas in the pair. The antennas are placed in such manner that the antennas arrangement around the absorbing material is known to the DF system, and a virtual heading for the antenna array is defined. Then the DF system measures the signal strength received by each one of the antennas in the antenna pairs from the direct wireless communication between the DF and a transmitting target, compares the measured signal strength at each antenna, and based on this comparison determines a relative direction from the DF system to the target. A relative direction determination for each such pair is done by associating the direction of the target with the antenna member in the pair having the higher signal strength measured.

Signal transmission disclosed in the subject matter can be performed via a direct wireless communication such as (but not limited to), Bluetooth, Infrared, RFID, NFC, and the like. In some cases, such transmission may be via direct wireless communication implementation of telecommunications network technology such as, Wi-Fi, WLAN, Wi-Max, telephone networks, and the like.

In some cases, an antenna in the DF system can be grouped into more than one antenna pairs. For example, the DF system can group one antenna with a second antenna into a second antenna pair. The DF system can then determine a relative direction to a target for each such pair—and compare or overlap these directions. The DF system may have several pairs aligned in such manner that they cover the same directions—for example, having two pairs of antennas (four antennas in the array) aligned in parallel to each other, having absorbing material between the antennas in each pair. For that matter, the DF system can group any two antennas in its array into pairs and perform the relative direction determination on those two antennas, as long as there is absorbing material between the antennas in the pair.

In some cases, the DF system may determine the relative directions of more than one target. For example, The DF system may have one target transmitting from one direction, and another target transmitting from another direction. The DF system may determine the relative directions individually for each target.

In some cases, the determined relative direction of the target is aligned with an imaginary/virtual line between the two antenna members of the selected antenna pair. The DF system is also designed to store the absorption factor of the electromagnetic-absorbing material. For example, in a possible use case an antenna pair comprising two antennas, one in the front of the human body and one in the back of the human body. The DF system may store the signal strength absorbed by the body as an absorption factor. The absorption factor may be calibrated, for example measured before and after positioning the DF system around the electromagnetic-absorbing material and calculate the difference between the measurements.

The DF system may comprise a central unit and the plurality of antennas that communicate with the target. The plurality of antennas sends the measured signal strength received from the target to the central unit which determines the relative direction of the target according to the values received from the plurality of antennas.

In some embodiments of the present invention the electromagnetic-absorbing material which the DF system is associated with may be a living material such as a human body. For example, a number of antennas of the DF system can be embedded in a shirt worn by a person. In that case, the electromagnetic-absorbing material may be the body of the person wearing the shirt. In some cases, the electromagnetic-absorbing material may be parts or organs of the human body or limbs, such as arms, legs, and the like. In some other cases, the electromagnetic-absorbing material may comprise synthetic material, such as fabric, plastic, glass, and the like.

The DF system may also include or transmit the DF system findings to an interface device. Such an interface may be a screen, a mobile device, a computer, a tablet personal computer, and the like.

As opposed to Monopulse techniques, which use high-gain narrow beam-width and hence large antennas, the methods of the subject matter can use omnidirectional. The advantage is that very small antennas can be used, as small as being implemented in a personal electronic device such as a cellular telephone device, PDA, digital camera, a remote-control device, as well as in wearable's, clothes, etc.

As opposed to prior-art DF techniques that need expensive receivers, (usually one receiving channel per each antenna) and operate on the IF (Intermediate Frequency) of the received signal, the methods of the subject matter operate directly on the RF (Radio Frequency), uses a small quantity of electronic non-expensive devices and is therefore much smaller and cheaper.

As opposed to prior-art DF techniques, HISEP's techniques use existence of wireless communication vs. loss of wireless communication rather than signal strength. The methods of the subject matter are generic and can be used for any wireless communication standard or protocol, including those devices that do not support RSSI.

It is another object of the subject matter to disclose a method to determine a relative direction of a target device, performed by a direction finding (DF) system comprising a central unit having a processing module and at least two antennas having an electromagnetic time delaying material between the at least two antennas, the method comprising
  a) sending wireless communication from the target device and receiving said wireless communication at each antenna of the at least two antennas of the DF system;
  b) for each antenna of the at least two antennas, measuring at the DF system the time of flight (TOF) duration of the wireless communication sent from the Target to the DF system;
  c) having the DF system comparing the measured TOF duration measured for each antenna of the at least two antennas;

d) determining a relative direction of the target device relative to the DF system based on the difference of TOF duration required for the signal to travel between the target device and each antenna of the at least two antennas.

In some cases, the DF system comprises more than two antennas, wherein at least two antennas are assigned to pairs of antennas having electromagnetic time delaying material between the antennas in the pair. In some cases, the relative direction of said target wireless transmitter is determined as a combination of the directions determined by each of the pairs of antennas In some cases, the electromagnetic time delaying material is a living matter. In some cases, the electromagnetic time delaying material is a synthetic material. In some cases, the electromagnetic time delaying material comprises at least two distinct pieces that are placed between the at least two antennas.

In some cases, the method further comprising obtaining an arrangement of the multiple antennas around the electromagnetic time delaying material and utilizing the arrangement when determining a relative direction of the target wireless transmitter. In some cases, the determining the relative direction of the target wireless transmitter relative to the multiple wireless is performed by the target device.

In some cases, the DF system calculate the distance between the Target to each antenna of the at least two antennas, based on the measured TOF of the wireless communication sent from the Target and received at the DF system, and comparing said calculated distance for each antenna.

In some cases, the method further comprising storing at the DF system pre-measured TOF delay caused by the electromagnetic time delaying material between the at least two antennas, and comparing the pre-measured TOF delay to the difference between the TOFs measured when the wireless communication was sent from the target device and received at each antenna of the at least two antennas. In some cases, the DF system is integrated in a speaker. In some cases, the DF system is integrated in a smartphone.

It is another object of the subject matter to disclose a method to determine a relative direction of a target device, performed by a direction finding (DF) system comprising a central unit having a processing module and at least two antennas having an electromagnetic time delaying material between the at least two antennas, the method comprising;
a) sending wireless communication to the target device from each antenna of the at least two antennas of the DF system and receiving back wireless communication at the target device at each antenna of the at least two antennas;
b) measuring at the DF system the time of flight (TOF) duration of the wireless communication between each antenna of the at least two antennas of the DF system and the target device;
c) having the DF system comparing the measured TOF duration measured for each antenna of the at least two antennas;
a. determining a relative direction of the target device relative to the DF system based on the TOF duration required for the wireless communication to travel between the target device and each antenna of the at least two antennas.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 14A-14C demonstrates a method to measure of measuring signal strength in antennas with and without an absorption factor, according to exemplary embodiments of the present invention;

DETAILED DESCRIPTION OF THE INVENTION

Figure 1A:
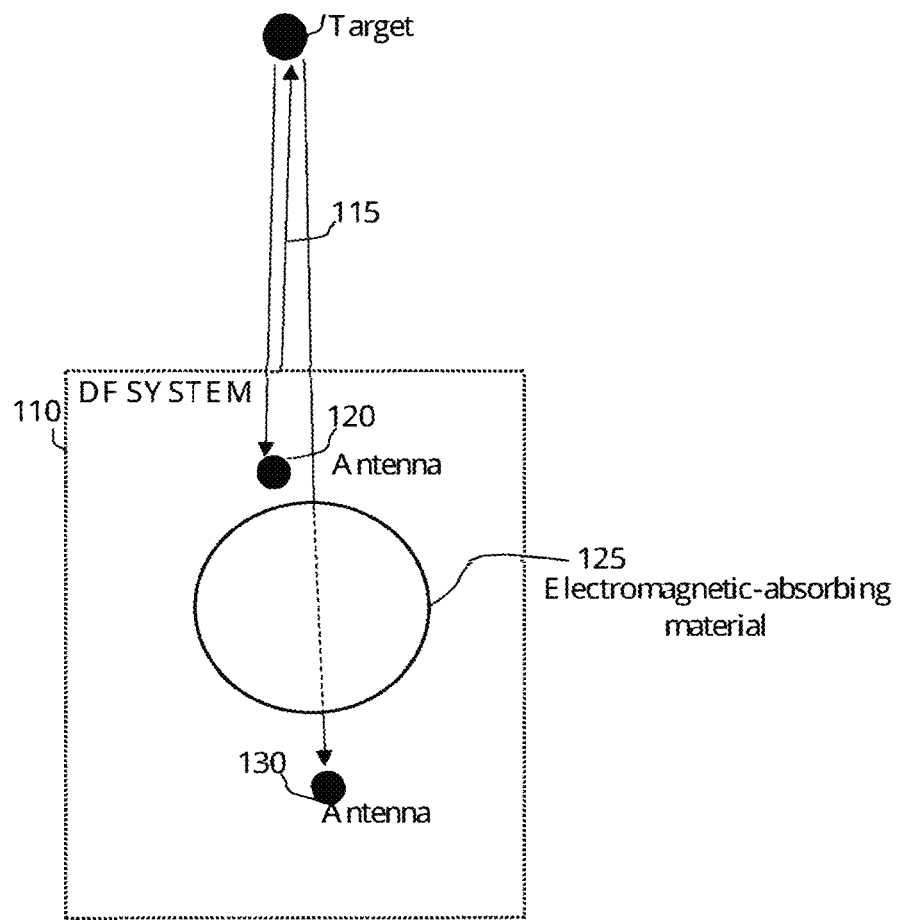
FIG. 1A shows a DF system for measuring a relative direction of a target, according to exemplary embodiment of the present invention.

The present invention discloses a DF system and method to determine the relative direction of a target by utilizing electromagnetic-absorbing material and at least two antennas. The DF system comprises at least a pair of antennas designed to receive RF transmissions, a computerized unit configured to collect the RF signals received by the antennas and a memory unit to store the information received during the "relative direction determination" process. Such information may be directions of the targets, the number of targets, the absorption factor of the electromagnetic-absorbing material, the heading of the DF system, the alignment of the antennas versus each other and versus the absorbing material, and optionally additional information which may be related to the "relative direction determination" process. The DF system is designed to utilize a power source from an internal source such as a battery. In some cases, the DF system may be connected to an external power source such as the electric grid.

The electromagnetic-absorbing material associated with the DF system may be surrounded, in some cases, by the antennas, or in some other cases, the antennas may be scattered in the close vicinity of the electromagnetic-absorbing material. For example, in case of a DF system comprising four (4) antennas, the antennas may be scattered around, surrounding an electromagnetic-absorbing material which can absorb the RF signal and attenuate the transmission strength received from a target. The signal strength measurement performed by the DF system, may utilize any method to measure the received signal strength in a wireless environment, such as RSSI or any other signal strength measuring method known to a person who has ordinary skills in the art.

The DF system is also designed to conduct the "relative direction determination" process by comparing the results generated from more than one antenna pair and to determine the relative direction accordingly. The DF system is also designed to conduct the "relative direction determination" process by integrating the results generated from more than one antenna pair and to determine the relative direction accordingly. The DF system may determine that the relative direction is an arithmetic manipulation on the two candidate antennas, for example the mean direction of the two antenna members, of the selected antenna pairs.

In some cases, the antennas are embedded in a person's cloth—such as (but not limited to) a shirt, and the body of the person wearing the shirt functions as the electromagnetic-absorbing material. The DF system may have a first antenna pair having one antenna placed in the front of the shirt (the person's chest area) and one antenna placed in the back of the shirt, and a second antenna pair with antennas placed, one in the right-side area of the shirt and one in the left side of the shirt. The DF system may select both antenna pairs and determine that the target is located in the front and left the person, according to the measured differences in signal strength. In yet another example, the DF system may have a first antenna pair having one antenna placed in the front of the shirt (the person's chest area) and one antenna placed in the back of the shirt, and a second antenna pair with antennas placed, one on the shoulder part area of the shirt and one in the armpit part of the shirt. The DF system may select both antenna pairs and determine that the target is located in the front and above the person, according to the measured differences in signal strength.

The term "Direction finder or DF or Looker" refers to a device and/or object and/or thing having Wireless Communication means (such as, but not limited to, TOT) with a one or more antenna, or with at least one antenna array, which is used to determine the relative direction to a Target as defined herein under. Alternatively, the device is used to find whether one or more Targets are located within a desired direction from the finder. Said DF can be a stand-alone device or integrated into another electronic device, either via software or hardware or a combination of both. A Looker device can also function as a Target. Said Looker may include a compass component and/or Accelerometer and/or Gyro and/or Tilt sensors and/or an AM.

The term "Target" refers to a device and/or object and/or thing having Wireless Communication means (such as, but not limited to, TOT), or an RF communication source, which comprises RF transmitter and/or receiver and/or repeater or transponder and/or tag, which communicates wirelessly directly (i.e., not via relays) with the DF, and which also comprises an Antenna Module. A Target device can also function as a Looker. Said Target may include a compass component and/or Accelerometer and/or Gyro and/or Tilt sensors.

The term "Heading" refers to a virtual pre-determined direction, in relation to a physical element in the Target or Looker device, that will be regarded as the "zero-point heading" of the AM and will be used to illustrate the "Heading" Target or looker device. Said Heading can correlate with a device's display shape or position.

The term "Tilt sensor" refers to a device and/or component that can measure the tilting in often two axes of a reference plane in two axes, in portable electronic devices—such as, but not limited to, cellular phone, video game controllers/console, digital camera, GPS device, media player, laptop computer, tablet computer, wireless remote control, PDA—to detect the position of the device or provide for game input.

The term "Absorbing Material"—shall refer to the weakening and/or reduction in strength and/or attenuation of a wireless signal/wave—all of it or part of it—that occurs as it passes through objects and/or lossy medium and/or materials with dielectric loss properties (such as, but not limited to, the human body and/or materials with absorbing properties). Said absorbing material may have pre-defined properties corresponding with the wave type and/or frequency it is aimed to delay. Said absorbing material can be natural (for example—but not limited to, a human body part) or artificial, can be synthetic or machine-made, can be composed of different layers or different materials;

The term "electromagnetic time delaying material"—shall refer to materials that can increase the length of time taken for a RF wave and/or sound wave and/or light wave to travel from a Target to a Looker via Wireless Communication. Said electromagnetic time delaying Material may have pre-defined properties corresponding with the wave type and/or frequency it is aimed to delay. Said electromagnetic time delaying material can be natural (for example—but not limited to, a human body part, wood, metals, vegetation, fluids, gases, animals) or artificial, can be synthetic or machine-made (such as, but not limited to, structures, chemical composites, ceramics, advanced materials, etc . . . ), can be composed of different layers or different materials. Said electromagnetic time delaying materials may include means to enable controlled change of the delay time. Said Delaying Material can be an Absorbing Material. The electromagnetic time delaying material may be defined as Propagation delay materials or Time of flight delaying materials or wave velocity decreasing materials or Delaying Materials or DM.

The terms "Time-of-Flight" or "TOF" or "TOA" refer to the measurement of time duration taken by an object, particle or wave (be it acoustic, electromagnetic, light etc.) to wirelessly travel a distance through a medium.

The terms "time of arrival" or "TOA" these terms shall refer to the absolute time of arrival at a Looker or to the measured time difference between departing from a Target and arriving at the Looker. The distance/path length between a Looker and a Target can be directly calculated from the time of arrival as a Wireless Communication wave travels with a known velocity.

The terms "Round Trip Time" or "RTT" or "TWR"—shall refer to the length of time it takes for a signal to be wirelessly sent plus the length of time it takes for an acknowledgement of that signal to be received, for example received at the device that sent the signal. This time includes propagation time for the paths between the Target and a Looker. This information can then be used to measure velocity or path length. TOA or TOF can be applied to calculate the RTT and distance.

The terms "Line-of-sight" or "LOS"—shall refer to the characteristic of electromagnetic radiation propagation (including RF and light) or acoustic propagation which means waves travel in a direct path from a Target to a Looker.

The terms "None-Line-of-Sight" or "near-LOS", or "NLOS"—shall refer to events in which the rays or waves may be delayed due to the presence of an electromagnetic time Delaying Material in the direct path (in whole or in part of the path) of the Wireless Communication between the Target and the Looker.

The term "Wireless Communication"—shall refer to the transfer of information and/or data (of all kinds, such as—but not limited to—voice, image, video, laser, analog or digital and/or packets (formatted blocks of data) and/or communication acknowledgment/no-acknowledgment and/or voice over long or short distances without the use of electrical conductors or "wires" but via Radio waves and/or light waves and/or sound waves, at any given frequency.

The terms "Wireless Communication Protocol" and/or "Standard"—shall refer to any protocol and/or standard used to conduct Radio and/or light and/or sound using Wireless Communication, such as, but not limited to, wireless Information Technology, cellular communication (such as, but not limited to, GSM, GPRS, CDMA), Wireless Networks, WLAN computer communications, wireless networking standards (such as IEEE 802.11), wireless personal area networks (WPAN) and wireless mesh networks, and "Internet-of-Things". It should be clearly stated that among such protocols, but not limited only to them, are Wi-Fi, Bluetooth, Low-Energy-Bluetooth (BLE), Wi-Max, ZigBee, Z-wave, Insteon, UWB, Cellular devices communication protocols, Near-field Communication (NFC), RFID protocols or standards. These terms shall also refer to the use of such protocols over any radio frequency, such as—but not limited to, UHF, HF, VHF, 2.4 Ghz, 5 Ghz, 18 Ghz, 60 Ghz UWB-dedicated frequencies, and up to 300 Ghz.

The terms "Antenna Module" or "Antenna Array", or "AM" shall refer to a system and/or a device comprising at least one antenna and/or an array of antennas that can be used to either transmit and or receive radio signals in pre-defined antenna patterns. Said arrays patterns can be of any type of known arrays used for radio direction-finding, including, but limited to, directional, monopulse, cardioids. Said antenna patterns can be created using variety of components and/or antenna types, shapes and sizes.

The term "Ground"—shall refer to a conducting surface close to an antenna used to enable an antenna to function and/or improve the antenna performance and/or increase the probability of acquiring a required antenna radiation pattern. For example, said Ground can be (but not limited to) a metallic surface located beneath a monopole antenna.

The terms "Communication Circuit" or in short "Comm"—shall refer to an RF and/or light and/or sound transmitter and/or receiver which communicates wirelessly with one or more Targets. The Comm may be (but not limited to) e.g. Wi-Fi, Bluetooth, ZigBee, UWB, and RFID etc. at any frequency.

The terms "Identification Data" or "ID"—shall refer to a number, either serial or other, a name, a collection of symbols, or any other type of reference used to provide an electronic device a unique identification, which enables users and/or systems to identify, track, monitor, and operate the device. Said ID may be originally provided by the devices manufacturers, may be assigned to it by a computer system, may be assigned by a user, or may be used simply to associate a unique description by a user to the device. A device may also have more than one ID's attached to it (for example, by the manufacturers, by the system, and by the user). A device may also broadcast different IDs at different statuses (for example, ID1 for "stand-by", ID2 for "operating");

The terms "Target Compass Azimuth" or "Target AZ" shall refer to compass bearings that are stated in the Target's system in which either north or south can be the zero, and the angle may be measured clockwise or counterclockwise from the zero.

The terms "Looker Compass Azimuth", or "Looker AZ" shall refer to compass bearings that are stated in the Looker's system in which either north or south can be the zero, and the angle may be measured clockwise or counterclockwise from the zero.

The term "AZ" refers to Azimuth with respect to the north, having a range of $0 \leq AZ < 360$.

The term "$\phi$" refers to a direction with respect to the Heading (either the Looker's Heading or the Target's Heading), having a range of $-180 \leq \phi < 180$ The terms "Internet-of-Things" or "IOT"—shall refer to physical objects or "things" embedded with electronics, software and/or sensors and Wireless P2P Communication connectivity to enable it to connect with other devices. Each thing is locally uniquely identifiable through its embedded computing system but is might be able to interoperate within the existing Internet infrastructure. Such thing does not have to include a display mean.

The terms "Peer-2-peer" or "P2P"—shall refer to a Wireless Communication network between at least 2 wireless devices, which allows wireless devices to directly communicate with each other. Said Wireless devices within range of each other can discover and communicate directly without involving central access points. This term also covers the use of Wireless Communication between a cellular device to a Base-station, Base-station to Cellular device, and Base-Station to Base-station. It also covers, in the same manner, TV stations Wireless Communication.

The term "Accelerometer"—shall refer to a device that measures proper acceleration—i.e., the acceleration experienced relative to freefall. Single- and multi-axis models are available to detect magnitude and direction of the acceleration as a vector quantity, and can be used to sense position, vibration and shock. Said accelerometer can be a component and/or sensor in portable electronic devices—such as, but not limited to, cellular phone, video game controllers/console, digital camera, GPS device, media player, laptop computer, tablet computer, wireless remote control, PDA—to detect the position of the device or provide for game input.

The term "Gyroscope" shall refer to a device for measuring or maintaining orientation, based on the principles of conservation of angular momentum. Said Gyroscope can be a component and/or sensor in portable electronic devices—such as, but not limited to, cellular phone, video game controllers/console, digital camera, GPS device, media player, laptop computer, tablet computer, wireless remote control, PDA—to detect the position of the device or provide for game input.

The term "Cross Verification" shall refer to a mode of operation of the system, in which the Target and Looker devices can each change functionality—i.e. the Target becomes the Looker and the Looker becomes the Target, and when doing so the method switches between the Reversed DF method to prior-art DF methods.

The term "Sensors" shall refer to any type of sensors, such as, but not limited to, Barometer, pressure sensors, light sensors, medical sensors, touch sensors, camera sensor, radar sensor, etc.

The terms "POLOC" or "Point of loss of communication" shall refer to the measurable point in which the wireless communication between the Target and Looker is lost, in accordance with the various methods and techniques desired by a person skilled in the art.

FIG. 1A shows a DF system for measuring a relative direction of a target vs. the DF's heading, according to exemplary embodiment of the present invention. The DF system 110 comprises antenna 120 and antenna 130, having an electromagnetic-absorbing material 125 between them, which is part of the DF system 110. The DF system 110 may determine the relative direction to a target 105 by grouping the antennas 120, 130 into an antenna pair and compare the measured signal strength received in each of the antennas. In some cases, additional antennas may be added to the DF system 110. Thus, the DF system 110 is designed to include or communicate with more antennas and group them to antenna pairs. The target 105 may transmit RF transmissions and communicate with other wireless devices. The wireless devices may be such as, DF system, wireless sensor nodes, RF receivers, RF transceivers, and the like. The electromagnetic-absorbing material 125 resides between antenna 130 and antenna 120 and may absorb the signal strength received from target 105. The electromagnetic-absorbing material 125 is not limited to any shape or structure.

The antennas 120 and 130 may be grouped as an antenna pair according to the relative location of the Target vs. the antennas in the pair and the Absorbing material between them, Antenna 130 may receive a weaker signal strength than antenna 120, since the RF signal may be absorbed by the electromagnetic-absorbing material 125. Antenna 120 may be unobscured by the electromagnetic-absorbing material 125 versus the target 105 and may receive a stronger signal strength than antenna 130, due to the electromagnetic-absorbing material 125. FIG. 1A also shows arrow 115 which illustrates a heading of the DF system 110. The DF system 110 may determine that the relative direction of target 105 correlates with its heading 115, as the signal strength measured at antenna 130 is weaker than the signal measured at antenna 120 as the signal strength received by antenna 130 was attenuated by the electromagnetic-absorbing material 125.

The DF system 110 also comprises a central unit (not shown) communicating with the antennas 120, 130 that communicate with the target in direct wireless communication via the antennas. The antennas measure the signal strength received from the target and transmit the signal strength to the central unit. The central unit may also comprise a processing module for performing the methods of the present invention, for example any sort of analysis and calculation. The central unit may also comprise a memory for storing information, for example calibrated absorption of the electromagnetic-absorbing material 125, prior measurements from the antennas in the DF system and the like.

Figure 1B:
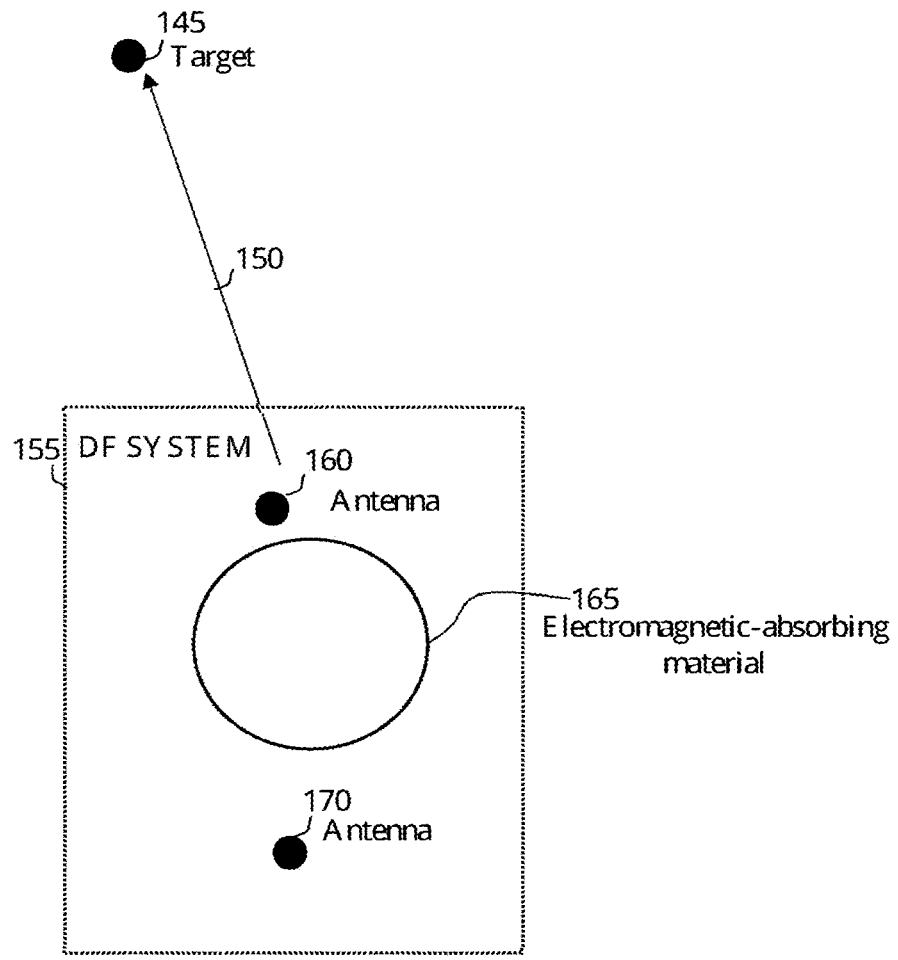
FIG. 1B shows a DF system measuring a different relative direction of a target, according to exemplary embodiment of the present invention.

FIG. 1B shows a DF system measuring a different relative direction of a target vs. the DF's heading, according to exemplary embodiment of the present invention. DF system 155 comprising antenna 160 and antenna 170, having an electromagnetic-absorbing material 165 between them. FIG. 1B also shows target 145 directly communicating with antennas included in the DF system 155. In some cases, target 145 may move and change its relative location. In such case, the DF system 155 may operate the relative direction determination process and determine the new relative direction of target 145, as shown in arrow 150.

Figure 2A:
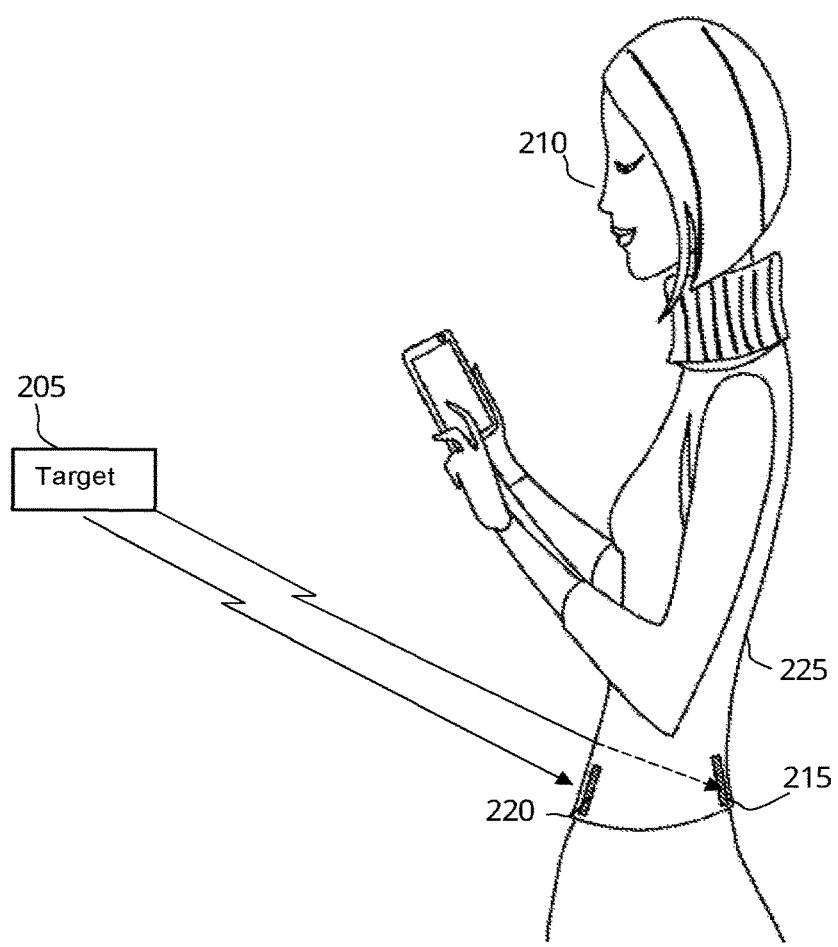
FIG. 2A shows a person with a DF system having one antenna pair placed in her clothes and receive an RF transmission from a target, according to exemplary embodiments of the present invention.

FIG. 2A shows a person with a DF system having one antenna pair placed in her clothes and receive an RF transmission from a target, according to exemplary embodiments of the present invention. For example, antenna 215 and 220 may be grouped as an antenna pair and receive RF signals from a target 205. In such cases, the DF system may define a heading to the DF system associated with the item into which the system is implemented to. In this use case, the DF system heading may be defined as the front of the cloth, which inherently is also the front of the person wearing the cloth. In such case, the person's body 210 may function as the electromagnetic-absorbing material. For example, the body of the person functions as the absorbing material, in such manner that it absorbs (for example) 21 dB of the Target's signal strength, resulting in antenna 215 receiving an RF signal from the target 205 in a signal strength of −88 dB, and antenna 220 receiving an RF signal from the target 205 in a signal strength of −67 dB.

Figure 2B:
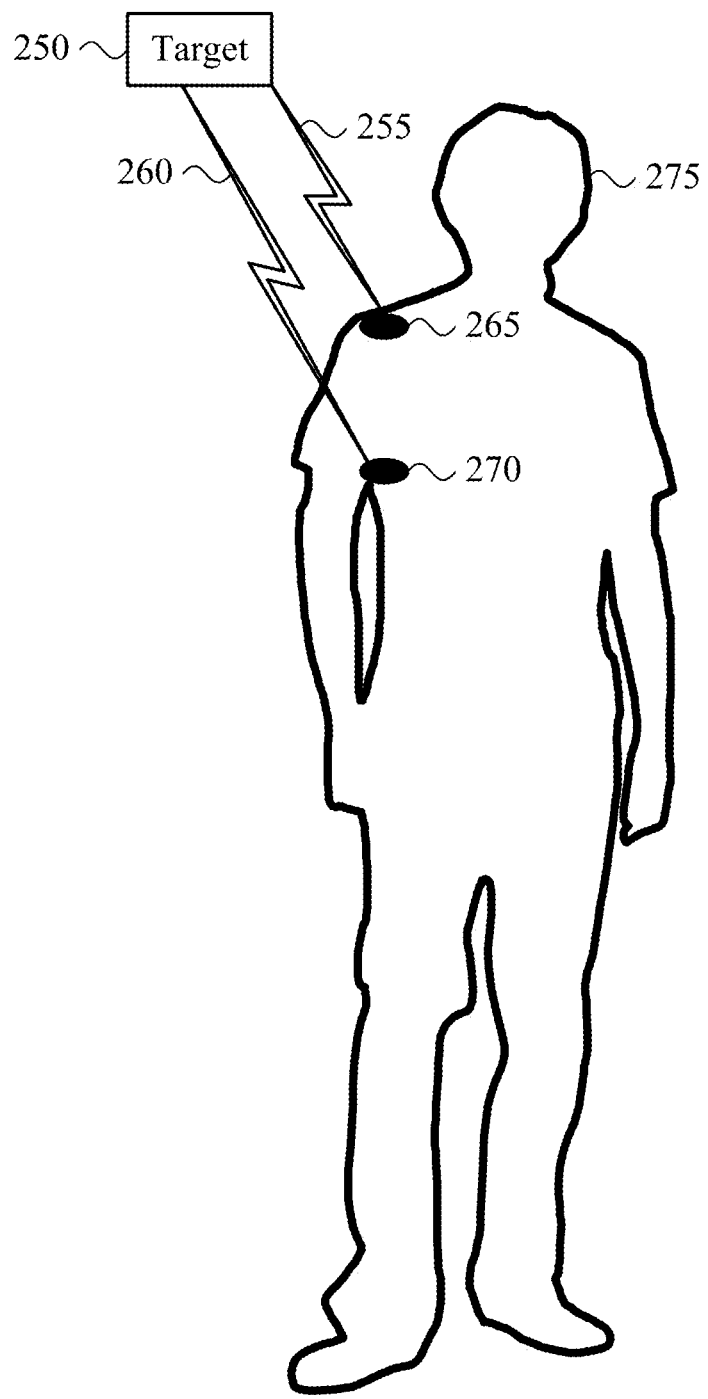
FIG. 2B shows a person with one antenna located at the shoulder and one antenna located in the armpit, according to exemplary embodiments of the present invention.

FIG. 2B shows a person with one antenna located at the shoulder and one antenna located in the armpit, according to exemplary embodiments of the present invention. The person 275 is shown along with two antennas 265 and 270 located in the person's clothes. Antennas 265 and 270 are connected to a DF system and utilized to determine the relative direction of a target. For example, antennas 265 and 270 may be grouped as an antenna pair and receive RF signals 255, 260 from a target 250. In such a case, the person 275 may function as an electromagnetic-absorbing material. For example, antenna 270 may receive an RF signal from the target 250 in a signal strength of −93 dB, and antenna 265 may receive an RF signal from the target 250 in a signal strength of −75 dB.

Figure 3:
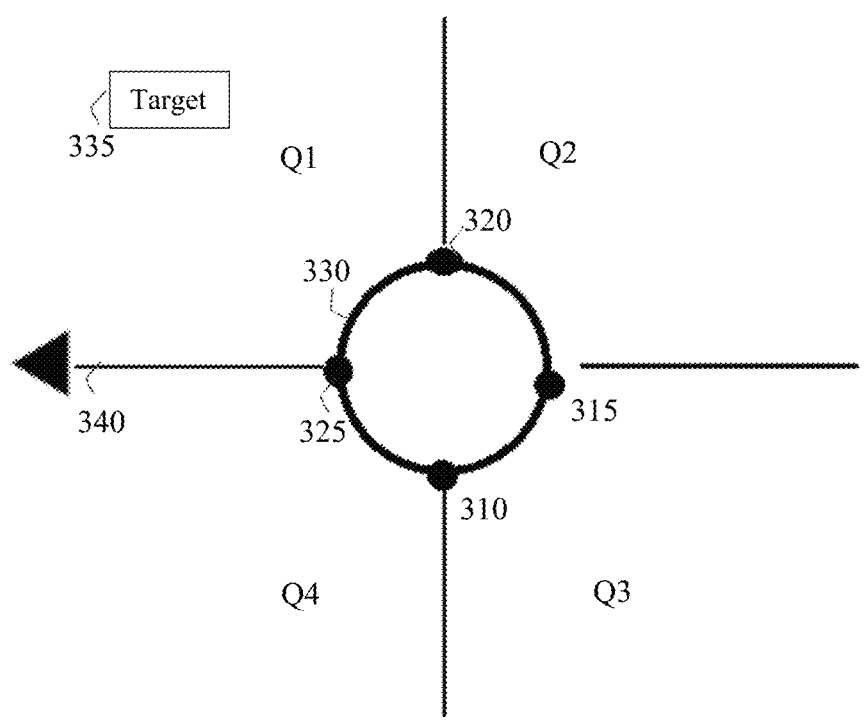
FIG. 3 shows a relative direction determination of a target utilizing 2 antenna pairs, according to exemplary embodiments of the present invention.

FIG. 3 shows a relative direction determination of a target utilizing 2 antenna pairs, according to exemplary embodiments of the present invention. FIG. 3 shows an electromagnetic-absorbing material 330 which, in some cases, can be a living medium material such as a person's body, and antennas 310, 315, 320, and 325 located in proximity near electromagnetic-absorbing material 330. Antennas 310, 315, 320, and 325 can be grouped into antenna pairs, in order to determine relative directions of targets, such as target 335. For example, antenna 325 and antenna 315 may be grouped into one antenna pair, and antenna 320 and antenna 310 may be grouped into another antenna pair.

Both of the antenna pairs can be utilized in the relative direction determining process. For example, in case target 335 transmits an RF signal, an antenna pair comprising antenna 325 and antenna 315 may be utilized to determine that target 335 may be in the front of the electromagnetic-absorbing material 330. The DF system may utilize the antenna pair comprising antenna 820 and antenna pair 310 to determine that target 335 may be at the right side of the electromagnetic-absorbing material 330, assuming the DF system have its heading directed forward towards direction 340, as shown in FIG. 3. In some cases, the determination of the location may be performed using the antenna pair comprising antennas 325 and 315 first, and then using the antenna pair comprising antennas 320 and 310. In some other cases, the relative direction determination process may utilize both of the antenna pairs simultaneously.

Figure 4:
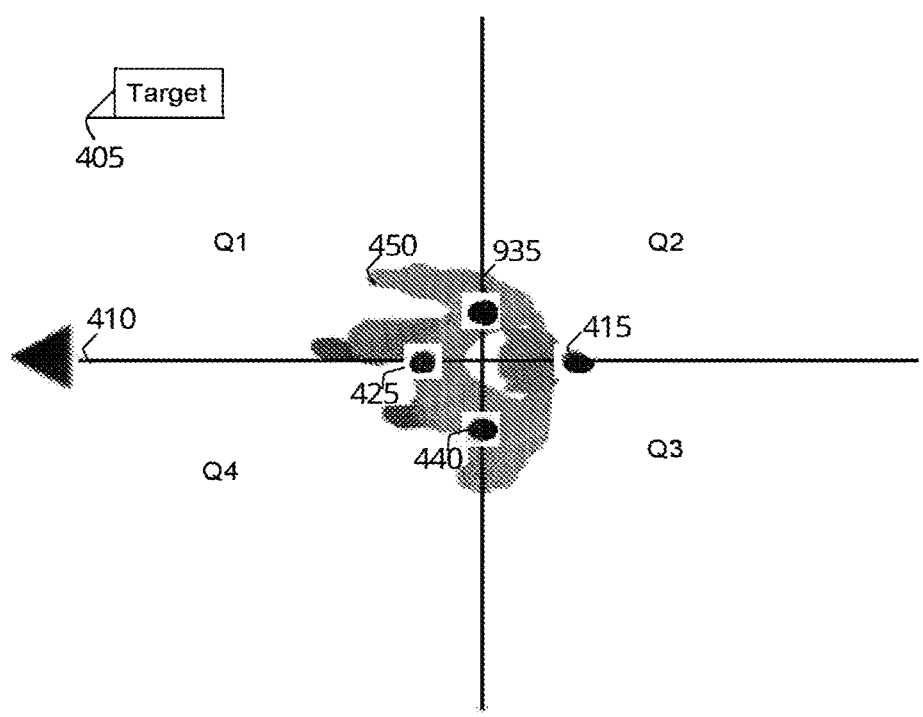
FIG. 4 shows a top view of a person wearing a wearable item with a DF system comprising 4 antennas, allocated as two antenna pairs, according to exemplary embodiments of the present invention.

FIG. 4 shows a top view of a person wearing a wearable item with a DF system comprising 4 antennas, allocated as two antenna pairs, according to exemplary embodiments of the present invention. Antennas 440, 415, 425, and 435 are located on a wearable item used by a person 450, as the person's body 450 functions as the electromagnetic-absorbing material. FIG. 4 also shows the heading 410 of the DF system, which is aligned with the natural heading of a person 450. Antennas 440, 415, 425, and 435 can be grouped into antenna pairs, in order to determine relative directions of targets, such as target 405. In some cases, the DF system may perform an artificial division of the area around person 450 into virtual quarters. For example, the area around person 450 may be divided to quarters denoted Q1, Q2, Q3, and Q4 to specify the relative direction of target 405 versus the person 450. In some cases, such division may be utilized to present the relative direction in a screen of the DF system or a computerized device, such as (but not limited to) a computer, a mobile telephone, a tablet personal computer and, and the like. Thus, the relative location of the target may be defined by a quarter, which facilitates the person to identify the general location of the target 405. The quarters may be defined according to the heading 410.

Figure 5:
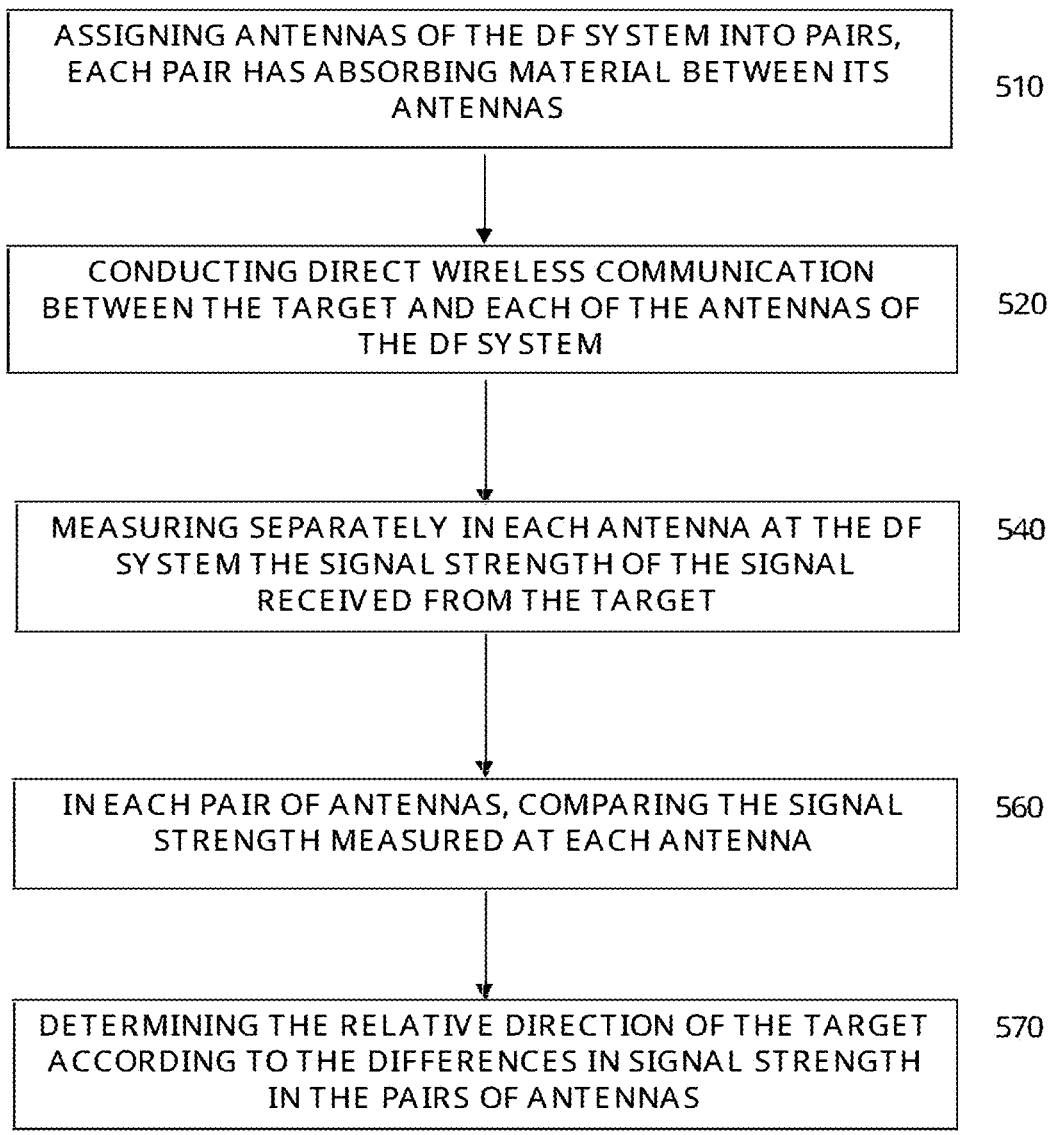
FIG. 5 discloses a method for determining the relative direction of a target, according to exemplary embodiments of the current invention.

FIG. 5 discloses a method for determining the relative direction of a target, according to exemplary embodiments of the current invention. Step 510 discloses assigning antennas of the DF system into pairs, having absorbing material between the antennas in the pair. Step 520 discloses conducting direct wireless communication between the target and the DF system via each one of the antennas in the pair. Step 540 discloses measuring at the DF system the signal strength of the signal received from the target separately at each antenna in the pair. Step 560 discloses in each pair of antennas, comparing the signal strength measured at each antenna. Step 570 discloses determining the relative direction of the target according to the differences in signal strength in the pairs of antennas.

Figure 6:
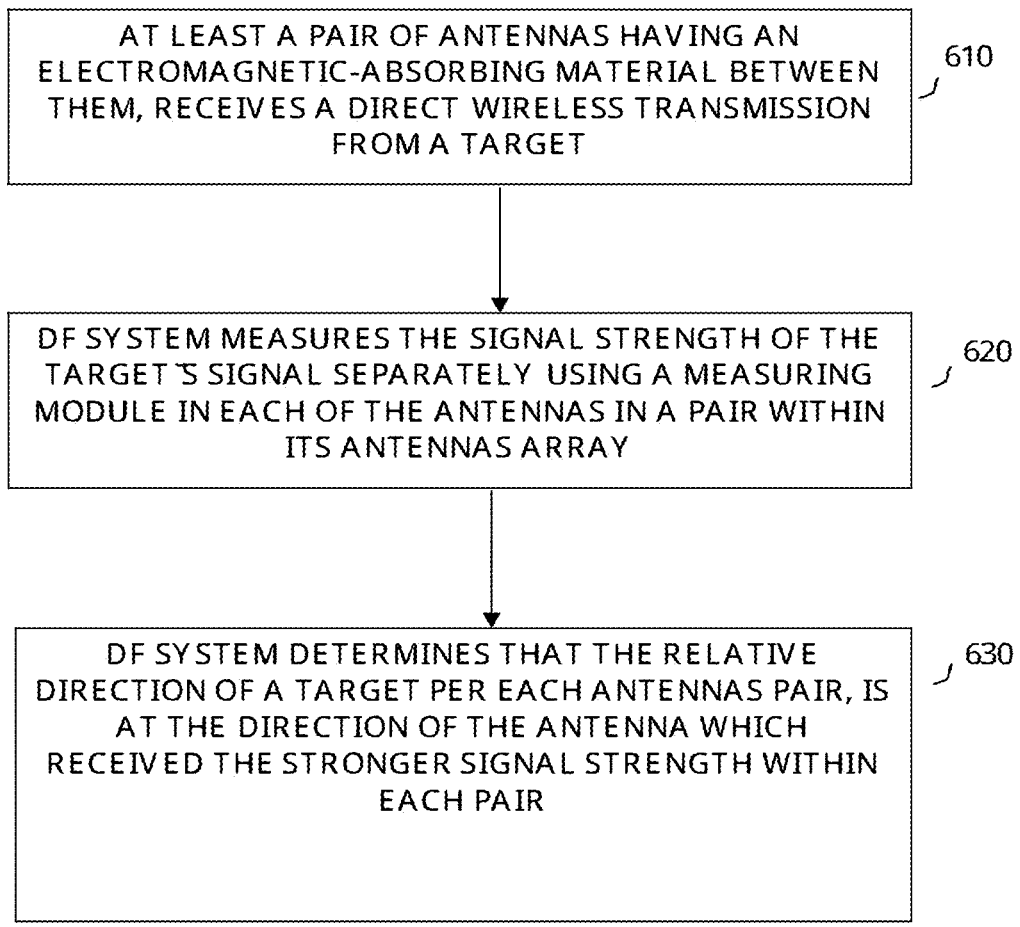
FIG. 6 discloses the relative direction determination process conducted by the DF system, according to exemplary embodiments of the present invention.

FIG. 6 discloses the relative direction determination process conducted by the DF system, according to exemplary embodiments of the present invention. In step 610, the DF system comprises at least a pair of antennas having an electromagnetic-absorbing material between them, receiving a direct wireless transmission from a target.

In step 620, the DF system measures the signal strength of the target's signal antenna separately using a measuring module in each of the antennas in a pair within its antennas array. For example, in case a DF system comprises 6 antennas, the DF system may be configured with the 6 antennas grouped to at least 3 pairs. The signal strength measurement process may be performed separately by each antenna in each antenna pair as they may be grouped and defined in the DF system. Grouping the antennas to antenna pairs may be performed, in some cases, via a manual procedure or according to antennas' locations versus the absorbing material. In some other cases, the DF system may utilize an automatic procedure, such as a computerized procedure, to perform the antenna grouping process. The antennas grouping process may be configured to ensure that the antenna pairs comprise two antennas in a fashion that the two antenna members of each antenna pair have minimal absorbing material between them, for example in opposite sides of the electromagnetic-absorbing material associated with the DF system. For example, in case a DF system comprises 4 antennas embedded in trousers, the antennas may be grouped into two antenna pairs, the first pair has one antenna placed in the front portion of the trousers and one antenna placed in the back portion of the trousers, and the second pair has one antenna placed in the left side of the trousers and one antenna placed in the right side of the trousers. In some cases, one antenna can be assigned to more than one pair.

Step 630 discloses a process of determining the relative direction of a target according to the signal strength difference between the two antennas of the antenna pairs. The DF system may determine that the target is in the direction of the antenna member which received the stronger signal strength of a selected pair. For example, in case the selected pair comprises one antenna member which receives a signal strength of −55 dB and the other antenna member which receives a signal strength of −80 dB, the target may in the direction to the antenna which receives a signal strength of −55 dB.

Figures 7A, 7B:
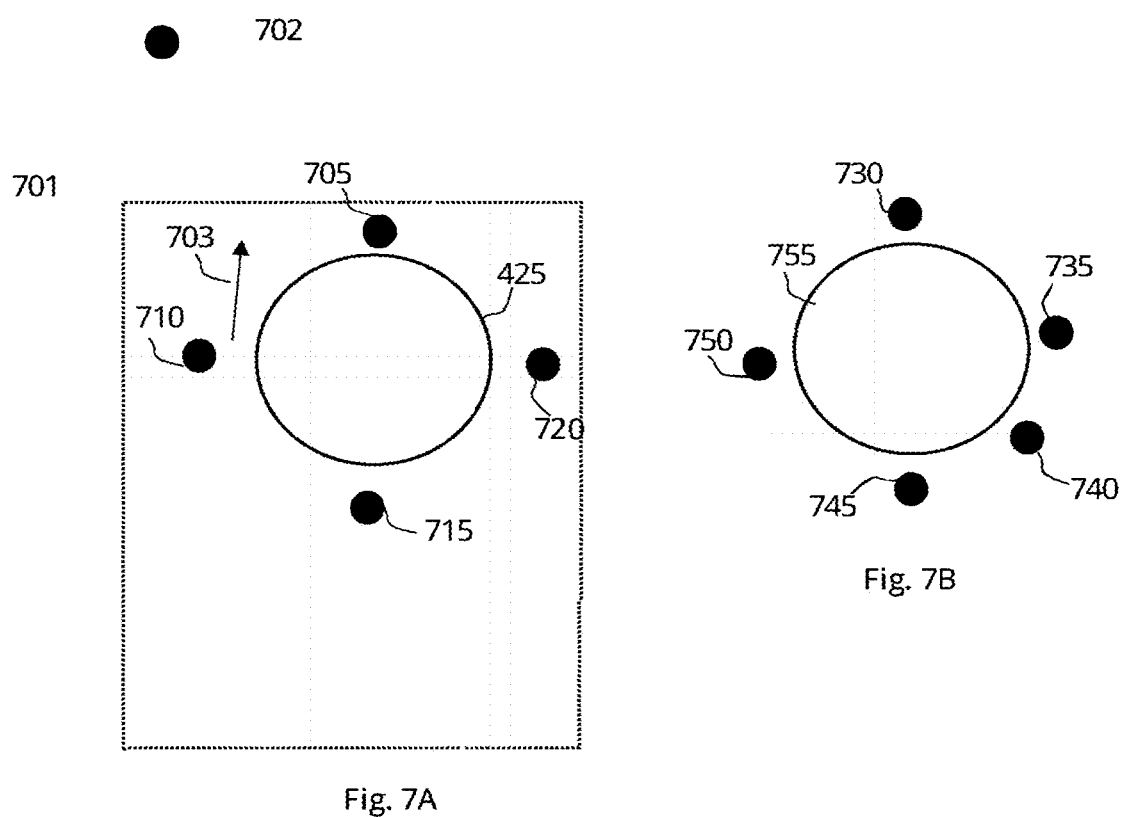
FIG. 7A shows an upper view of a DF system with an antenna array having more than two antennas designed to receive RF transmissions from targets and located around an electromagnetic-absorbing material, according to exemplary embodiments of the present invention.
FIG. 7B shows an odd number of antennas designed to receive RF transmission from targets having an electromagnetic-absorbing material between them, according to exemplary embodiment of the present invention.

FIG. 7A shows an upper view of a DF system with an antenna array having more than two antennas designed to receive RF transmissions from targets and located around an electromagnetic-absorbing material, according to exemplary embodiments of the present invention. Antennas 705, 710, 715, and 720 can be grouped into antenna pairs and receive RF transmission from a target. For example, antenna 705 and antenna 715 may be grouped into one pair, and antenna 710 can be grouped with antenna 720 into another pair. In some cases, one of the antennas can be grouped into more than one pair, as long as they have the absorbing material 725 between them. For example, antenna 705 can be grouped with antenna 710 to one antenna pair and be grouped with antenna 715 to another antenna pairs. FIG. 7A also shows electromagnetic-absorbing material 725 that obstructs some of the antennas 705, 710, 715, and 720. For example, in case a target is located at the direction of antenna 705, the RF signal may be attenuated for antenna 715 because of the electromagnetic-absorbing material 725. In some other cases, more than one antenna may be obstructed.

According the FIG. 7A, a DF system 701 may have a pre-defined heading 703. Said heading can be defined as directions such as "front" (in the direction of arrow 703), "back" (in the opposite direction of arrow 703), "right" or "left" accordingly. Said heading may also be defined in angles, in such manner that the heading direction of the DF system 701 is 0 degrees, and going clock-wise, is 90,180, and 270 degrees accordingly. When the DF system 701 receive a signal from target 702, via its antennas 705, 710, 715, 720, a direction to the target may be determined, by comparing the signal strength between antennas 705 and 715, and between 710 vs 720. Given the absorbing material between each compared pair, the DF system 701 will determine that the signal received at 705 is stronger than received at 715, thus determining that target 402 is at "front" heading. Given the absorbing material between each compared pair, the DF system 701 will determine that the signal received at 710 is stronger than received at 720, thus determining that target 702 is at "left" heading. Combining these determinations at the central unit, may result in determining that target 702 is positioned in the front and left of the DF system 701.

FIG. 7B shows an odd number of antennas designed to receive RF transmission from targets having an electromagnetic-absorbing material between them, according to exemplary embodiment of the present invention. FIG. 7B shows antennas 730, 735, 740, 745 and 750 which can be grouped into antenna pairs and receive RF transmission. For example, antenna 750 can be grouped into a pair with antenna 735. FIG. 7B also shows electromagnetic-absorbing material 755 that obstructs some of the antennas 730, 735, 740, 745 and 750.

The antenna pairs can be used to improve both reliability and reduce the sector size/width of relative direction in which a Target may be. The pairs may be used to verify the results of calculating signal strength difference of other pairs. The pairs may be used to create overlapping sectors of relative directions. In addition, the system may be used in such manner that a specific antenna can be selectively paired with other antennas—not necessarily antennas that are opposite. For example, a specific front antenna may be used to compare results versus three different back antennas (instead of using three pairs of antennas as each pair contains a front antenna and back antenna).

Figure 8:
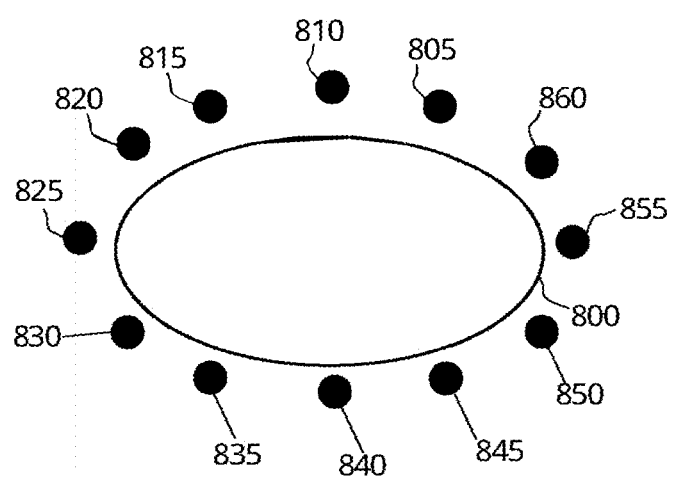
FIG. 8 demonstrates a plurality of antennas designed to receive RF transmissions from targets and located in proximity to an electromagnetic-absorbing material, according to exemplary embodiments of the present invention.

FIG. 8 demonstrates a plurality of antennas designed to receive RF transmissions from targets and located in proximity to an electromagnetic-absorbing material, according to exemplary embodiments of the present invention. Antennas 805, 810, 815, 820, 825, 830, 835, 840, and 845 can be grouped to antenna pairs and receive RF transmission. In some cases, the antenna pairs may comprise two antennas in opposite sides on the absorbing material. For example, antenna 820 may be grouped with antenna 850 which is located in the opposite side of the electromagnetic-absorbing material 800.

Figure 9:
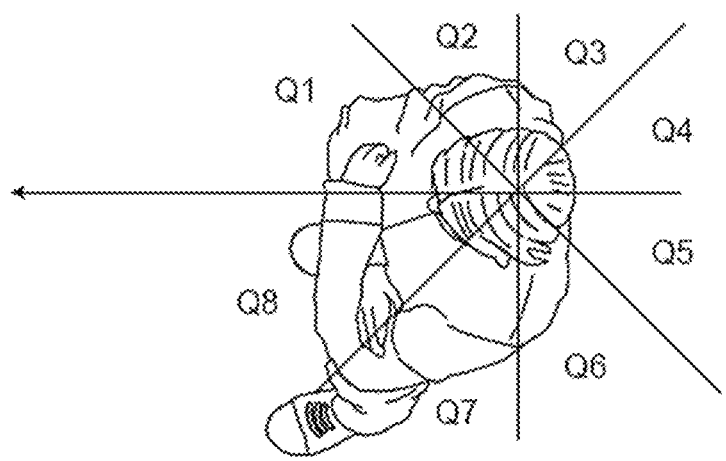
FIG. 9 demonstrates the DF system area covered by the DF system, the area is virtually divided into multiple sectors, according to exemplary embodiments of the present invention.

FIG. 9 demonstrates the DF system area covered by the DF system, the area is virtually divided into multiple sectors. In some cases, each sector may be covered by more than a single an antenna pair.

Figure 10:
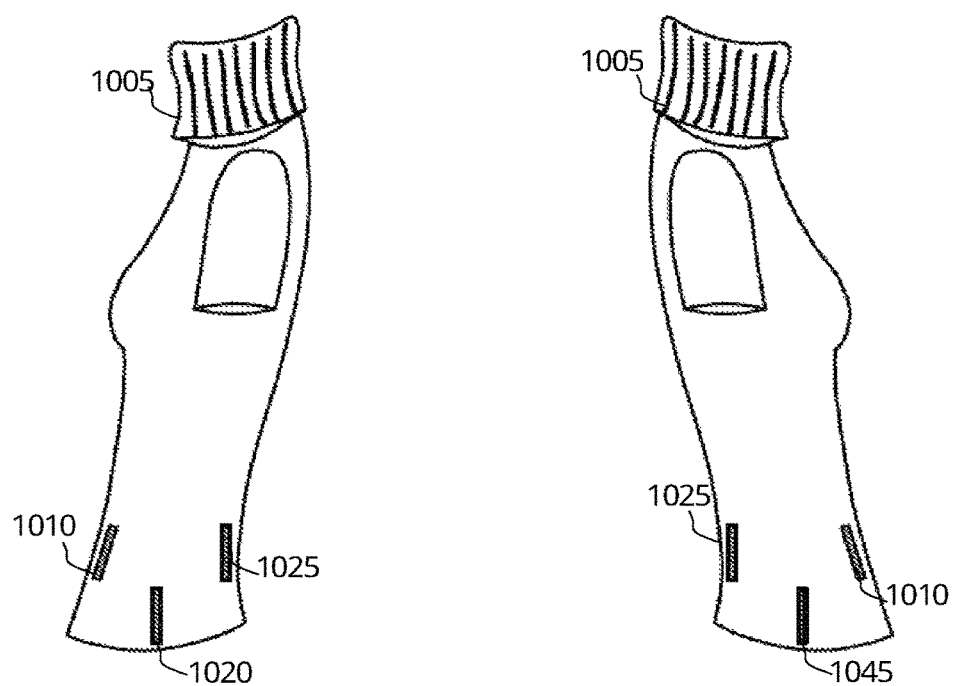
FIG. 10 demonstrates antennas placed in a person's shirt and functioning as a DF system, according to exemplary embodiments of the present invention.

FIG. 10 demonstrates antennas placed in a person's shirt and functioning as a DF system, according to exemplary embodiments of the present invention. FIG. 10 shows different views of the same shirt, shirt 1005, having 4 antennas placed therein, front antenna 1010, rear antenna 1025, right antenna 1045 and left antenna 1020. The shirt may function as DF system and target. In some other cases, shirt 1005 can function as a DF system and receive information being transmitted from a transmitter embedded in shirt 1005. Shirt 1005 can also function as DF system and a target simultaneously. For example, antennas 1010 and 1020 can be grouped into an antenna pair and receive RF transmission.

Figure 11:
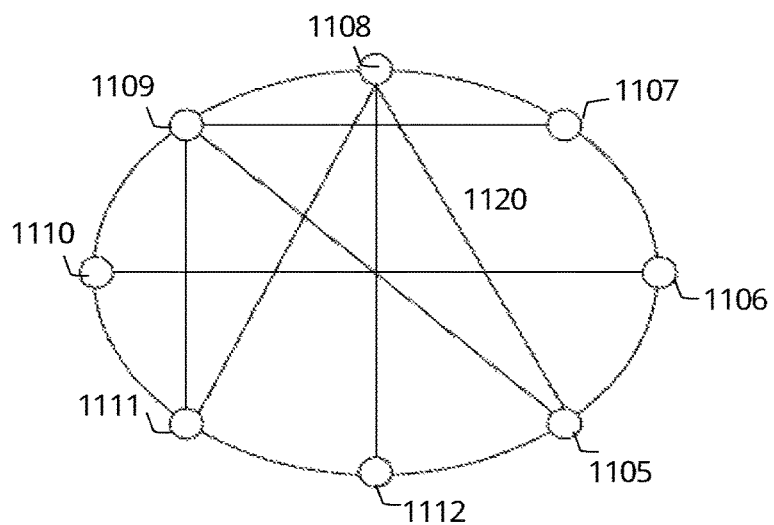
FIG. 11 shows an electromagnetic-absorbing material and a number of antennas and having an electromagnetic-absorbing material between them, according to exemplary embodiments of the present invention.

FIG. 11 shows an electromagnetic-absorbing material and a number of antennas 1105, 1106, 1107, 1108, 1109, 1110, 1111, and 1112 having an electromagnetic-absorbing material 1120 between them, and grouped into pairs, according to exemplary embodiments of the present invention. In some cases, the antenna members may be positioned in opposite sides of the electromagnetic-absorbing material 1120, as shown in the antenna pair containing antennas 1106 and 1110. In some other cases, the antenna pairs may contain antenna that are in a relatively close proximity to one another, as shown in antenna pair containing antennas 1109 and 1107.

Figure 12:
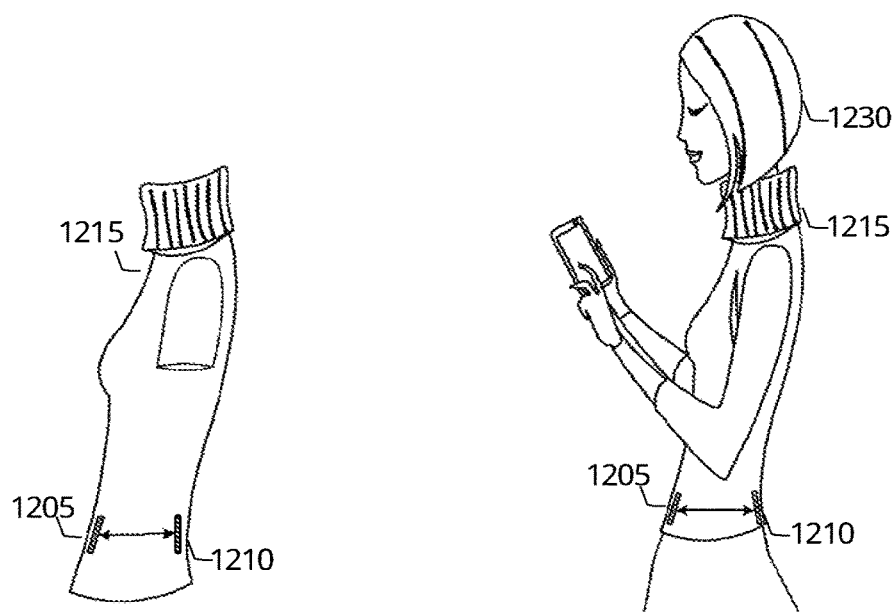
FIG. 12 demonstrates a method of calibrating the DF system, according to exemplary method of the present invention.

FIG. 12 demonstrates a method of calibrating the DF system, according to exemplary method of the present invention. FIG. 12 shows a shirt 1215 embedded with antennas 1205 and 1210. FIG. 12 also demonstrates a person 1230 with the shirt 1215 embedded with the same antenna 1205 and 1210. Calibration begins when placing the DF apparatus in or on the shirt 1215 having free space between the two positions of the two antennas in the pair. For example, an extra-large shirt contour may have 25 centimeters of free space between its front and back sides, where the front antenna and the back antenna are positioned. Then, each antenna WITHIN the Looker's system wirelessly communicate with its pair antenna, and the signal strength measured correspondently at each antenna is logged, and may be used as a reference to the difference in signal strengths. Then, the antennas in the pair communicate after the person 1230 wears the shirt 1215 and the signal strengths are measured. The person 1230 functions as the absorbing material. Then, the difference between the measurements is used to indicate the absorbing factor of the person 1230. The measurement is customized for the specific person 1230. For example, for one user at 2.4 Ghz, his body absorption may be 15 dB for a specific antenna pair, while for another it might be 25 dB for the same pair.

The customized measurement may be added to a storage of the DF system and can be used in the method of determining the relative direction of a Target. When the Target is more or less on the same "line" between the Looker's antennas, the measured difference within the Looker's antennas should be reflected in the results of the communication of each antenna with the Target. For example, if said customization process measured absorption of 15 dB due to the users' body, when the Target is approximately on the same virtual line as the 2 antennas, the difference between the signal strength of the Target measured at each such Looker antenna should be also near 15 dB. If said difference of the Target measured signal is below the customization measurement, it may indicate that the Target is not necessarily on the same "virtual line", and the system may selectively choose to ignore and/or use data from other pairs and/or determine that the Target's relative direction is to either side of the said "virtual line";

Said comparison of the measured difference during the relative determination process vs. the stored calibrated data may be used as a quality factor indicator to increase reliability of the direction determination. In accordance with the example above, having 15 dB difference in both calibration and in the relative determination process may be given a higher quality factor of the direction determination.

Figure 13:
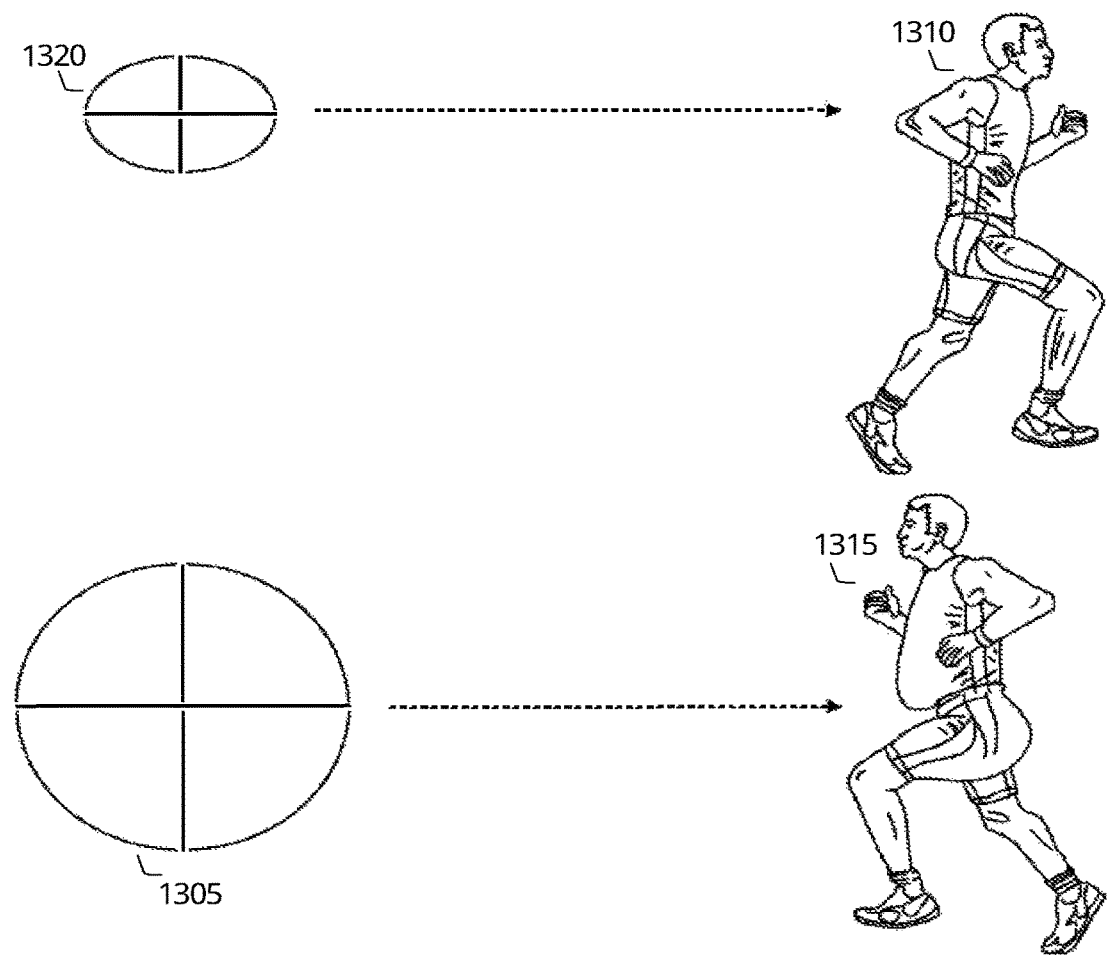
FIG. 13 demonstrates two persons with different body shapes and therefore a different absorption factor, according to exemplary embodiment of the present invention.

FIG. 13 demonstrates two persons with different body shapes and therefore a different absorption factor, according to exemplary embodiment of the present invention. First person 1315 may wear a shirt embedded with antennas that may be connected to a DF system. The first person 1315 body shape is represented by round shape 1305. The DF system that may be connected to the antennas embedded in the shirt of first person 1315 can detect the absorption factor of the person's 1315 body, store it in the DF system, and utilize it in the "relative direction determination" process. For example, in case a target is detected to be in the front of the first person 1315, and the measured absorption factor is smaller than the stored absorption factor, the DF system may operate the "relative direction determination" process and select a different antenna pair, or antenna pairs. FIG. 13 also shows another person 1310 having body shape represented by ellipse 1320. In case body shape 1320 is different than body shape 1305, the absorption factor stored by the DF system may be different.

FIGS. 14A-14C demonstrates measuring signal strength between antennas with and without an additional absorption material to the absorption of the person wearing a shirt, according to exemplary embodiments of the present invention. Shirt 1405 comprises two antennas 1410 and 1415. In FIG. 14A, the shirt 1405 comprises absorbing material 1420 which may contribute to the difference in signal strength of the signal from a target as measured in each antenna of antennas 1410 and 1415. When measuring the difference in signal strength between antennas 1410 and 1415, the difference reflects the absorption factor of the person wearing the shirt and the absorption factor of the material 1420. In FIG. 14B, the shirt 1405 is worn by a person and lacks the absorbing material 1420. Both antennas 1410 and 1415 communicate with the target 1470. In FIG. 14C, shirt 1405 is worn by a person and comprises the absorbing material 1420. Both antennas 1410 and 1415 communicate with the target 1470.

The insertion or removal of the material 1420 changes the difference in signal strength measured in the antennas 1410, 1415 when communicating with the target 1470. For example, in FIG. 14B, antenna 1410 located in the direction of target 1470 may receive a signal strength of −63 dB and antenna 1415 located at the back may receive a signal strength of −75 dB due to the absorption factor of 12 dB caused by the person wearing the shirt 1425. In FIG. 14C, the signal strength of the antenna 1410 located in the direction of the target 1470 is still −63 dB while the signal strength of the antenna 1415 located in the opposite direction of the target 1470 is now −89 dB, which indicates that the additional absorbing material contributed to decreasing the signal strength by 14 dB.

Figure 15:
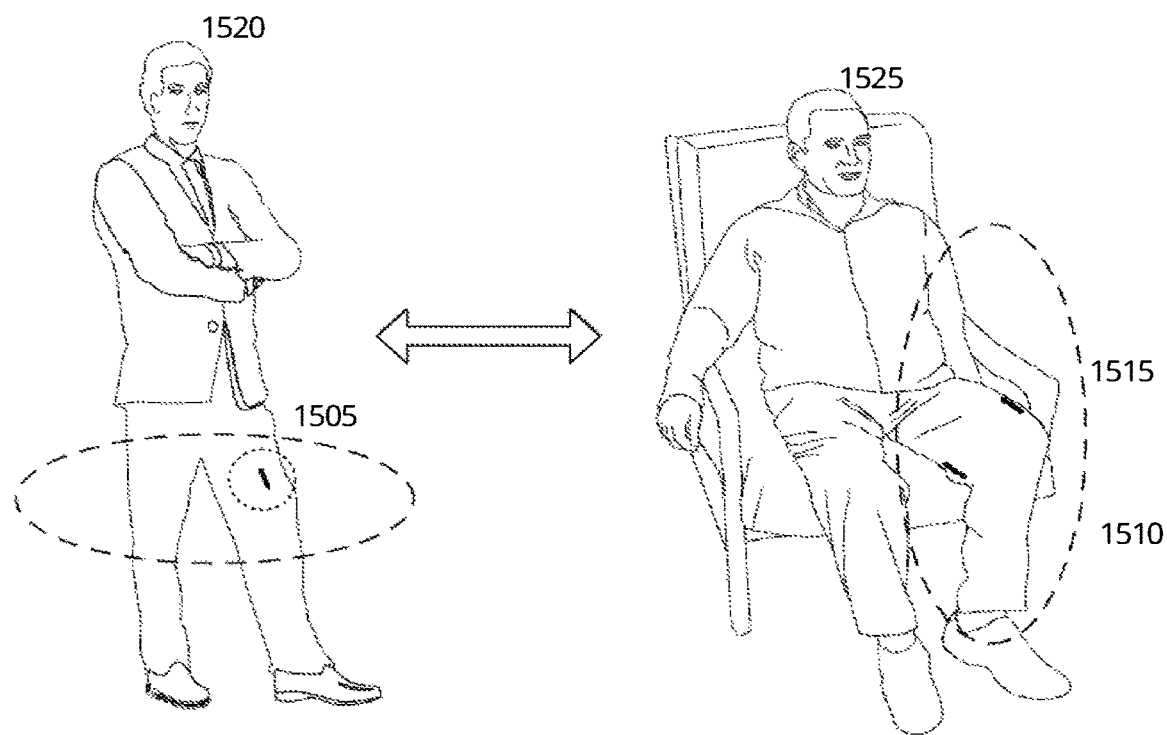
FIG. 15 shows targets transmitting RF signal with a tilt sensor indicating the physical orientation of the object carrying the antennas, according to exemplary embodiments of the present invention.

FIG. 15 shows targets transmitting RF signal with a tilt sensor indicating the physical orientation of the object carrying the antennas, according to exemplary embodiments of the present invention. A person 1520 standing with an antenna 1505 embedded in his trousers. A tilt sensor is embedded in or located near the antenna 1505 may indicate that person 1520 is standing, according to the tilt sensor's position. One tilt sensor may indicate the position of multiple antennas connected to a DF system of the subject matter. Similarly, another person 1525 is disclosed, in a sitting position, carrying two antennas, antenna 1510 and antenna 1525. Another tilt sensor detects the position of the antennas 1510 and 1525.

The data from the tilt sensors may be utilized in a method for determining whether the DF system finds a target direction on the horizontal plain (i.e., front/back/right/left, etc . . . ) or finds a target direction on the vertical plain (up/down/same level . . . ). The method comprises receiving data from each such Tilt sensor and determining for each antenna pair containing opposite antennas if the antennas in the pair are positioned one behind the other (horizontally) or one above the other (vertically), according to a predefined configuration.

Figure 16:
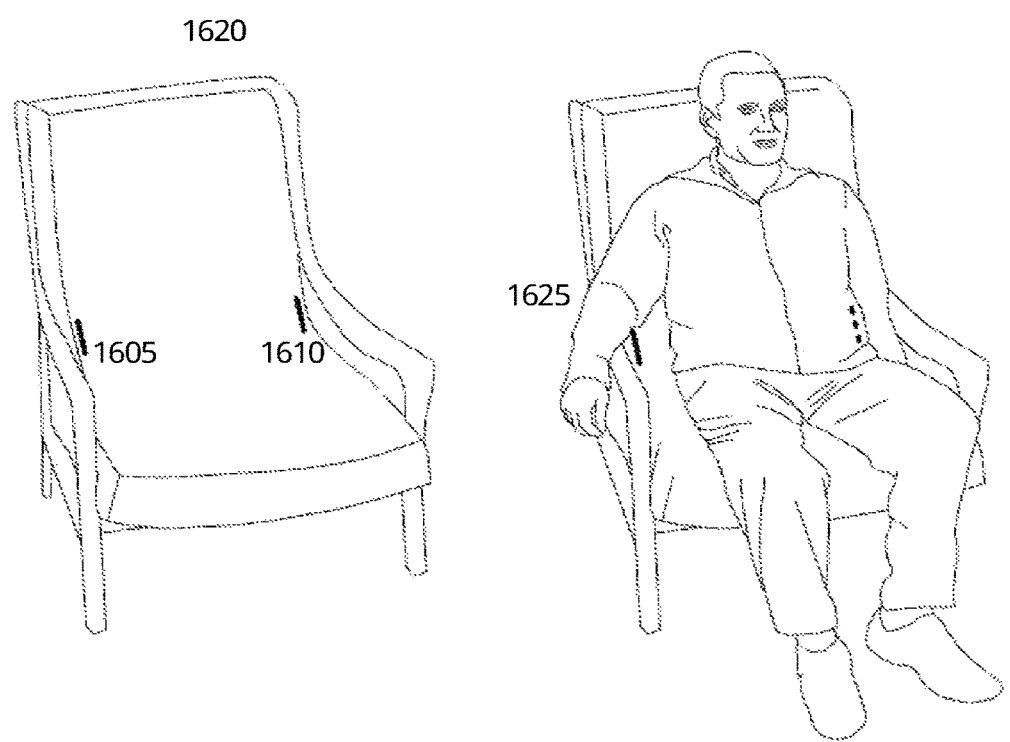
FIG. 16 shows antennas integrated into physical objects, according to exemplary embodiment of the present invention; and, FIG. 17 shows another method to find the relative direction from a DF device to a Target system, according to exemplary embodiment of the present invention.

FIG. 16 shows antennas integrated into physical objects, according to exemplary embodiment of the present invention. A pair of antennas 1625 (the other antenna is hidden by a person) is located on a chair on which a person is sitting. Another chair 1620 is equipped with antennas 1605, 1610 without the person positioned between the antennas 1605, 1610. The difference in signal strength measured between antennas 1605, 1610 is smaller than the difference between the antennas separated by the person because of the electromagnetic absorption resulting from having a person between the antennas.

Figure 17:
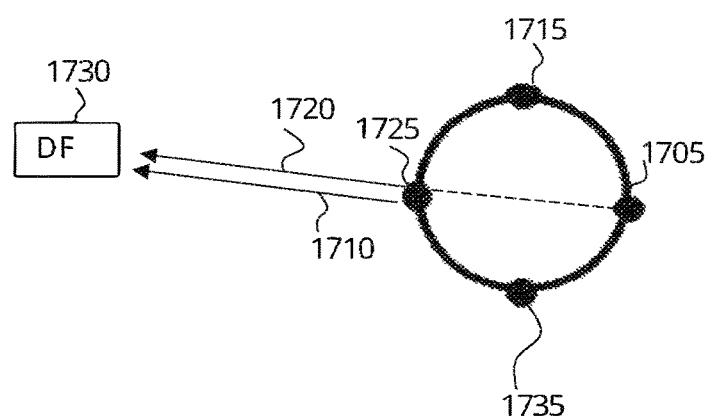

In some cases, the DF system comprises one or more sensors. The sensors are placed near each antenna of the antenna array of the DF system. For example, data collected by the sensors may be used to determine if an antenna has open space in front of it, or if not. For example, a pressure sensor may be used to determine that an antenna in the back of a shirt is applied with pressure, which may be caused due to the user sitting on a chair with his back pressed to the chair. The data collected by the sensors can be used as part of the Quality factor provided to the data measured in an antenna or even to determine that the measured data should not be used;

FIG. 17 shows a method to find the relative direction using a single radio transceiver communicating with multiple antennas having absorbing material between them, according to exemplary embodiment of the present invention. The Target system comprises antennas 1705, 1715, 1725, 1735 that transmit wireless signals directly to the DF device transceiver 1730. At least some of the antennas 1705, 1715, 1725, 1735 of the Target system are located in a manner that an absorbing material absorbs some of the signal transmitted from the antennas. The antennas 1705, 1715, 1725, and 1735 transmit signals to the DF device transceiver 1730 of the same signal strength, and the signal is received in different strengths according to the absorbing material. The DF device transceiver 1730 is aware of the heading or position of each antenna and therefore determines the relative direction of the Target according to the signal strengths of the received signals. For example, antenna 1705, and the target RF transceiver 1730, as the signal transmitted from antennas 1705 pass through path 1720 via the absorbing material, while the signal transmitted from antennas 1725 pass through path 1710 directly to the target DF transceiver 1730.

According to this method, the DF device has prior data regarding the Target system's antenna array structure and defined heading. The Target also transmits to the DF device a compass reading associated with the Target system's heading. The DF device, having data on the Target's system heading and antenna array, receive the signals transmitted from each one of the antennas in the Target's system, via a single antenna in the DF device.

Said direct wireless communication can be made by light waves and/or sound waves, and the said system and methods described above shall apply with the required changes. The system may be materialized using light wave, by using light sensors instead of antennas. The light sensor may be capable to detect light wave if frequencies that can move through the human body. The system may be materialized using sound wave, by using sound sensors instead of antennas. The sound sensor may be capable to detect light wave if frequencies that can move through the human body.

The absorbing material may be placed and/or attached to at least one antenna and/or light sensor and/or sound sensor in such manner that it will absorb the wave in a pre-defined direction. For example, the absorbing material may be placed outside a line of site between a Target and a Looker— i.e., the absorbing material is placed behind the antenna/sensor.

The DF system of the present invention may be calibrated to a user, group of users, to specific antennas, specific scenarios or measurements, and the like.

If said difference of the Target measured signal is below the customization measurement, it may indicate that the Target is not necessarily on the same "virtual line", and the system may selectively choose to ignore and/or use data from other pairs and/or determine that the Target's relative direction is to either side of the said virtual line. The basic measurement without the absorbing element may be done in advance, for example, as part of the production, quality assurance, or factory setting processes.

It is another object of the subject matter to disclose a system and method for determining a relative direction of a target device by receiving at a Looker device Wireless Communication comprising RF signals from the Target, using multiple antennas having an electromagnetic time delaying material located between the multiple antennas. The relative direction is determined based on the time it takes the RF signal to pass between the target device and each of the antennas, since the electromagnetic time delaying material delays the time it takes the signal to pass between the antennas and the target device—i.e., intentionally increasing the time it would have taken the signal to arrive to the antenna without the presence of the electromagnetic-delaying material. The TOF of receiving the RF signal from the target device is measured for each antenna, and the relative direction is determined based on the lowest TOF. In some cases, the measured time is the time it takes the signal to pass between the antenna and the target device. In some other cases, the antennas' clocks are synchronized and the antennas send the time of arrival of the signals from the target, when the same signal is received at all the multiple antennas.

It is well known in the art that the presence of time delaying materials in the LOS (for example vegetation, walls, people, and other objects) has a big influence on the reliability of ranging techniques using time-of-flight (TOF)—either one-way or two-way (TWR) (as done for example in IR-UWB)—as the delay caused by the Delaying Material increases the TOF, and the result is an increased calculated distance vs the actual physical distance.

In order to prevent any misunderstanding, and to differentiate this invention, time delay is also known in the art as part of an electronic board design or system to cause delay in the lines or system in order to match or stable signals. For example, in a radar system, a delay line makes it possible to perform signal analysis on a large number of acquired pulses by delaying some of the pulses in time. In a communications system with multiple clock sources, delay lines make it possible to introduce delays to a faster clock to synchronize its timing with a slower clock. The claimed invention provides new way to achieve delay, that does not require multiple clock sources nor a radar system.

There are also Direction-Finding (DF) techniques that are based on time measurement. These techniques are best known as TOA (Time of Arrival) DF or TDOA (Time direction of arrival). These techniques use two or more antennas and measure the time difference of the arrival of a signal in the antennas and calculate from these differences the AOA of the signal. This group includes for example short and long base TOA, DTOA (Differential Time of Arrival) etc.

It is well known in the art, that within the antennas array for such DF techniques, it is required that all the antennas will "see" the same one VS each other. In other words, within the array, there should be no Delaying Material between the antennas, so they will be able to "see" the same and based on the pattern radiations to determine the direction of the signal. If there is a use of Delaying Materials, components or cables after the antennas as known in the art, it is to match or stable the signal—but not in the same manner, intention or use as in this invention.

It is also well known in the art that in order to improve reliability of TOA/TDOA DF systems, it is preferred to have as much physical distance between the antennas of the DF system as possible, so the measured time difference of the signal from the Target that reaches each antenna of the DF will be easier to measure. By placing the DF system antennas very close to one another (for example, 1-10 cm apart), one risks reducing the DF reliability—especially in high-reflections environments, and in non-line-of-sight events between the target and the DF.

The claimed subject matter utilizes the electromagnetic time delaying material in order to intentionally create an increased TOF of the signal from the target to the antenna located behind the Delaying Material, so the measured TOF and the calculated distance between the target to this antenna are artificially bigger than the actual physical distance, due to the time delay caused when the wireless communication travels through the electromagnetic time delaying material. The intentional TOF increase and the artificial increased distance enable to determine the relative distance of the target device communicating with the at least two antennas.

Figures 18, 19:
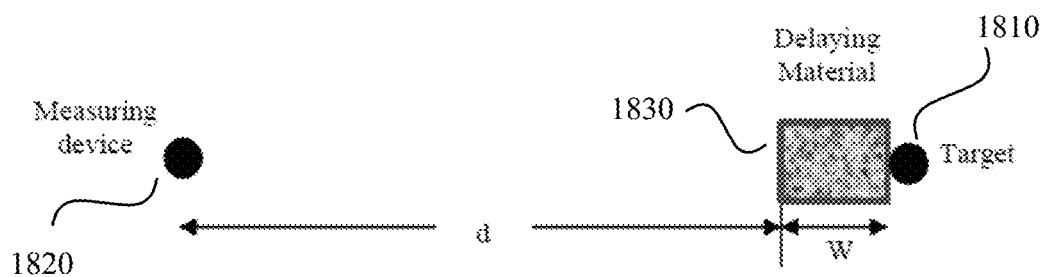
FIG. 18 shows an exemplary effect of what is known in the art as problem if having a Delaying Material in the line of sight (LOS) between a Transmitter and a receiver.
FIG. 19 shows a table having TOF durations measured with and without an electromagnetic time delaying material located between the antenna and the Target device, according to exemplary embodiments of the subject matter.

FIG. 18 shows an exemplary effect of what is known in the art as problem if having a Delaying Material in the LOS between a Transmitter and a receiver (i.e., a Target and a Looker). A Target device with an antenna may transmit RF signals by the Target device and have electromagnetic time delaying material located in the LOS between its antenna and the Looker device's antennas, according to exemplary embodiments of the subject matter. The target device 1810 may send RF signals to the antenna 1820, the RF signals pass through a sheet (or any other form-factor) of the electromagnetic time delaying material 1830 in order to reach the antenna 1820. That is, the RF signals passes a first time in which there is no obstacle for the RF signal, and a second time, in which the electromagnetic time delaying material 1830 delays the time in which the RF signal is received at the antenna 1820.

The speed of the RF signal through the Delaying Material is reduced from c in vacuum to:

$$v = \frac{c}{n},$$

Where n is the refractive index of the material. The two-way time of flight (TOF) through the Delaying Material is $$t = \frac{2W}{v} = \frac{2nW}{c}$$

The total two-way TOF with the Delaying Material is $$t = \frac{2d}{c} + \frac{2nW}{c} = \frac{2}{c}(d + nW).$$

Whether one or two way TOF, the result is that without the electromagnetic-delaying material the measuring device will use the measured time to calculate the real distance, d, but once the electromagnetic-delaying material is blocking the LOS, the measuring device will use the delayed time to calculate a distance d+nW.

Thus, it is easy to determine if the electromagnetic-delaying material is placed in front of the target or not. Note: in order to be able to use a small width W of the electromagnetic time delaying material 1830, the refractive index n should be large.

FIG. 19 shows a table having TOF durations measured with and without an electromagnetic time delaying material located between the antenna and the Target device, according to exemplary embodiments of the subject matter. The minimal values are measured when the signal travels the minimal distance in the electromagnetic time delaying material and the maximal values are measured when the signal travels the minimal distance in the electromagnetic time delaying material. Each row in the table contains values associated with a different signal frequency −403.5 MHz, 916.5 MHz and 2.45 GHz. The difference between each of the columns refer to different persons used as the electromagnetic time delaying material. Bigger persons may cause a bigger delay, or persons with a different muscle mass percentage may cause a bigger delay for the signal.

Figure 20:
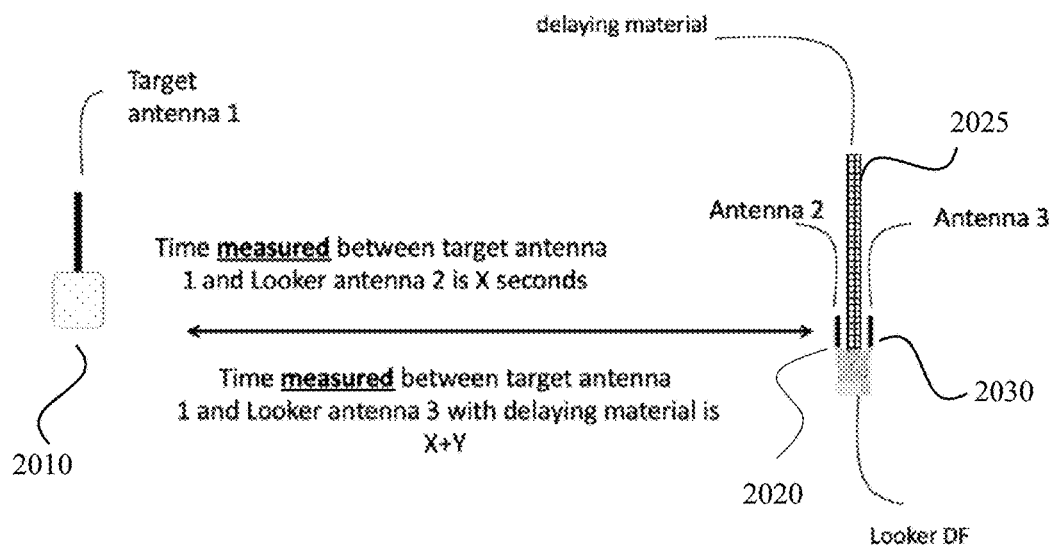
FIG. 20 shows a Target device wirelessly communicating with a Looker having multiple antennas, wherein an electromagnetic time delaying material is located between the antennas, according to exemplary embodiments of the subject matter.

FIG. 20 shows a Target device wirelessly communicating with a Looker having multiple antennas, wherein an electromagnetic time delaying material is located between the antennas, according to exemplary embodiments of the subject matter. The target device 2010 exchanges wireless signals with both close antenna 2020 and far antenna 2030 of the Looker. A sheet or any other form factor of electromagnetic time delaying material 2025 is located between close antenna 2020 and far antenna 2030, such that the signals traveling between the target device 2010 and the close antenna 2020 do not pass through the electromagnetic time delaying material 2025 and the signals traveling between the target device 2010 and the far antenna 2030 pass through the electromagnetic time delaying material 2025.

The subject matter discloses a system for determining the relative location of the target device in DF systems designed or installed in small form-factor devices, where the antennas cannot be placed far away from one another—for example (but not limited to) in the range of 0.5-5 centimeters.

The DF system of the subject matter comprises a Looker device having multiple antennas surrounding the electromagnetic time delaying material. The term surrounding is defined as the two antennas are far enough from each other such that the signal exchanged with the target device is delayed when traveling through the electromagnetic time delaying material. The electromagnetic time delaying Material may be of in any shape, such as, but not limited to, circle, rectangular, and any other. The antennas may be non-directional or directional.

The DF system also comprises a Target conducting direct Wireless Communication with the Looker. The Looker receives Wireless communication transmitted from the Target. The antennas of the Looker are arranged in regard to the electromagnetic time delaying Material in such manner that the electromagnetic time delaying Material is placed between the multiple antennas.

A key element of the subject matter is using the electromagnetic time delaying Material causes an induced, intentional increased time difference of the TOF between the target device and the multiple antennas of the Looker. The electromagnetic time delaying material increases the time difference between the antennas, as the signal travels through the electromagnetic time delaying material differently based on the relative direction of the Target device and the arrangement of the antennas around the electromagnetic time delaying material.

For example, in case the signal sent by the target and received at the Looker's multiple antennas without the electromagnetic time delaying material, a very sensitive and accurate measurement in optimal conditions (no multipath, reflections, clear LOS) is required to calculate a distance difference of several centimeters between the antennas (based on the time measured at each antenna. However, placing the electromagnetic time delaying material between the antennas of the Looker causes results in a calculated distance difference of 50-100 cm (while the actual physical distance is 3 cm). The Looker receives the wireless communication from the Target and measures for each antenna the time taken for the signal to travel. The Looker device comprises a processor, microprocessor, or any type of computing resources to measure the time the signal traveled. The Looker also comprises a computing resource utilized to compare the difference in TOFs caused by the electromagnetic time delaying Material of the wireless communication at each antenna. When the same signal is received at the multiple antennas, the Looker measures the time difference in the arrival of the signal, or in the arrival of a message from each of the antennas. The message may be an acknowledgement message indicating that the signal was received at the antenna.

As the arrangement of the multiple antennas at the Looker are known a-priori vs a set heading of the Looker, the comparison is used to determine which antenna of the multiple antennas is closer to the Target. Based on this determination a direction from the Looker to the Target is determined. For example, in a possible embodiment the Looker may have only 2 antennas 20220, 2030 having an electromagnetic time delaying Material 2025 between them. A front antenna 2020 is allocated as the "front" in regard to the Looker's heading, while the rear antenna 2030 is allocated at the "back". If a Target 2030 is present in the "Front" of the Looker, the front antenna 2020 at the Looker will measure a shorter TOF to the Target 2010 than the rear antenna 2030 that has the electromagnetic time delaying Material 2025 in the direct path between the rear antenna 2030 to the Target 2010. The result is the ability to determine that the Target 2010 is in Front of the Looker. The electromagnetic time delaying Material 2025 is intentionally used to increase the time difference measured at each antenna, and to do so in a controlled manner.

The subject matter also discloses the equivalent method applied when the DF system comprises more than two antennas at the Looker. For example, a Looker may have 2 pairs of antennas, a total of 4 antennas. One pair may be assigned as Front Vs. Back of the Looker and the other pair is assigned as Right Vs Left. The method comprises obtaining or placing an electromagnetic time delaying Material between the antennas of the pair. The Looker's heading may be defined at the Front (i.e., defined as 0 degree). The Target device may be positioned at 45 degrees from the Looker's perspective heading. By exchanging wireless signals between the target device and the four (4) antennas of the Looker and measuring the travel time of the signal traveling between the target device and each of the antennas, the method can determine that the Target device is located at the Front side and at the Right side relative to the Looker's heading.

The subject matter also discloses an equivalent method applied as a reversed DF method. The reverse method is based on the reciprocity principle in antenna. According to this method, the Target device transmits the wireless communication via multiple antennas in the antenna pairs, having the electromagnetic time delaying Material between the antennas, while the Looker may use a single antenna to receive. In this method the Looker obtains a-priori the antenna arrangement of the Target.

The method disclosed herein may also comprise an initial or periodic calibration performed by the DF system by exchanging communication between the opposing antennas of the DF system while the electromagnetic time delaying Material is placed between the antennas, to measure the TOF delay factor caused by the electromagnetic time delaying Material. By obtaining the known actual distance between the antennas in the pair, and by obtaining the calculated distance with the electromagnetic time delaying Material (i.e., the expected time delay at a given frequency for the specific electromagnetic time delaying Material in the specific Looker), the expected delaying time is computed and stored as a "delaying factor". The value that indicates the expected delaying time may differ from device to device and from expected delaying time to the other, and at different frequencies.

Figure 24:
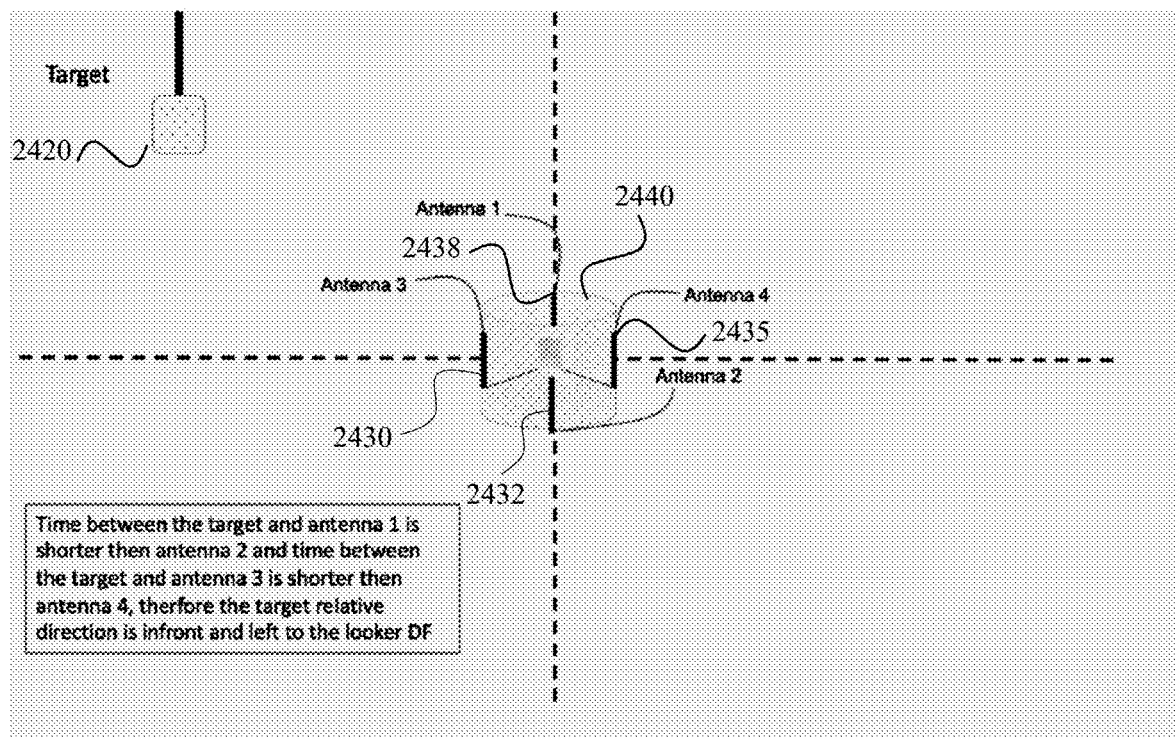
FIG. 24 shows a DF system for determining a relative direction of a target device based on travel TOF of a wireless signal, wherein the looker comprises four antennas having an electromagnetic time delaying Material between them, according to exemplary embodiments of the subject matter.

The relative direction of the target device may be computed using a single pair of antennas, which enable the DF system to basically determine if the target is at the front/back, OR right/left, as elaborated herein. In case the DF system comprises 2 pairs of antennas, (i.e. 4 antennas), the pairs may be perpendicular to each other (as shown in FIG. 24) the DF system can determine both front/back and right/left—i.e., in which quarter. The pairing may be with non-opposite antennas, to provide the DF system with additional information concerning the difference in TOFs between antennas surrounding the time delaying electromagnetic material.

In some other cases, the method may comprise comparing the received time differences between antennas which are not antennas in an opposing pair.

If the target is equipped with a DF system (and not just a radio and antenna), the DF system and the target may exchange information so that the DF system sends a command to the target to use various antennas while the DF system uses a single antenna. by comparing the received time difference between various antennas in the Looker, the DF system can find the target's direction towards the DF system: front, back, left, right etc.

Figure 21:
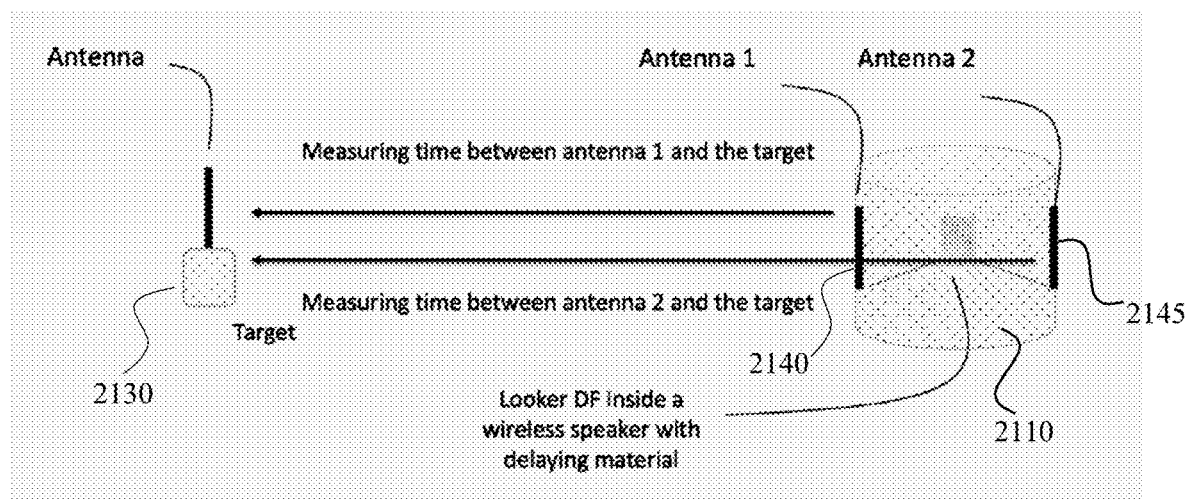
FIG. 21 shows a Target device communicating a looker device having multiple antennas integrated in a speaker device, according to exemplary embodiments of the subject matter.

FIG. 21 shows a Target device communicating a looker device having multiple antennas integrated in a speaker device, according to exemplary embodiments of the subject matter. The speaker 2110 comprises the electromagnetic time delaying Material. The target device 2130 communicates with both antennas 2140 and 2145. Signal sent between antenna 2145 and target device 2130 is required to travel at least partially via the speaker 2110 having the electromagnetic time delaying Material.

The subject matter also discloses a method to determine the relative direction of a Target by using the DF system integrated in the speaker. The method comprises allocating "direction" for the antennas 2140 and 2145 of the Looker, for example by defining a Heading for the Looker and associating the antennas 2140 and 2145 with this heading, having the electromagnetic time delaying Material between the antennas 2140 and 2145. For example, in a preferred embodiment, when the speaker comprises a Looker having a specific side or point (if it is circular) defined as "front" and the antenna is located on the opposite side shall be defined as "Back".

In another exemplary embodiment, the Looker may be a mobile electronic device such as a smartphone, or a mobile electronic device having a Looker, having the rear side defined as "back" and a display side defined as "front. The method then comprises conducting Wireless communication between the Looker and the Target, via only one of the antennas 2140 and 2145 of the Looker. Then, the method comprises measuring at the Looker the time it took the signal to travel from the Target to the specific antenna. Then, the method comprises conducting Wireless communication between the Looker and the Target, via the other antenna of the Looker. The other antenna may be the antenna located away from the target, such that the electromagnetic time delaying Material is located between the other antenna and the Target. Then, the method comprises measuring at the Looker the time it took the signal to travel from the Target to the other antenna and compare the TOFs measured by both antennas. Then, the method comprises determining if the Target is either at "Front" or "Back" by comparing the TOFs measured at the antenna defined as "Front" vs the one defined as "Back". For example, if the Target was in front of the user, the time measured in the Front antenna is shorter than the time measured in the Back antenna, due to the delay of the signal arriving to the Back antenna induced by the electromagnetic time delaying Material. The method can be used to determine if a Target is elevated from the Looker (i.e., located above or below) by having the Looker's antennas positioned one above the other in such manner that the electromagnetic time delaying Material is in between them.

Figure 22:
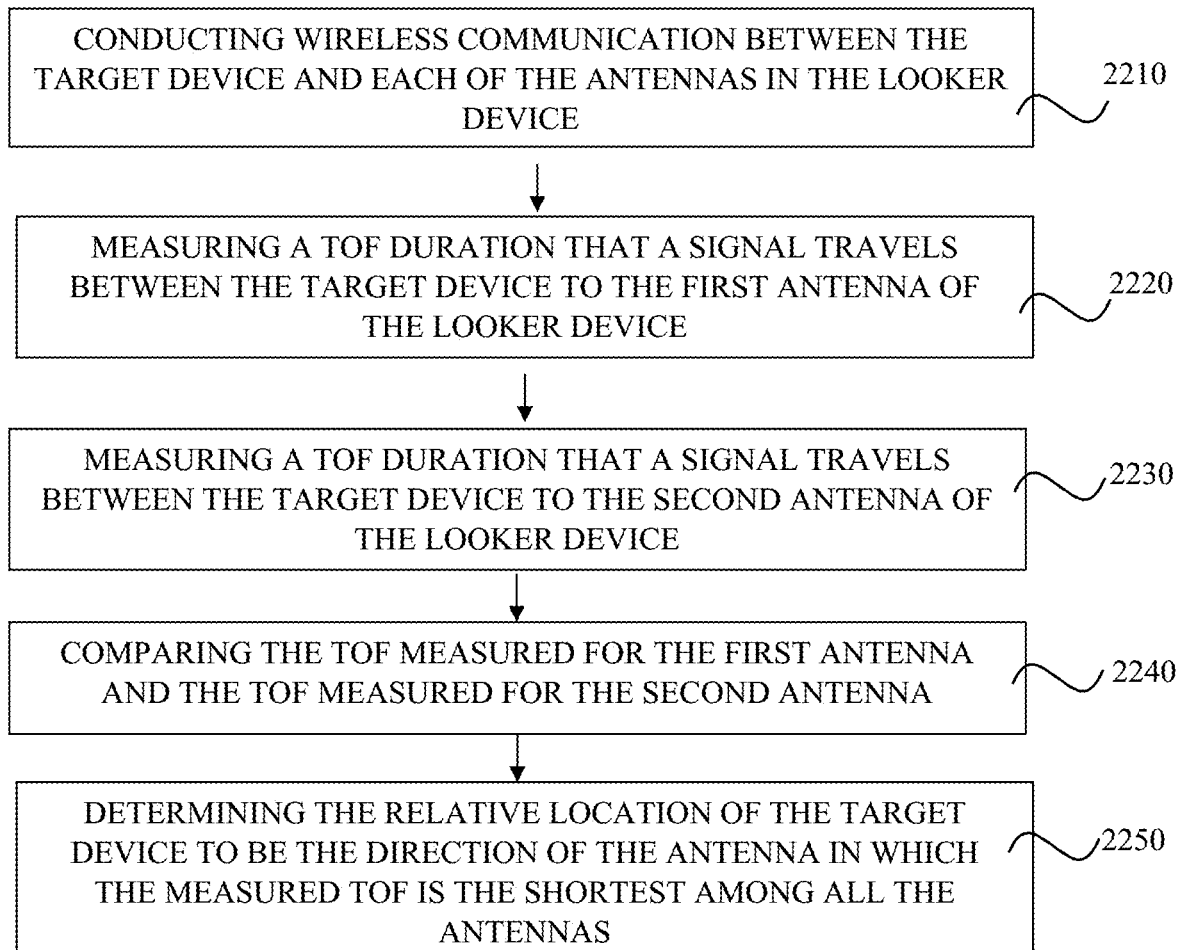
FIG. 22 shows a method for determining a relative direction of a target device based on travel time of a wireless signal, according to exemplary embodiments of the subject matter.

FIG. 22 shows a method for determining a relative direction of a target device based on travel time of a wireless signal, according to exemplary embodiments of the subject matter.

Step 2210 discloses conducting wireless communication between the target device and each of the antennas in the looker device. The wireless communication may be in any technique desired by a person skilled in the art, such as RF, wi-fi, Bluetooth, zig-bi, UWB and the like, and in any preferred frequency. In some exemplary cases, the same signal is sent at the same time to multiple antennas in the looker device. In some other cases, the target device comprises multiple antennas exchanging wireless communication with a single antenna in the looker device.

Step 2220 discloses measuring a TOF duration that a signal travels between the target device to the first antenna of the looker device. The TOF duration may indicate the travel time from the target to the first antenna, from the first antenna to the target, or both.

Step 2230 discloses measuring a TOF duration that a signal travels between the target device to the second antenna of the looker device. The TOF duration may indicate the TOF time from the target to the second antenna, from the second antenna to the target, or both.

Step 2240 discloses comparing the TOF measured for the first antenna and the TOF measured for the second antenna. The method also applies for measuring the TOF duration of three or more antennas, and comparing the TOF duration of the travel time between the target device and the three or more antennas.

Step 2250 discloses determining the relative location of the target device to be the direction of the antenna in which the measured TOF is the shortest among all the antennas.

In some cases, the DF system may comprise another pair of antennas placed in such manner that each antenna is on a "side" of the Looker, thus enabling differentiating if a Target is Right or Left, in addition to front or back. In some other cases, an IoT object may have two (2) pairs of antennas—the first pair having an antenna in the Front and another antenna in the Back, while the other pair of antennas having an antenna on the right side and another antenna on the left side.

Figure 23:
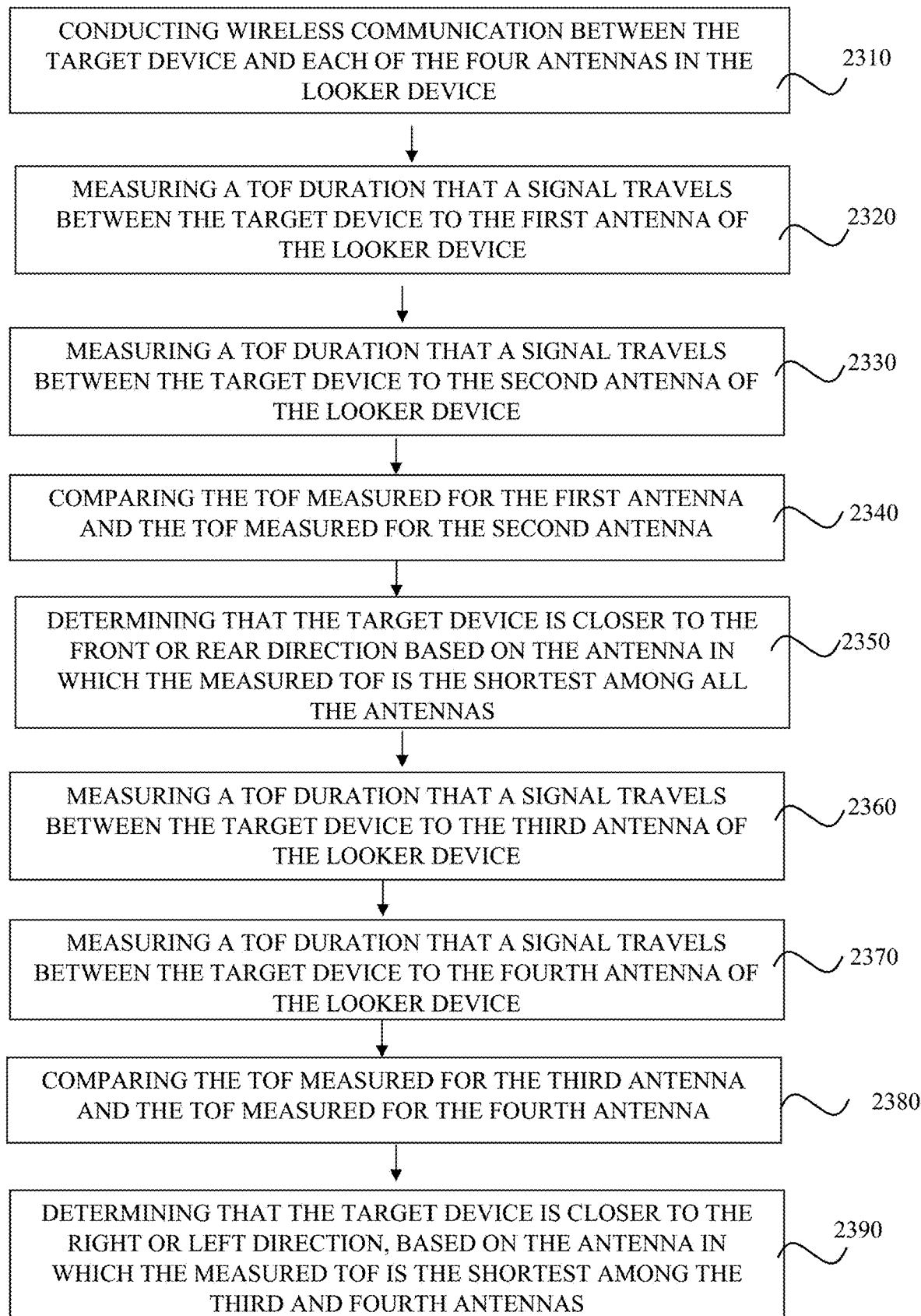
FIG. 23 shows a method for determining a relative direction of a target device based on TOF travel time of a wireless signal, wherein the looker comprises four antennas having an electromagnetic time delaying Material between them, according to exemplary embodiments of the subject matter.

FIG. 23 shows a method for determining a relative direction of a target device based on TOF travel time of a wireless signal, wherein the looker comprises four antennas having an electromagnetic time delaying Material between them, according to exemplary embodiments of the subject matter.

Step 2310 discloses conducting wireless communication between the target device and each of the four antennas in the looker device. The four antennas may be arranged around the circumference of an imaginary circle, such that each antenna is assigned a direction from: 1. The first antenna may be in the Front side. 2. The second antenna may be in the Rear side. 3. The third antenna may be in the Right side. 4. The fourth antenna may be in the Left side. The wireless communication may be in any technique desired by a person skilled in the art, such as RF, Bluetooth, zig-bi, UWB and the like, and in any frequency. In some exemplary cases, the same signal is sent at the same time to multiple antennas in the looker device. In some other cases, the target device comprises multiple antennas exchanging wireless communication with a single antenna in the looker device.

Step 2320 discloses measuring a TOF duration that a signal travels between the target device to the first antenna of the looker device. The TOF duration may indicate the travel TOF from the target to the first antenna, from the first antenna to the target, or both.

Step 2330 discloses measuring a TOF duration that a signal travels between the target device to the second antenna of the looker device. The TOF duration may indicate the travel time from the target to the second antenna, from the second antenna to the target, or both.

Step 2340 discloses comparing the TOF measured for the first antenna and the time measured for the second antenna. The method also applies for measuring the TOF duration of three or more antennas, and comparing the TOF duration of the travel time between the target device and the three or more antennas.

Step 2350 discloses determining that the target device is closer to the front or rear direction, based on the antenna in which the measured TOF is the shortest among the first and the second antennas.

Step 2360 discloses measuring a TOF duration that a signal travels between the target device to the third antenna of the looker device. The TOF duration may indicate the travel time from the target to the third antenna, from the third antenna to the target, or both.

Step 2370 discloses measuring a TOF duration that a signal travels between the target device to the fourth antenna of the looker device. The TOFs may indicate the travel time from the target to the fourth antenna, from the fourth antenna to the target, or both.

Step 2380 discloses comparing the TOF measured for the third antenna and the time measured for the fourth antenna. The method also applies for measuring the TOF duration of three or more antennas, and comparing the TOF duration of the travel time between the target device and the three or more antennas.

Step 2390 discloses determining that the target device is closer to the right or left direction, based on the antenna in which the measured TOF is the shortest among the third and fourth antennas.

FIG. 24 shows a DF system for determining a relative direction of a target device based on travel TOF of a wireless signal, wherein the looker comprises four antennas having an electromagnetic time delaying Material between them, according to exemplary embodiments of the subject matter.

The target device 2420 exchanges wireless communication with four antennas 2430, 2432, 2435 and 2438. An electromagnetic time delaying material 2440 is located between the four antennas 2430, 2432, 2435 and 2438 such that a signal traveling between each of the antennas 2430, 2432, 2435 and 2438 and the target device 2420 travels a different path via the electromagnetic time delaying material 2440 in at least two of the four antennas 2430, 2432, 2435 and 2438. This way, when a signal is exchanged between the target device 2420 and each of the four antennas 2430, 2432, 2435 and 2438, the travel TOF of the signal with each of the four antennas 2430, 2432, 2435 and 2438 is different.

The subject matter also discloses a method in which the Looker has several antenna pairs, and may have an odd number of antennas. The pairs can be used to improve both reliability and reduce the sector size/width of relative direction in which a Target is determined. The pairs may be used to verify the results of other pairs. The pairs may be used to create overlapping sectors of relative directions. In some cases, said system may be used in such manner that a specific antenna can be selectively paired with other antennas—not necessarily antennas that are opposite. For example, a specific front antenna may be compared with results of 3 different back antennas (instead of using 3 pairs of antennas in which in each pair there are opposite antennas—a front antenna and back antenna).

The subject matter also discloses a method to determine the relative direction of a Target vs the Looker, using one or more sensors, such as a pressure sensor and/or a light sensor placed near each antenna. Data from such sensors may be used to determine if an antenna has open space in front of it. For example, a pressure sensor may be used to determine that an antenna located in the rear side of a shirt has pressure applied to it, which may mean that the user is sitting on a chair with his back pressed to the chair. The light sensor may be used for the same purpose. The data from the sensors can be used as part of the Quality factor provided to the data measured in an antenna or even to determine that in a specific condition identified using the data collected by the sensors the measured data should not be used.

The subject matter also discloses a method to determine the relative directions between at least one Target and one Looker. According to this method, each object having the system can be either a Target or a Looker or both. According to the embodiment of this method, a Looker may communicate with one antenna only in the Target in a given moment. In a similar manner to the Looker determining the relative direction of the Target vs its Heading, the Target can determine the relative direction of the Looker. In some cases, the Looker may determine the orientation of the Target—for example, to determine that another user is facing the target.

The subject matter also discloses a method to customize the system for a specific device, comprising obtaining the item in which the Looker system is integrated into. Such item may be, for example, a smart speaker, car key-fob, remote control device, smart glasses, smartphone, clothing item and the like. Then, the method comprises positioning the Looker in such manner that the Looker is placed in the position it will use the device itself, its components and encasing as the Delaying Material without placing a dedicated electromagnetic-delaying material.

Figure 25:
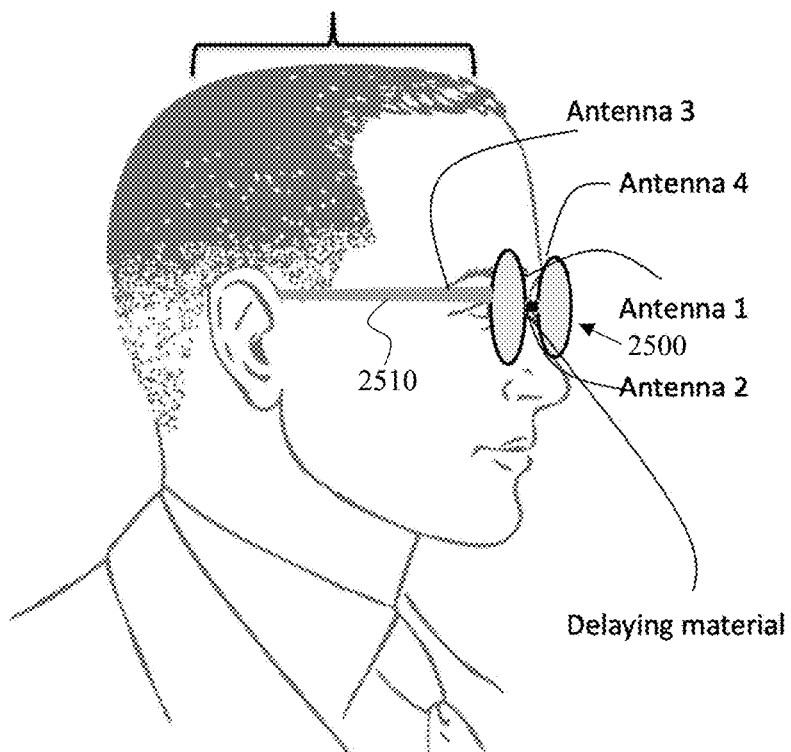
FIG. 25 shows multiple antennas located on spectacles, according to exemplary embodiments of the subject matter.

FIG. 25 shows multiple antennas located on spectacles, according to exemplary embodiments of the subject matter. The looker system may be installed in the spectacles 2500, for example as electrical circuitry coupled to one of the temples 2510, of the spectacles. The method then comprises establishing wireless communication between the antennas in the Looker's system, for example between opposite antennas, and measuring the TOF as the signal travels between the opposite antennas. For example, the looker system comprises 4 antennas, antenna 1, antenna 2, antenna 3 and antenna 4. Antennas 3 and 4 are defined as opposite antennas, are coupled to the spectacles' temples, while antennas 1 and 2, also defined as opposite antennas, are coupled to the spectacles' frame. The measured time is stored in a memory accessed to the Looker. The opposite antennas may be placed in temples of a smart glasses' device. In another exemplary embodiment, the wearable device is a bracelet or a watch with a band placed around a person's limb, such as arm or leg, and the person's body tissues act as the electromagnetic time delaying material, with or without having delaying material in the bracelet or watch's band as well.

After the TOF duration is measured, the method comprises placing the device or object functioning as an electromagnetic time delaying material between the antennas of the Looker—for example, by the user wearing the glasses and having his head used as the electromagnetic time delaying material. The method comprises repeating the process in which each antenna in the Looker's system wirelessly communicating with its opposite antenna—in such manner that the electromagnetic time delaying material is placed between the antennas—and measuring the travel TOF associated with each antenna. For example, in a Looker item which is a smart watch, when the user wears the watch, one antenna can be integrated in the display side, and one antenna can be integrated in the band's lower side, having the person's arm function as the electromagnetic time delaying material. In the same embodiment, the watch's band may be made or include electromagnetic time delaying material.

The measured times may be used to determine the relative direction of a Target, as elaborated below. First, when the Target is more or less on the same imaginary line drawn between two of the Looker's antennas, the measured TOF difference between the TOFs of the Looker's antennas should be reflected in the results of the TOF measured at of each antenna with the Target.

The expected delayed time between the opposite antennas may be pre-calculated and stored at the Looker as reference defined as customization time. If a time difference between two antennas of the Target is lower than the customization time, it may indicate that Target is not necessarily on the same imaginary line, and the system may selectively choose to ignore and/or use data from other pairs and/or determine that the Target's relative direction is to either side of the said "virtual line". Said basic measurement without the Delaying Material may be done in advance (for example, as part of the production, quality assurance, or factory setting processes). Said calibration process may be applied between all the antennas in the system—one vs the other.

In some cases, the customization method is performed when the system comprises at least one elastic pressure/stretch sensor. The sensor may be used to determine the elastic pressure/stretch applied on the device/object in which the Looker system is integrated. For example, the sensor may be used to determine if a shirt is being worn in such manner that it is pulled tight of the user body or loose. The data may be used to determine the possible deviation of the factory calibration, as part of the calibration process. The data collected by the sensors may indicate that a pressure is applied on the shirt's fabric, in such manner that it is not probable that the factory-setting measured time is maintained, and the de-facto time measurement between said antennas is exceeds a pre-defined threshold. The system may include a database of reference measurements of the signal between said antennas at different time measurement between them. Upon determining the de-facto time measured, the corresponding reference electromagnetic time delaying material is applied in the rest of the customization process. The integration of said sensor or sensors can be used to further customize the system to different devices or different users. For example, a shirt having such Looker system in the same size may be worn by a thin person and a fat person, resulting in different stretch pressures and different de-facto distances between the antennas in the system.

In some cases, the system also comprises at least one type of electromagnetic time delaying material, composed from at least one type of material having selective delaying properties. The electromagnetic time delaying material may be composed from several types of materials, each having its delaying properties.

In some cases, the system comprises multiple electromagnetic time delaying material elements may be placed and/or attached to at least one antenna and/or light sensor and/or sound sensor in such manner that the material will delay the wave in a predefined direction. For example, said Delaying Material may be placed in such manner that it is not in possible LOS between a Target and a Looker—i.e., the Delaying Material is placed behind the antenna/sensor. In some cases, the system comprises multiple electromagnetic time delaying material elements.

In some cases, the system of the subject matter comprises a mechanism to change or adjust properties of the electromagnetic time delaying material, for example increase or decrease the time delay. The change may be controlled over a predefined scale of change. The change may include at least one of the following—electrical parameters, chemical parameters, form-factor parameters, density parameters, temperature, conductivity and a combination thereof. The change may be implemented by controlled merging/integration or separation of at least 2 different Delaying Materials;

In some cases, the electromagnetic time delaying material may be selectively composed from materials having properties that delay the wave either partially or totally. In some cases, the electromagnetic time delaying material may have predefined properties corresponding with the wave type and/or frequency it is aimed to delay;

In some cases, the system may comprise a main sheet (or other form factor) of electromagnetic time delaying material and an additional/secondary sheet (or other form factor) of electromagnetic time delaying material placed behind each antenna within the Looker system in order to increase the delay.

In some cases, the system of the subject matter comprises at least one tilt sensor. The tilt sensor may be physically secured to a specific antenna. The tilt sensor many be placed near one of the antennas. The tilt sensor may be used to monitor the horizontal and/or vertical alignment and change in alignment of each antenna. For example, the tilt sensor may monitor that when the user carrying the antennas is standing, antennas 1-4 are vertical relative to the horizon, and when the user is lying the antennas are perpendicular relative to the horizon.

In some cases, the subject matter also discloses a method for collecting data from the sensors to differentiate between finding direction of the target on the horizontal plain (front/back/right/left) versus finding directions for targets on the vertical plain (up/down/same level . . . ). The method also comprises receiving data from the tilt sensor, determining for each antenna pair containing opposite antennas if they are one behind each other or one above each other using a predefined configuration and the data from the tilt sensor.

In some cases, the system comprising at least one Looker and at least one Target, wherein the Looker has at least one antenna and the Target has at least 2 antennas. In such case, the antennas may be placed (but not limited to) in the object comprising the Target in such manner that one antenna is located opposite the other in relation to the Target's sides. For example, one antenna is located on the front of a speaker while the other antenna is located on the back; or one of the front of a chair while the other on the back. The antennas may be placed in the object in other configurations—i.e., not only opposite or opposite in pairs. The antennas may be connected to the same radio component, or each may have its own radio component. The opposing antennas in the Target will have a Delaying Material between them;

Said electromagnetic time delaying material may be a dedicated electromagnetic time delaying material, or a combination of the body of the user and a dedicated electromagnetic time delaying material, for example, by integrating into the fabric of a shirt Delaying Material beneath the antenna element.

In some cases, the Looker and/or Target may be embedded in a clothing/apparel item, for example, but not limited to, shirts, pants, shoes, hats, dresses, sox, coats, sweaters uniforms, and the like. The Looker and/or Target may be embedded in an electronic wearable item, for example, but not limited to, smart watch, bracelet, glasses, electronic device casing and the like. In some cases, the Looker and/or Target may be any other object, such as—but not limited to—furniture item, part of a structure (for example, by integrating to a wall or by placing it on a support/decorative column).

In some cases, the wireless communication between the target device and the antennas of the looker comprises light waves. In some cases, the wireless communication between the target device and the antennas of the looker comprises sound waves. In such cases, the devices in the looker and target comprise light or sound emitting modules, as well as light or sound sensors. The light sensor may be capable to detect light waves or sound waves in frequencies that can move through the human body.

Figure 26:
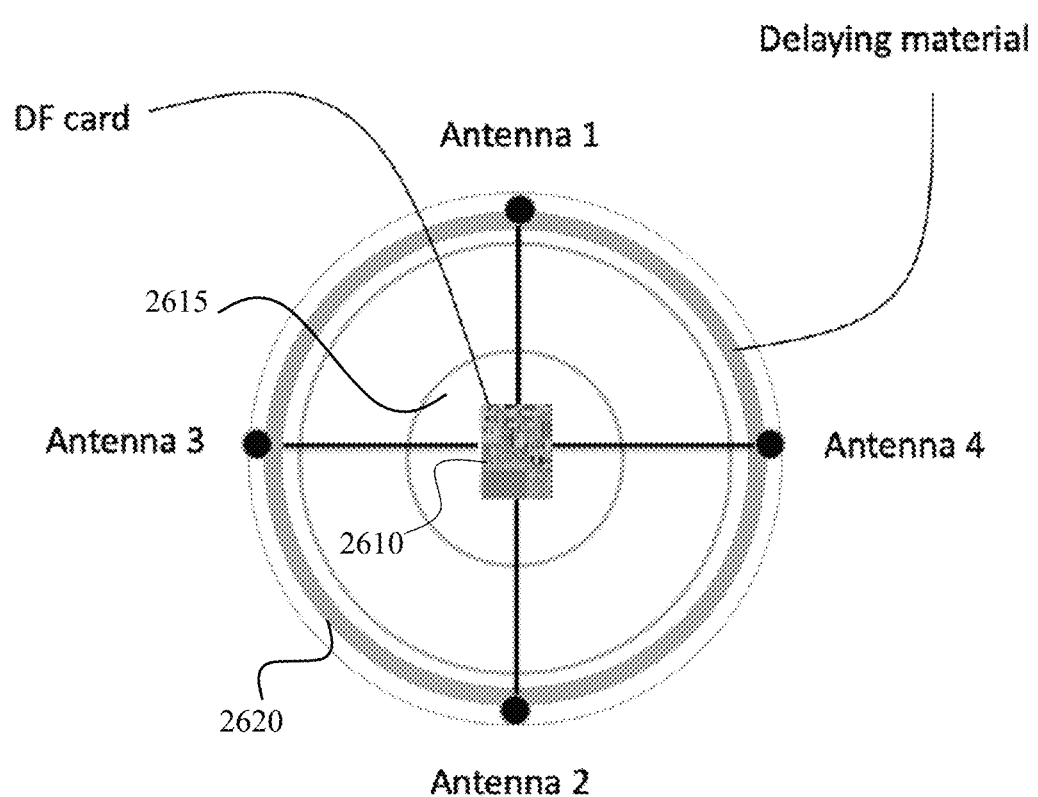
FIG. 26 shows a DF system having a Looker is placed in a cavity or a space in the device, in such manner that the electromagnetic time delaying material encompass the cavity, according to exemplary embodiments of the subject matter.

FIG. 26 shows a DF system having a Looker is placed in a cavity or a space in the device, in such manner that the electromagnetic time delaying material encompass the cavity, according to exemplary embodiments of the subject matter. The looker device 2610 comprises electrical circuitry such as a processor or microprocessor and a wireless communication module for receiving information from the antennas 1, 2, 3 and 4. The looker device 2610 is located inside a cavity or a niche 2615 encompassed by the electromagnetic time delaying material 2620, while antennas 1, 2, 3 and 4 are located outside the electromagnetic time delaying material 2620. The subject matter also discloses a DF apparatus/device comprising a Looker, at least one pair of antennas each communicating with the Looker. The looker is placed in a cavity or a space in the device, in such manner that the electromagnetic time delaying material encompass the cavity. The electromagnetic time delaying material may encompass the cavity from all sides, or only in the vertical plane, or only in the horizontal plane. The antennas are placed outside the cavity in such manner that the electromagnetic time delaying material is located between the antennas and the Looker, as well as between each antenna of the multiple antennas. The electromagnetic time delaying material may be part of the device outer packaging/case. Said electromagnetic time delaying material encompassing may be an external element of the device outer packaging/case, for example attached to the device in any applicable manner. The electromagnetic time delaying material may contain multiple layers of material, may include multiple types of materials, may also be an absorbing material, may be of any shape and form factor.

The subject matter discloses a system and method for measuring and/or estimating and/or computing a distance between two electronic devices, also defined as a target device and a measuring device. The method provides for more accurate distance estimation, as it takes into consideration a directional factor influenced by the relative direction between the target device and a measuring device. The directional factor is extracted, or computed, from data associating between relative directions and directional factors. Such data may be stored in the measuring device or in a server or device accessible to the measuring device. The method then comprises obtaining a set of directional factors that define an offset in a distance estimation between the target device and the measuring device. The set of directional factors are provided in multiple directions between the target device and the measuring device. Then, the method comprises computing a distance measurement between the target device and the measuring device and computing a relative direction between the measuring device and the target device. Then, the method comprises retrieving or extracting a directional factor associated with the computed relative direction, wherein said directional factor is extracted from the set of directional factors and computing the distance between the target device and a measuring device based on the distance estimation and the directional factor that matches the computed relative direction.

The subject matter uses direction-finding techniques, methods and technologies—either in 360 degrees or in a specific direction or in a specific sector of directions—to improve distance ranging estimation between the measuring device and the target device. By having the measuring device determine the direction to the target device, said direction can be used to enable the measuring device to determine the effects of components and/or materials and/or elements of the measuring device that are in the line-of-sight (LOS) between measuring device and the Target device, in the determined direction. These effects may cause attenuation of the signal and/or time-of-flight delay of the signal, or other measurable properties. These properties are used to calculate a distance estimation between the device to a Target device. These effects may be different for any given relative direction inside the measuring device having the DF unit, in such manner that there is a need to create a data structure, for example a table, to store these effects vs a device/DF's heading.

For example, the Directional Factor of the effect on TOF of the components and materials of the measuring device and the target device may be pre-estimated to be a delay of 2 ns (nano seconds) and/or 15 dB. When estimating a distance based on a time of flight (TOF), the result of the TOF may be 5 ns. The result of 5 ns does not take into account the delaying effect of the material in the given direction of the target device. By determining the relative direction, the Directional Factor of the 2 ns is taken into consideration, in such manner that the distance ranging estimation will be calculated per 3 ns (the measured 5 ns minus the 2 ns Directional Factor of the determined direction).

The same example may be applied to distance estimation based on signal strength. For example, the Directional Factor representing the effect of the components and materials on the signal may be pre-estimated to be an attenuation of 15 dB.

When estimating signal strength, the estimated result of the signal strength may be −70 dB. However, this result does not take into account the absorbing effect of the material in the given direction of the target. By determining the relative direction between the target device and the measuring device, the Directional Factor of the 15 dB is taken into consideration, such that the distance estimation will be calculated per −55 dB—the estimated −70 dB minus the 15 dB caused by the Directional Factor in the determined direction. This will result in a more reliable and accurate distance estimation.

Figure 27A:
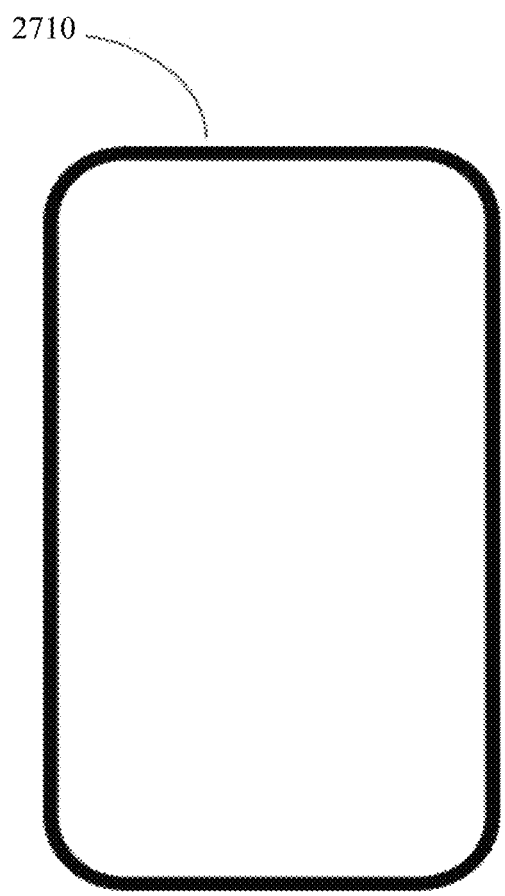
FIGS. 27A-27C show an electronic device and components included in an electronic device, according to exemplary embodiments of the subject matter.
Figure 27B:
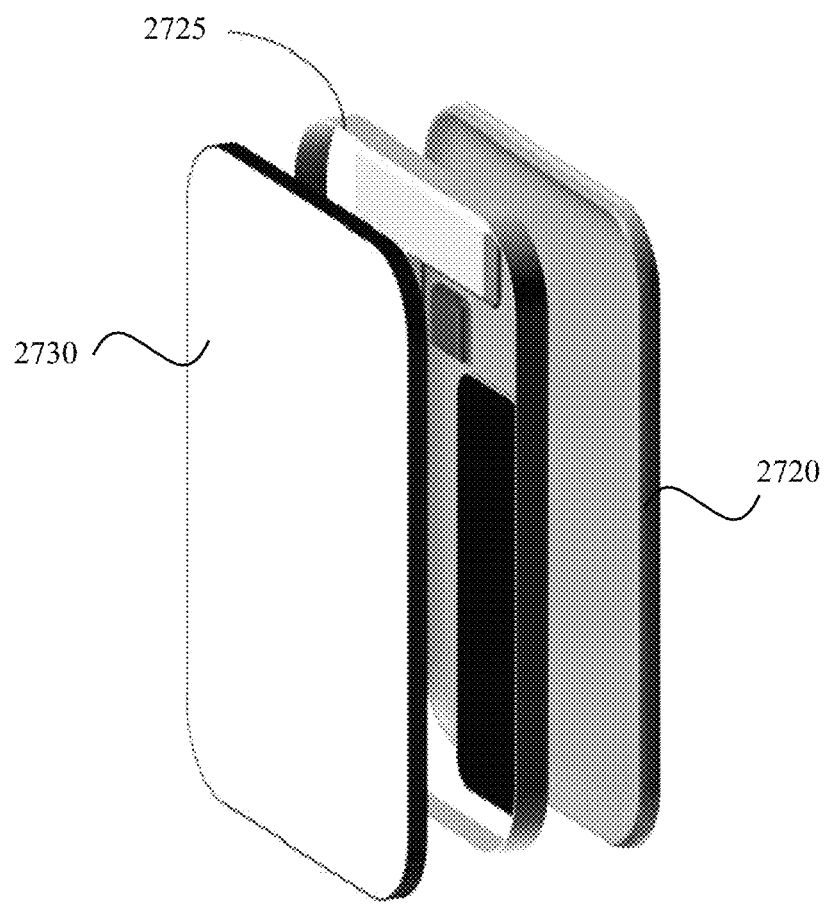
Figure 27C:
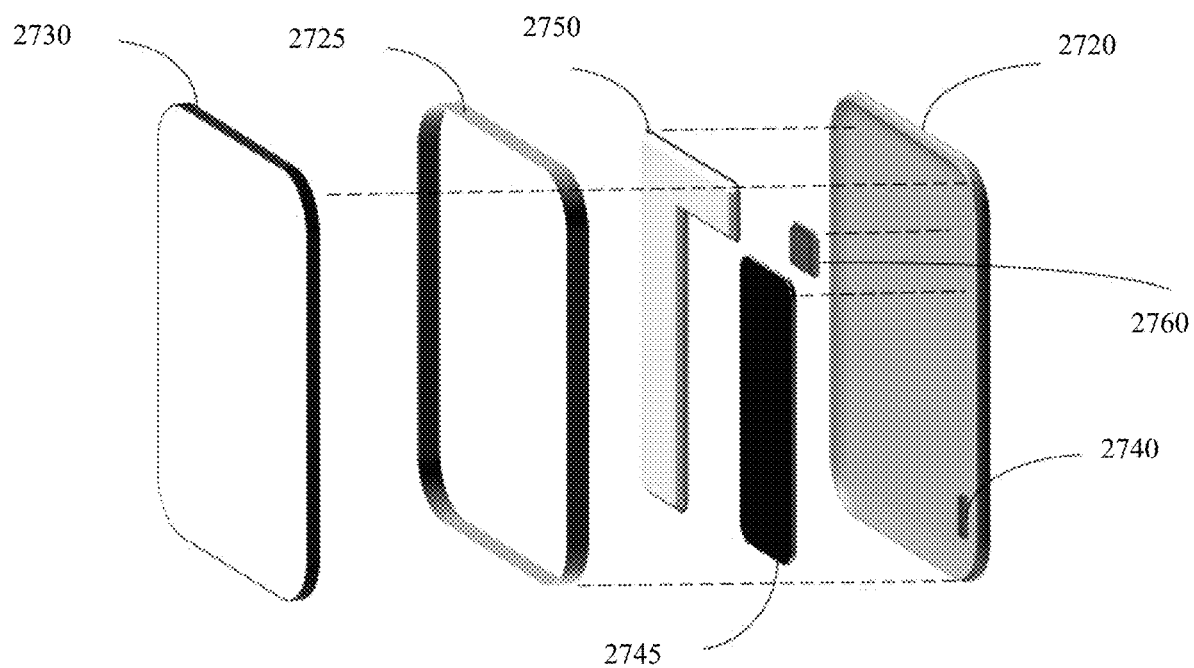

FIGS. 27A-27C show an electronic device and components included in an electronic device, according to exemplary embodiments of the subject matter. FIG. 27A shows a front view of an electronic device 2710, for example a device may be—buy not limited to—any type of electronic device or an object having an electronic device in to or connected to it, such as a smartphone (including foldable ones), laptops, cameras, smartwatch, speaker, TV, tablets, tag, VR & AR headsets and glasses, HMD (head-mounted display), gaming consoles, electronic device casing, smart clothes, IoT devices and sensors, furniture, cars, smart-city objects (traffic lights for example), smartphones, a pager and the like. The smartphone 2710 comprises a wireless transceiver for exchanging wireless signals, a battery, a memory and a processor for implementing at least some of the processes of the subject matter. The smartphone 2710 may function as a target device or as the measuring device.

FIG. 27B shows an electronic device such as smartphone 2710 split into layers located one next to the other. For example, the first layer includes screen 2730, the second layer includes body 2725 and the third layer includes a rear cover 2720. FIG. 27C shows an electronic device such as smartphone 2710 split into components. The components may include the screen 2730, the body's frame 2725, electrical circuitry 2750, battery 2745, wireless transceiver 2760, antenna 2740 and rear cover 2720. It should be noted that when the smartphone 2710 exchanges signals with another device, the antenna 2740 receives the signal after the signal passed at least one of the components listed above. Each of the components delays the propagation of the signal in a different manner, for example based on the chemical and physical properties of the component and/or the dielectric properties of the component and/or the length in which the signal propagates in the component. For example, the length in which the signal propagates in the screen 2730 may be 1.5 millimeters when the signal is received from a source located perpendicular to the screen 2730 or about 2.1 millimeters in case the signal is received from a source located 45 degrees from the screen 2730.

Figure 28A:
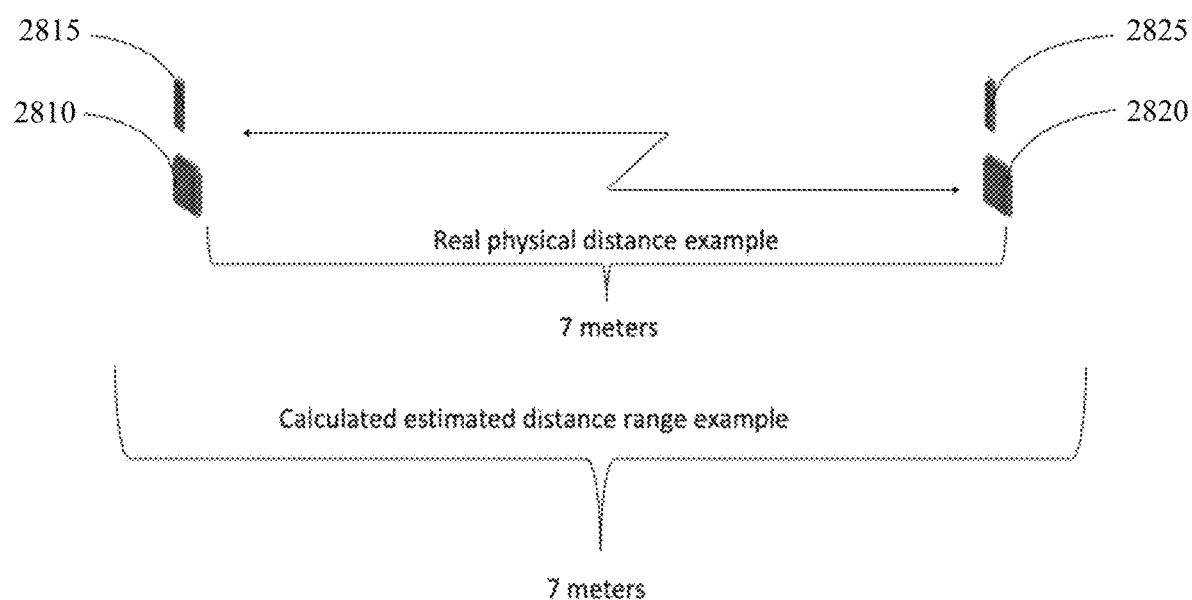
FIGS. 28A-28F show offsets in distance measurements caused by delaying the propagation of wireless signals exchanged between electronic devices, according to exemplary embodiments of the subject matter.

FIGS. 28A-28F show offsets in distance estimation caused by delaying the propagation of wireless signals exchanged between electronic devices, according to exemplary embodiments of the subject matter. FIG. 28A shows exchanging wireless signals without any obstacle located between the target device and the measuring device. For example, the target device comprises a wireless transceiver 2810 and target antenna 2815 and the measuring device comprises a wireless transceiver 2820 and measuring antenna 2825. Without considering the components of the target device and the measuring device, the measured distance is 7 meters. In other words, the actual distance between the target device and the measuring device is 7 meters. The measurement may be computed by dividing the signal's Time of Flight (TOF) by the signal's propagation velocity.

Figure 28B:
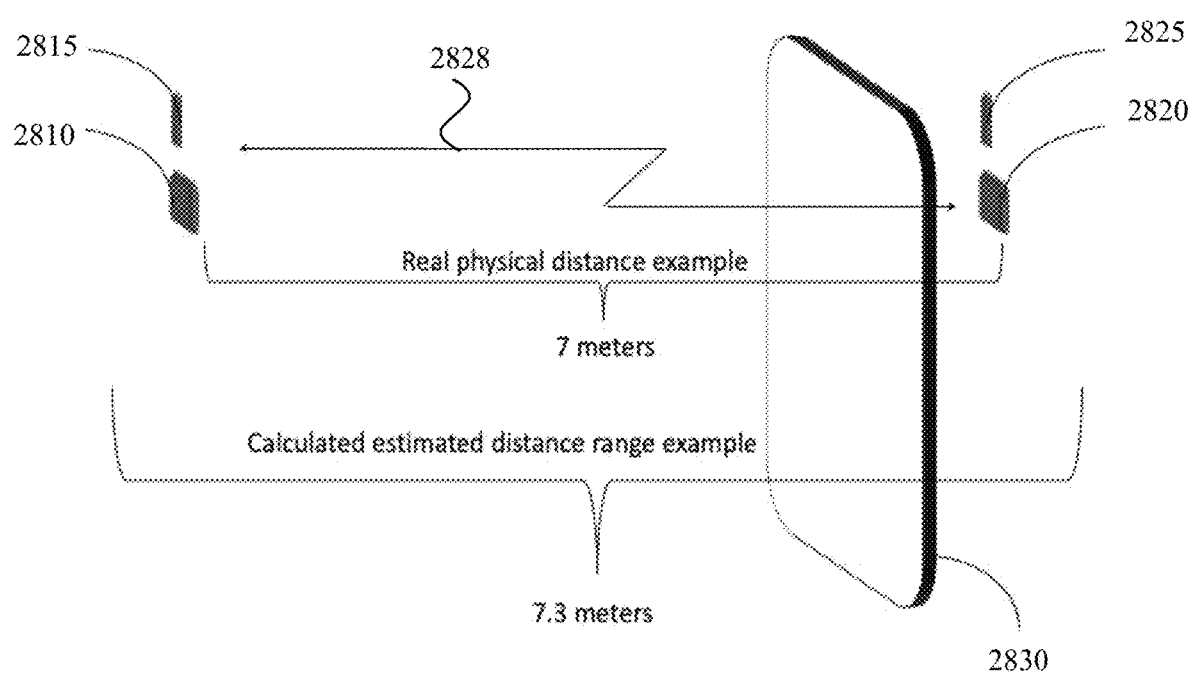

FIG. 28B shows a signal exchanged between the antennas 2815 and 2825. The signal 2828 propagates via screen 2830. The delay in propagation caused by the screen 2830 results in a distance estimation of 7.3 meters between the target device and the measuring device, while the actual distance between the target device and the measuring device is 7 meters. That is, the screen 2830 is responsible to an offset of 0.3 meters between the actual distance and the measured distance.

Figure 28C:
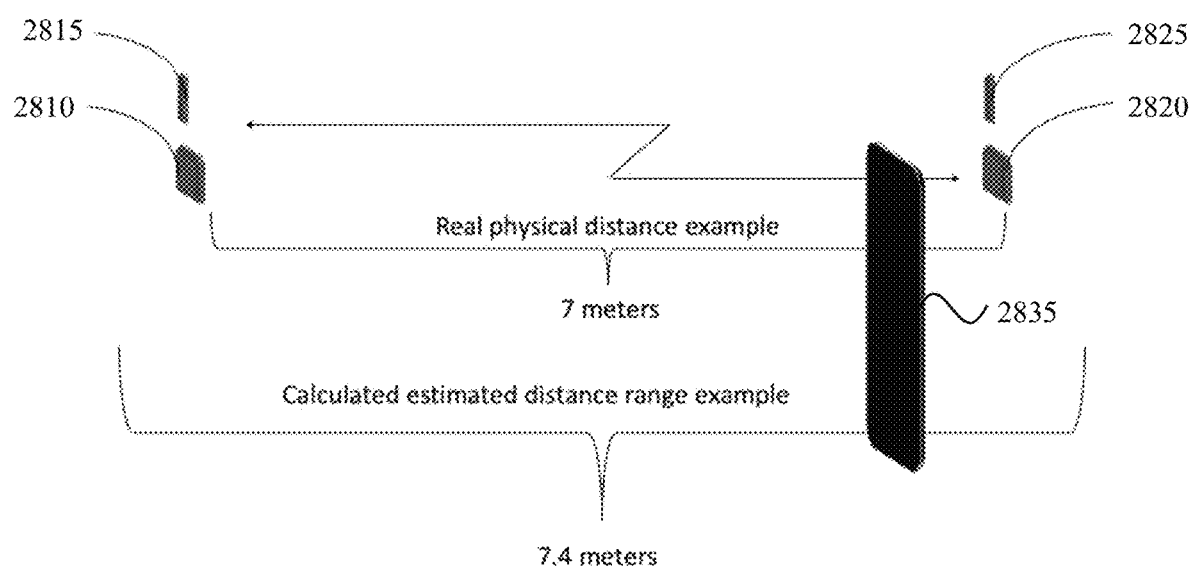

FIG. 28C shows a signal exchanged between the antennas 2815 and 2825. The signal 2828 propagates via battery 2835. The delay in propagation caused by the battery 2835 results in a distance estimation of 7.4 meters between the target device and the measuring device, while the actual distance between the target device and the measuring device is 7 meters. That is, the battery 2835 is responsible to an offset of 0.4 meters between the actual distance and the estimated distance.

Figure 28D:
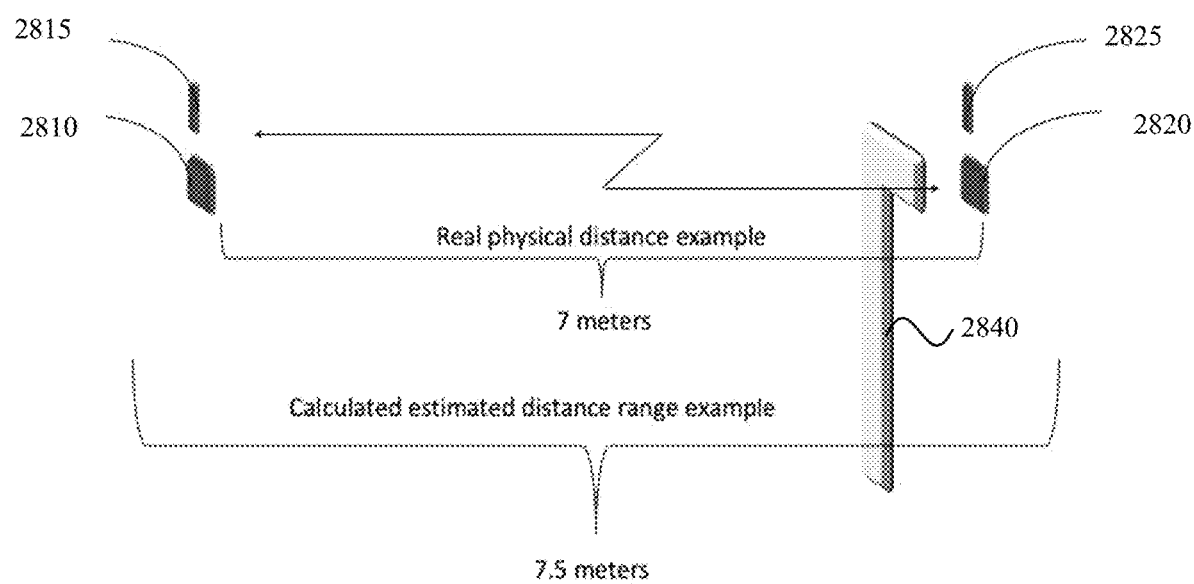

FIG. 28D shows a signal exchanged between the antennas 2815 and 2825. The signal 2828 propagates via circuitry 2840. The delay in propagation caused by the circuitry 2840 results in a distance estimation of 7.5 meters between the target device and the measuring device, while the actual distance between the target device and the measuring device is 7 meters. That is, the circuitry 2840 is responsible to an offset of 0.5 meters between the actual distance and the estimated distance.

Figure 28E:
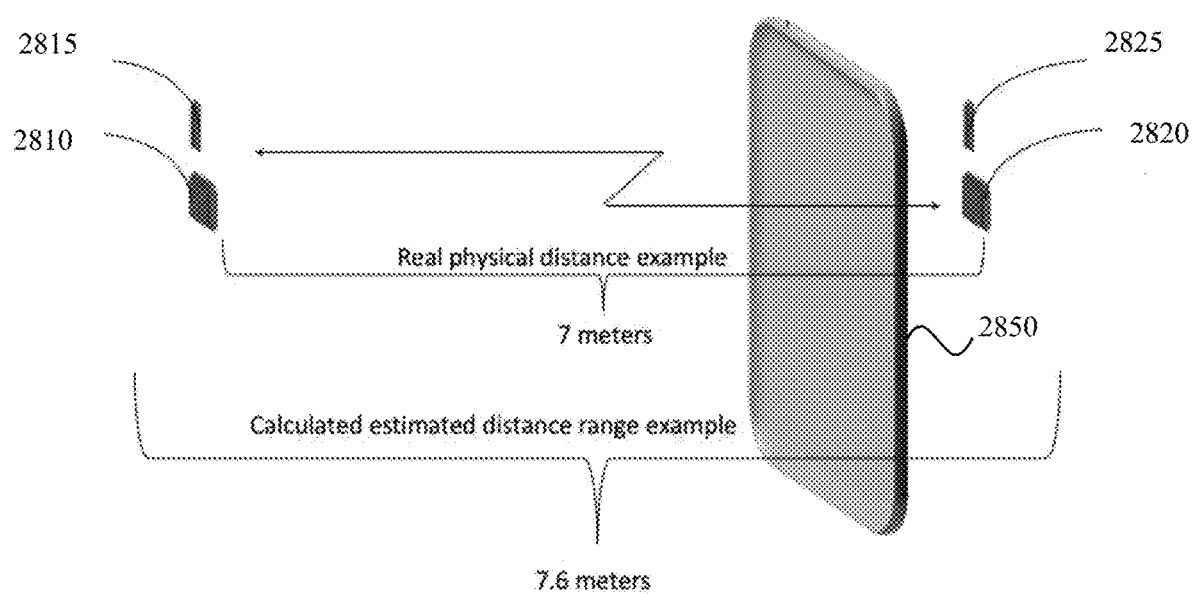

FIG. 28E shows a signal exchanged between the antennas 2815 and 2825. The signal 2828 propagates via rear cover 2850. The delay in propagation caused by the rear cover 2850 results in a distance estimation of 7.6 meters between the target device and the measuring device, while the actual distance between the target device and the measuring device is 7 meters. That is, the rear cover 2850 is responsible to an offset of 0.6 meters between the actual distance and the estimated distance.

Figure 28F:
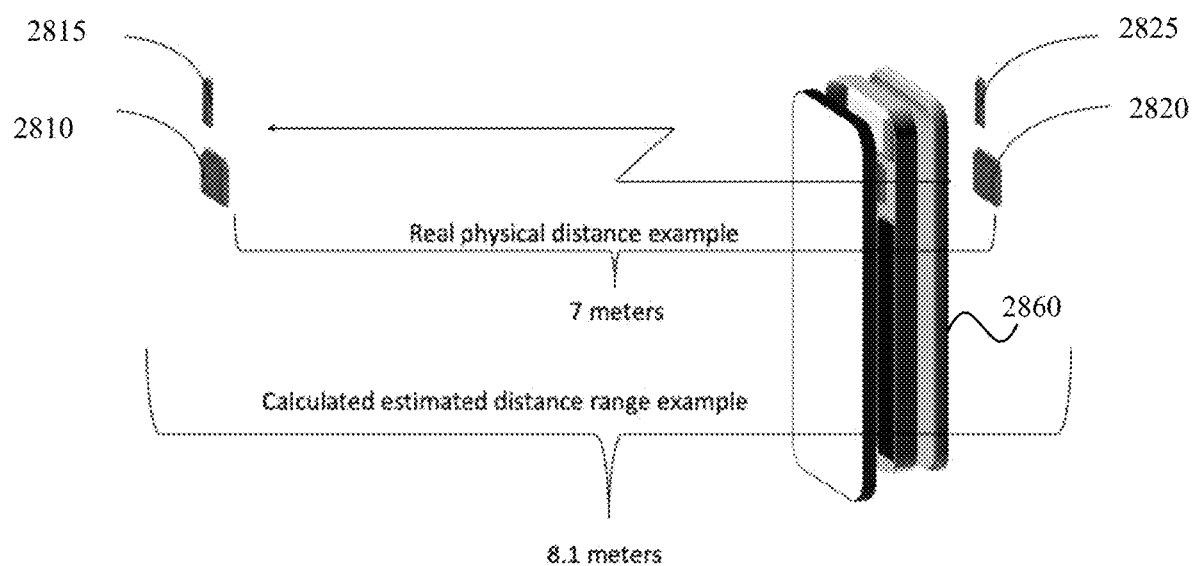

FIG. 28F shows a signal exchanged between the antennas 2815 and 2825. The signal 2828 propagates via screen 2830, circuitry 2840 and rear cover 2850. The delay in propagation caused by the combination of the screen 2830, circuitry 2840 and rear cover 2850 results in a distance estimation of 8.1 meters between the target device and the measuring device, while the actual distance between the target device and the measuring device is 7 meters. That is, the rear cover 2850 is responsible to an offset of 1.1 meters between the actual distance and the estimated distance.

Figure 29A:
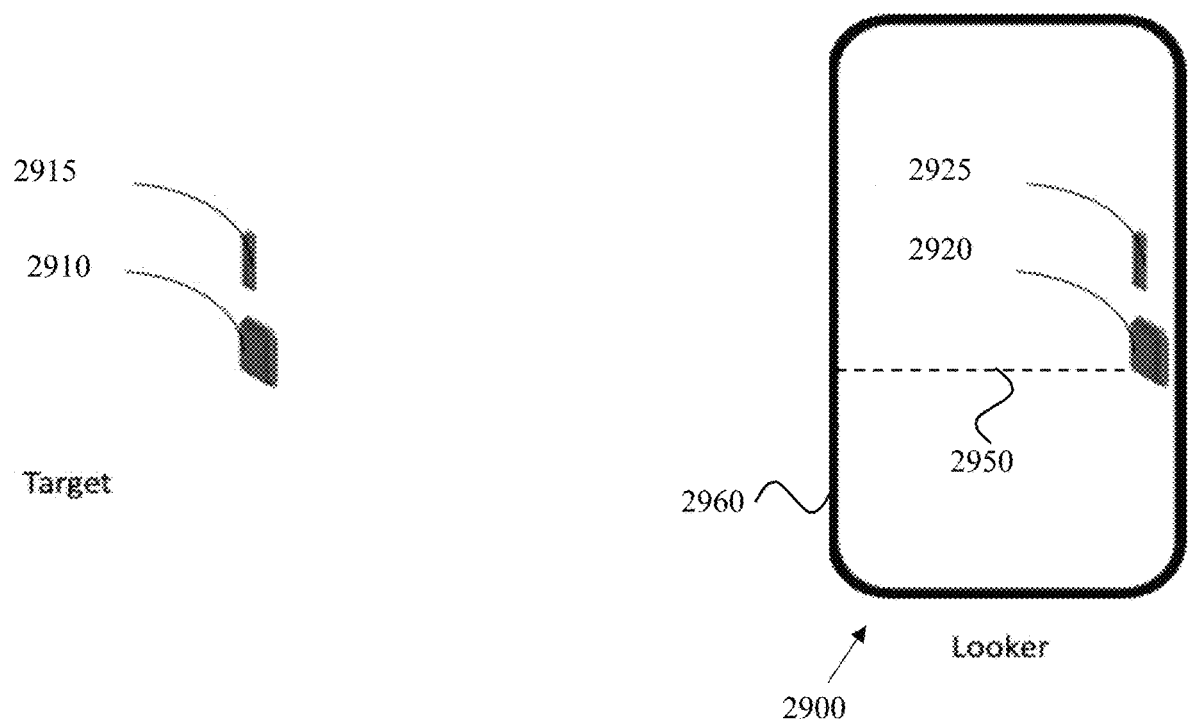
FIGS. 29A-29C show a target device held in various orientations relative to the measuring device, according to exemplary embodiments of the subject matter.
Figure 29B:
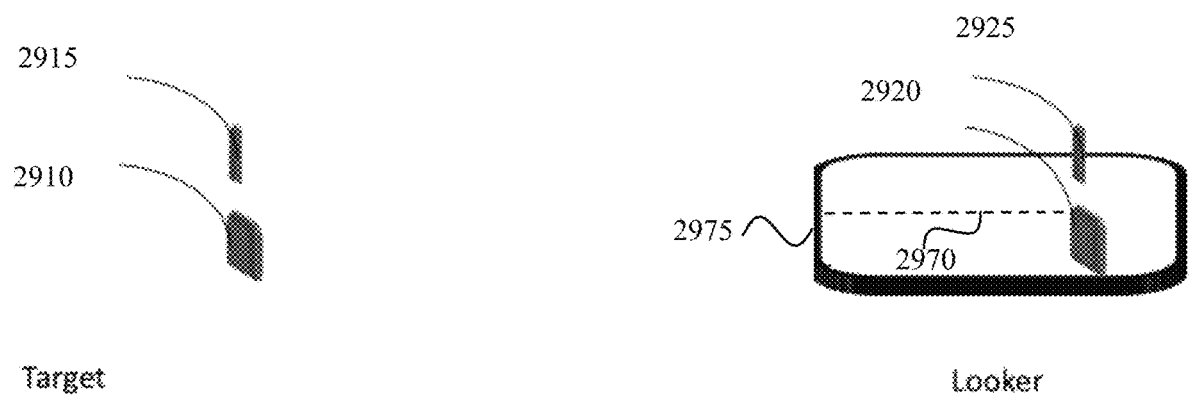
Figure 29C:
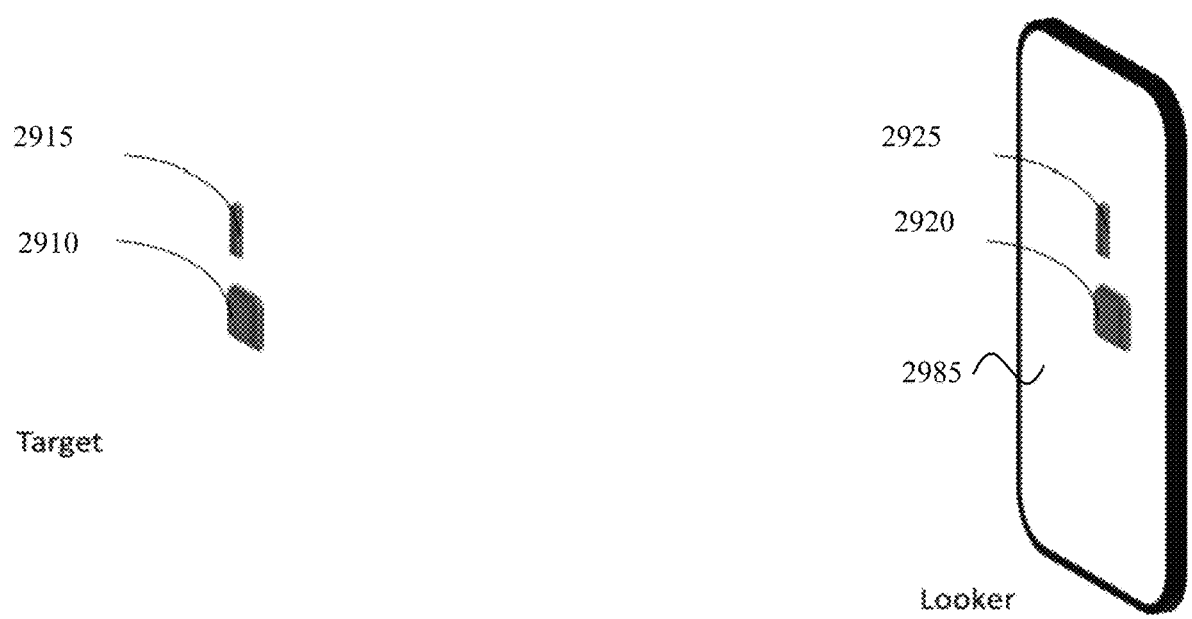

FIGS. 29A-29C show a target device held in various orientations relative to the measuring device, according to exemplary embodiments of the subject matter. The target device 2900 comprises target transceiver 2920 and target antenna 2925 and the measuring device comprises measuring transceiver 2910 and measuring antenna 2915. In FIG. 29A, the target device 2900 stands next to the measuring device. This way, the signal exchanged between the target device and the measuring device propagates via the width 2950 of the target device. The width 2950 is defined as the length between the target antenna 2925 and the lateral end 2960 of the target device 2900. In FIG. 29B, the target device 2900 stands in a "lying posture" relative to the measuring device, with the screen or rear cover facing the ground, while the base of the measuring device also faces the ground. This way, the signal exchanged between the target device and the measuring device propagates via the height 2970 of the target device. The height 2970 is defined as the length between the target antenna 2925 and the bottom end 2975 of the target device 2900.

In FIG. 29C, the target device 2900 stands when the screen faces the measuring device. This way, the signal exchanged between the target device and the measuring device propagates via the depth of the target device. The depth is defined as the length between the target antenna 2925 and the farthest edge of the target device 2900 defined as the most external point of the screen.

Figure 30A:
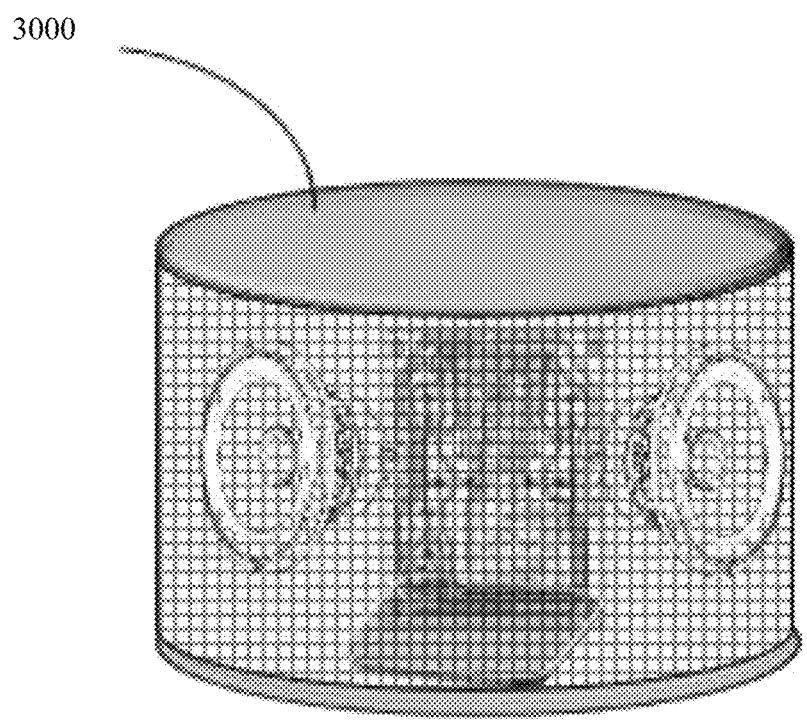
FIGS. 30A-30B show a speaker device, according to exemplary embodiments of the subject matter.
Figure 30B:
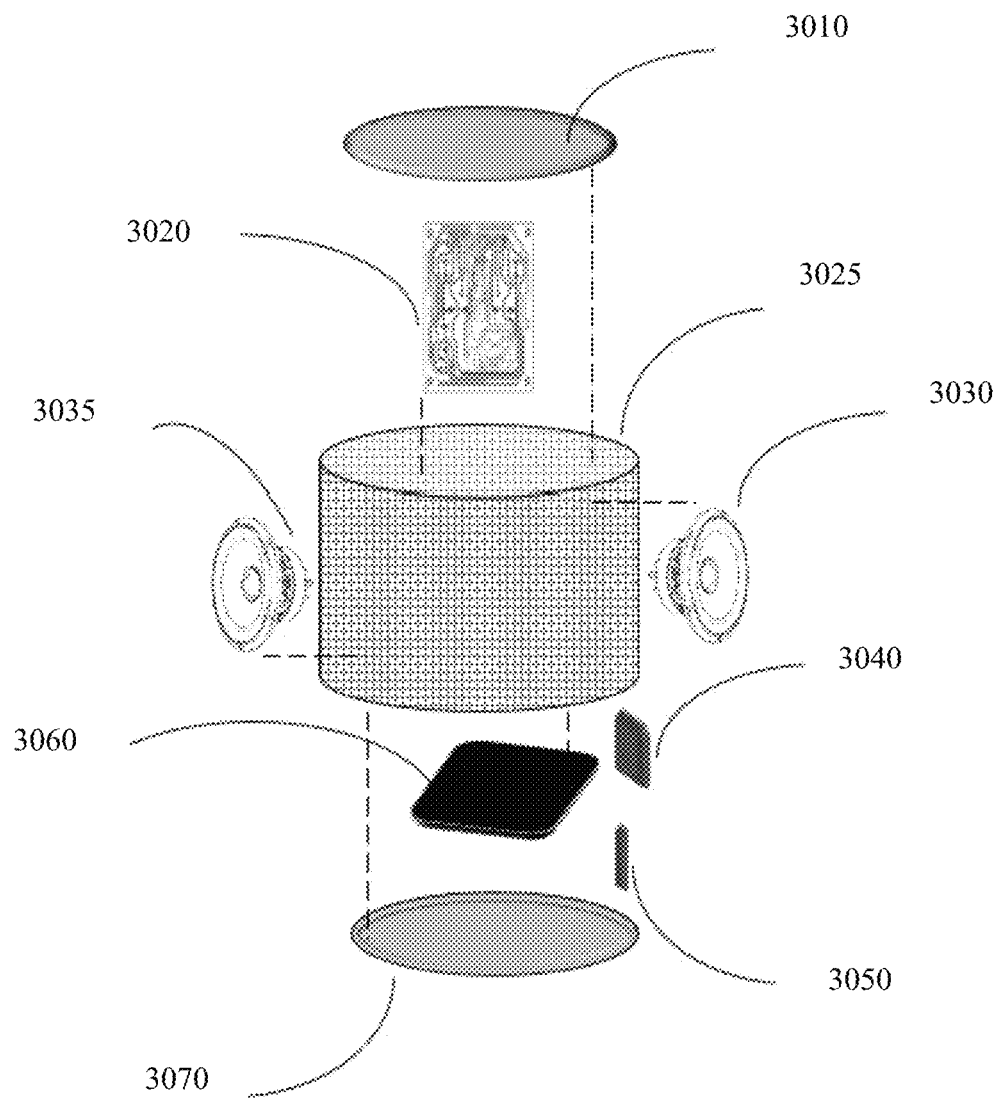

FIGS. 30A-30B show a speaker device, according to exemplary embodiments of the subject matter. The speaker device may function as either the target device or the measuring device. In FIG. 30A, the speaker device is assembled, having the speaker 3030 inside a housing. FIG. 30B shows an exploded view of the speaker device, with the device components. The speaker device components include a top cover 3010, electrical circuitry 3020, cover 3025, speaker 3030, magnets 3035, wireless transceiver 3040, antenna 3050, battery 3060 and a bottom cover 3070. The electrical circuitry 3020 may comprise a memory and a processor for implementing at least some of the processes of the subject matter.

Figure 31A:
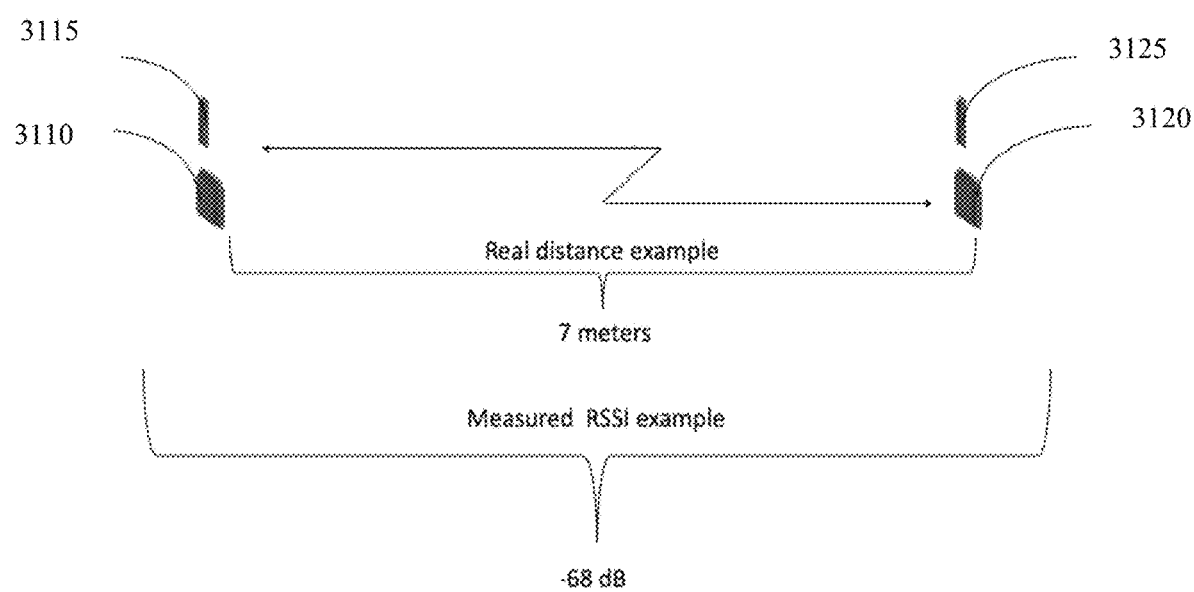
FIGS. 31A-31E show a change in a signal strength caused by propagation of the signal via an obstacle, according to exemplary embodiments of the subject matter.

FIGS. 31A-31E show a change in a signal strength caused by propagation of the signal via an obstacle, according to exemplary embodiments of the subject matter. The signal propagates from target device having comprises target transceiver 3120 and target antenna 3125 and the measuring device comprises measuring transceiver 3110 and measuring antenna 3115. FIG. 31A shows the signal propagating without any obstacle between target antenna 3125 and measuring antenna 3115. When there is no obstacle, the signal strength reduces in 68 dB in the seven (7) meters between the target antenna 3125 and measuring antenna 3115.

Figure 31B:
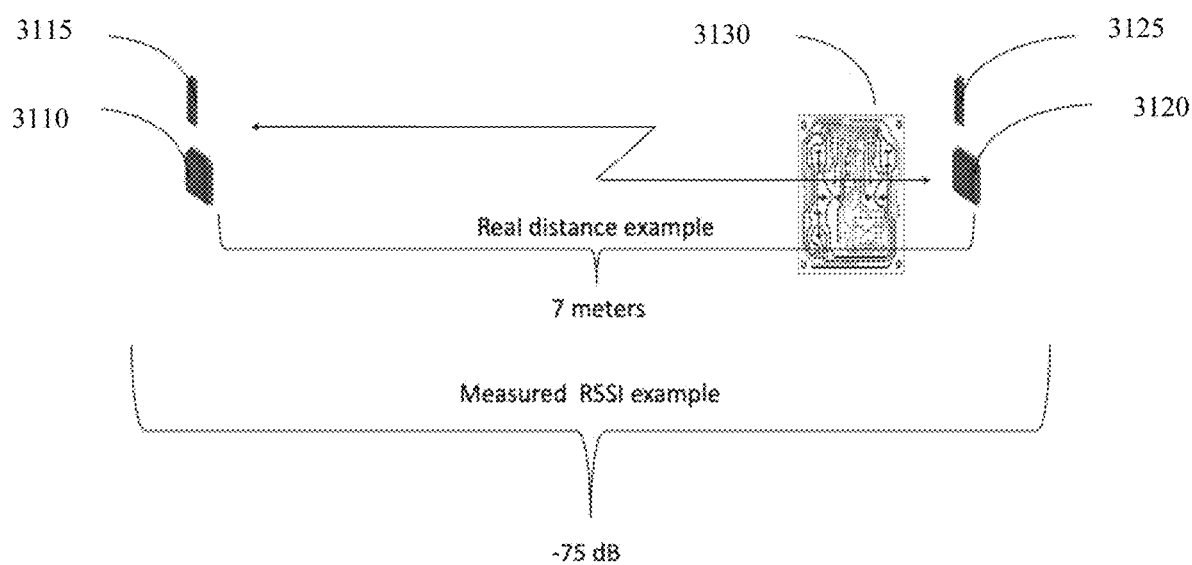

FIG. 31B shows the signal propagating between target antenna 3125 and measuring antenna 3115 via electrical circuitry 3130. When there is no obstacle, the signal strength reduces in 68 dB in the seven (7) meters between the target antenna 3125 and measuring antenna 3115. When the signal propagates via the electrical circuitry 3130, the signal strength reduces in 75 dB in the seven (7) meters between the target antenna 3125 and measuring antenna 3115. That is, the electrical circuitry 3130 is responsible to additional 7 dB in signal strength reduction.

Figure 31C:
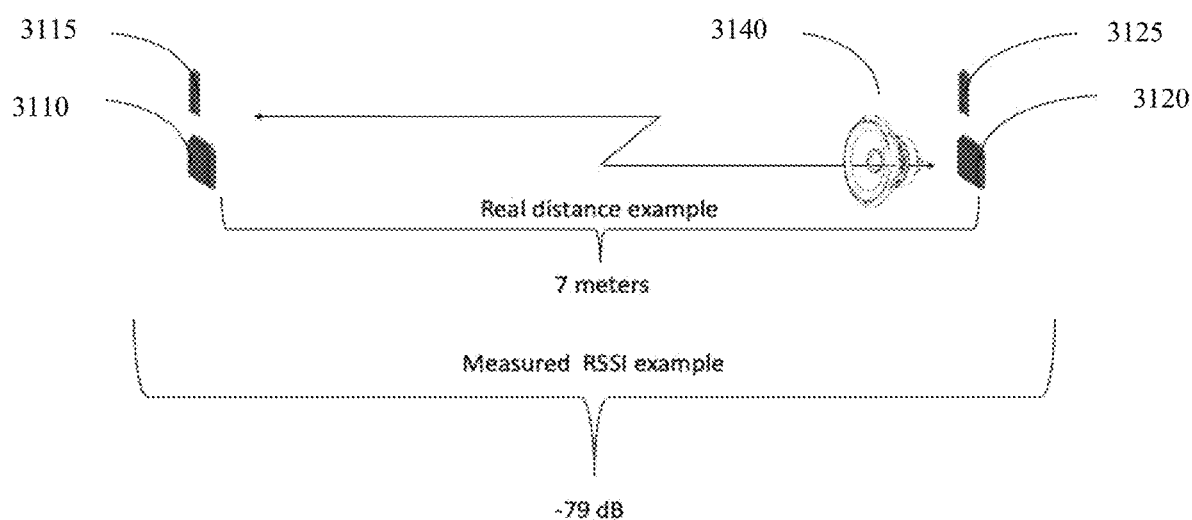

FIG. 31C shows the signal propagating between target antenna 3125 and measuring antenna 3115 via speaker 3140. When there is no obstacle, the signal strength reduces in 68 dB in the seven (7) meters between the target antenna 3125 and measuring antenna 3115. When the signal propagates via the speaker 3140, the signal strength reduces in 79 dB in the seven (7) meters between the target antenna 3125 and measuring antenna 3115. That is, the speaker 3140 is responsible to additional 11 dB in signal strength reduction.

Figure 31D:
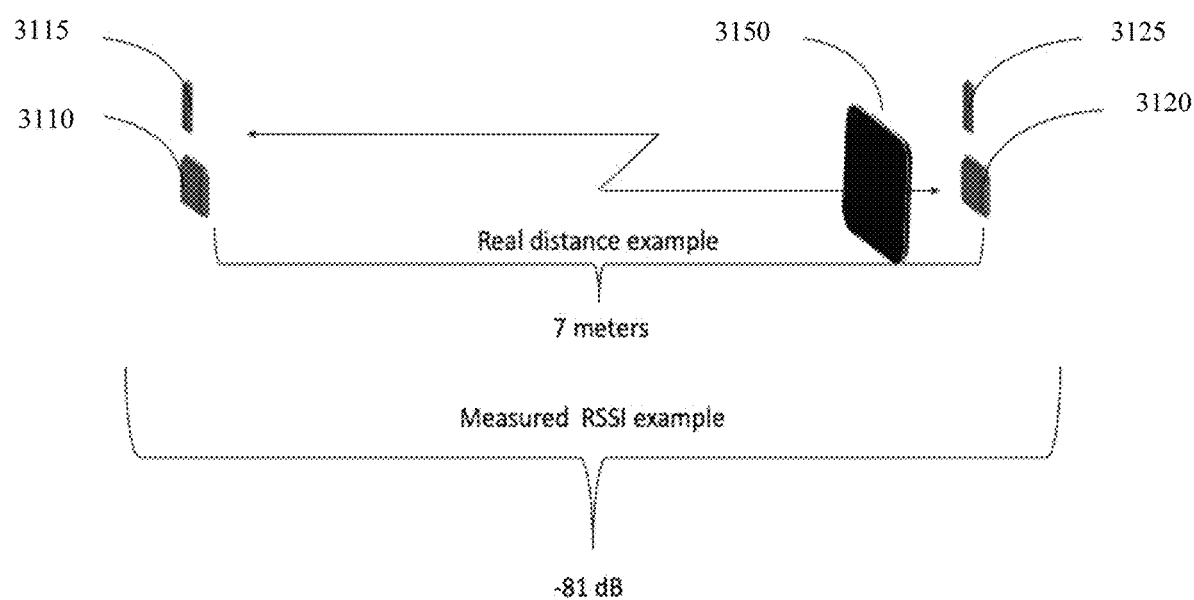

FIG. 31D shows the signal propagating between target antenna 3125 and measuring antenna 3115 via battery 3150. When there is no obstacle, the signal strength reduces in 68 dB in the seven (7) meters between the target antenna 3125 and measuring antenna 3115. When the signal propagates via the battery 3150, the signal strength reduces in 81 dB in the seven (7) meters between the target antenna 3125 and measuring antenna 3115. That is, the battery 3150 is responsible to additional 13 dB in signal strength reduction.

Figure 31E:
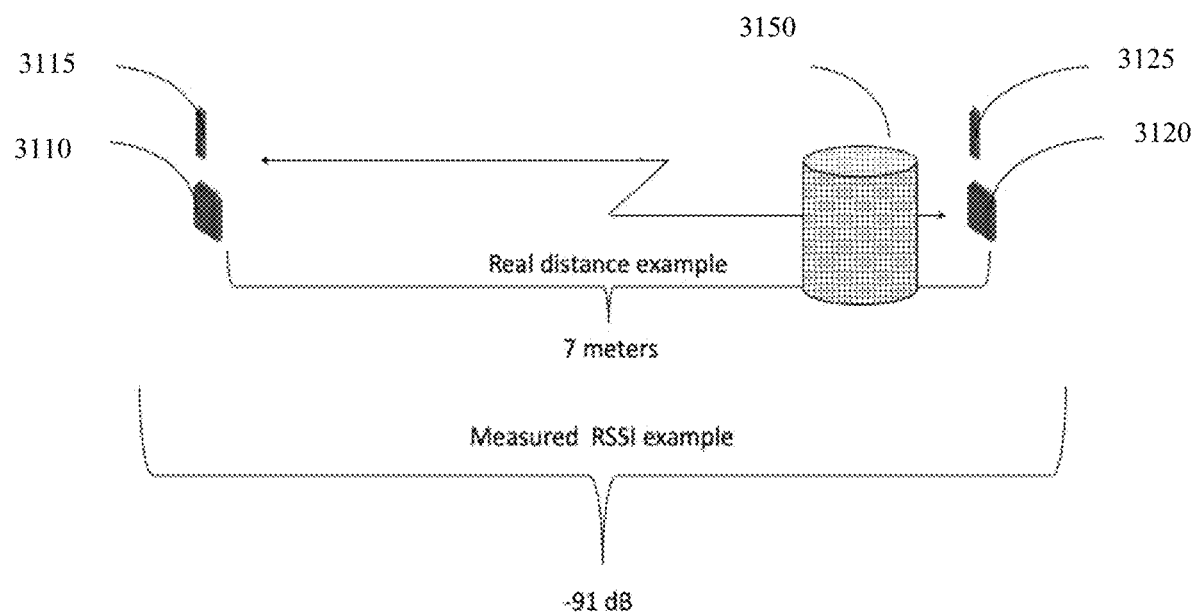

FIG. 31E shows the signal propagating between target antenna 3125 and measuring antenna 3115 via cover 3160. When there is no obstacle, the signal strength reduces in 68 dB in the seven (7) meters between the target antenna 3125 and measuring antenna 3115. When the signal propagates via the cover 3160, the signal strength reduces in 91 dB in the seven (7) meters between the target antenna 3125 and measuring antenna 3115. That is, the cover 3160 is responsible to additional 23 dB in signal strength reduction.

Figure 32A:
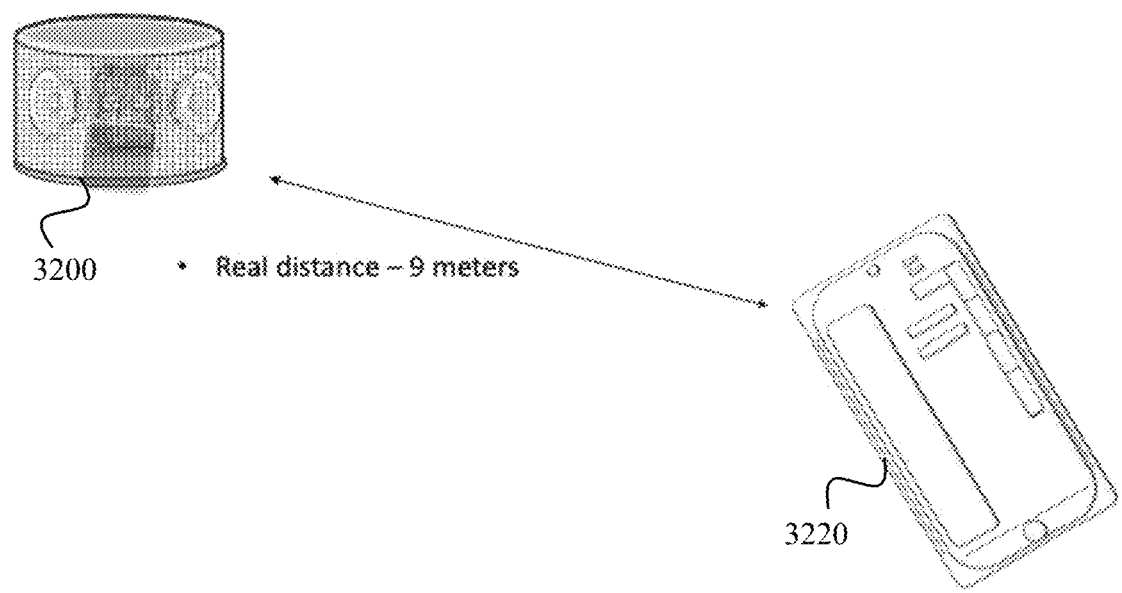
FIGS. 32A-32E show an illustration of a process for measuring distance between electronic devices, according to exemplary embodiments of the subject matter.

FIGS. 32A-32E show an illustration of a process for estimating distance between electronic devices, according to exemplary embodiments of the subject matter. FIG. 32A shows a target device 3200 and a measuring device 3220. At least one of the target device 3200 and a measuring device 3220 obtains, or has access to, data including a directional factor and relative directions between the devices 3210 and 3220. The relative directions may be in two dimensions or in three dimensions. The relative directions may include relative orientations between the devices. that is, the difference between the headings of both devices. For example, when one device is directed to the north the other device is directed to the south will have the same directional factor of a scenario in which in case the relative one device is directed to the west the other device is directed to the east.

Figure 32B:
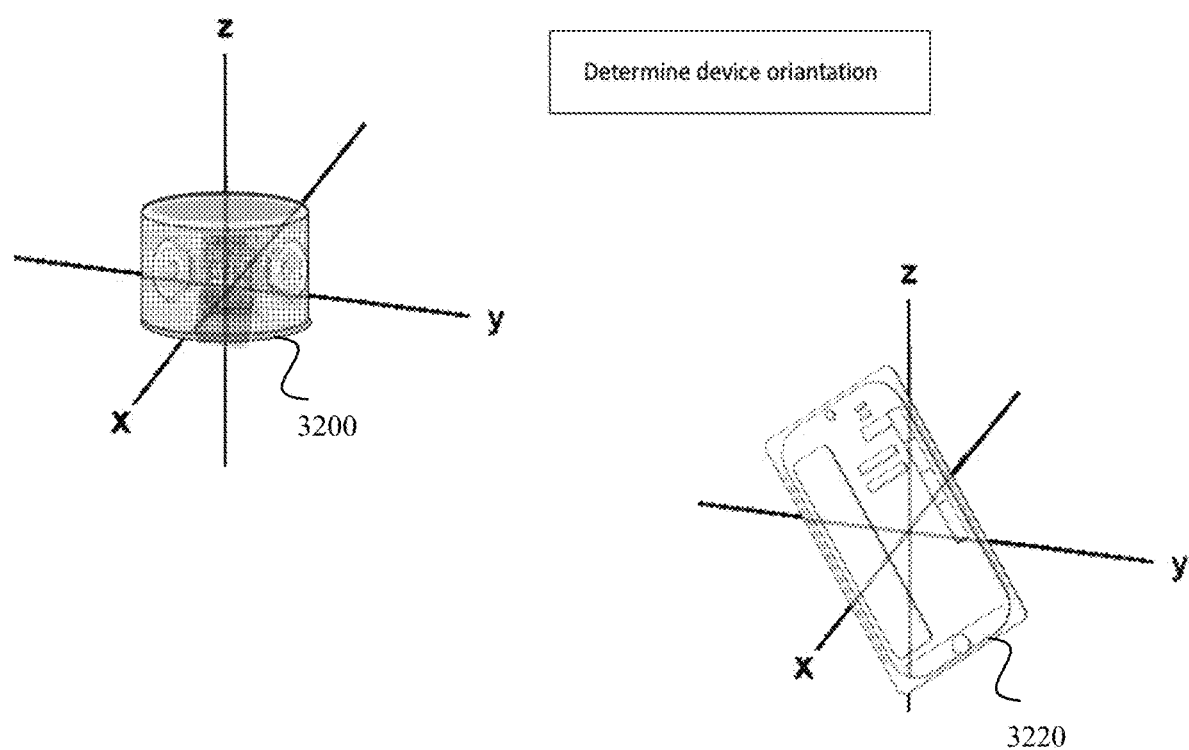

FIG. 32B shows the devices 3210 and 3220 estimating the difference in the orientation. The orientation may be two dimensions or in three dimensions. The orientation dictates which components of the devices 3210 and 3220 acts as an obstacle for the signal propagating between the antennas of the devices 3210 and 3220. For example, when the device 3210 faces the device 3220, the signal sent from the device 3210 will propagate via the screen of the device 3210, located on the front side of the device 3210.

Figure 32C:
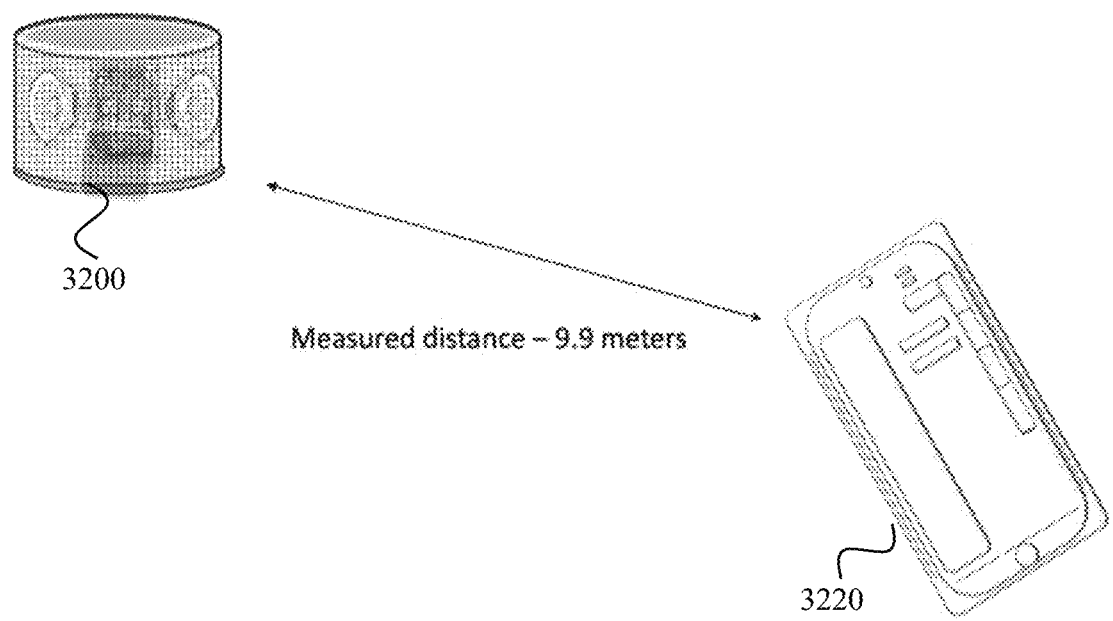

FIG. 32C shows the devices 3210 and 3220 estimating the distance between the devices. The estimation may be performed according to time of flight, according to reduction in the signal strength, and additional techniques desired by a person skilled in the art. The distance estimation process and the relative direction process may be performed simultaneously, in parallel, in sequence, in alternate sequence and the like. The distance estimation process may be performed before, after or during and the relative direction process.

Figure 32D:
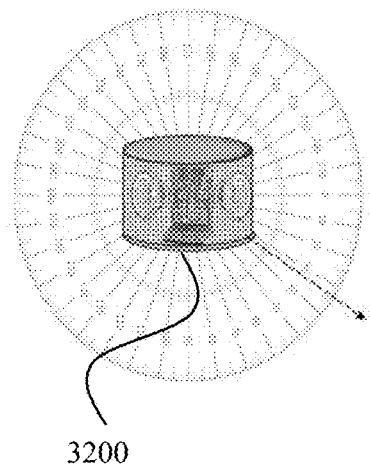
Figure 32D:
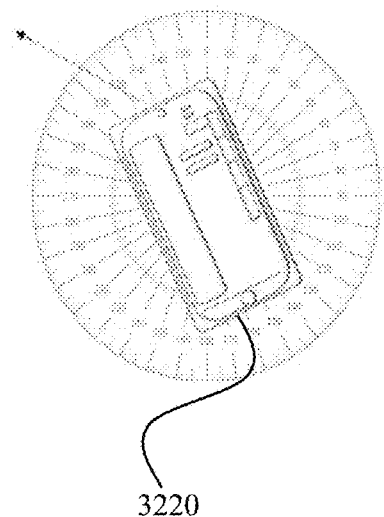

FIG. 32D shows the devices 3210 and 3220 estimating the relative direction between the devices. This process may be performed using a direction finding (DF) unit located in each device. The DF techniques can be categorized in groups—those which find the target's direction based on received signal amplitude, based on received signal phase, based on received signal timing etc.

The relative direction may be estimated or represented in a specific angle only relative to the target device and/or based on a specific distance ranging mean. The relative direction may be estimated or represented in a specific sector of angles only relative to the target device and/or based on a distance ranging mean.

The relative direction may be estimated or represented in all 360 degrees representing all relative directions relative to the target device and/or based on any distance ranging mean. The relative direction may be estimated or represented in two dimensional planes relative to the distance ranging mean. The relative direction may be estimated or represented in three dimensional planes relative to the distance ranging mean.

Figure 32E:
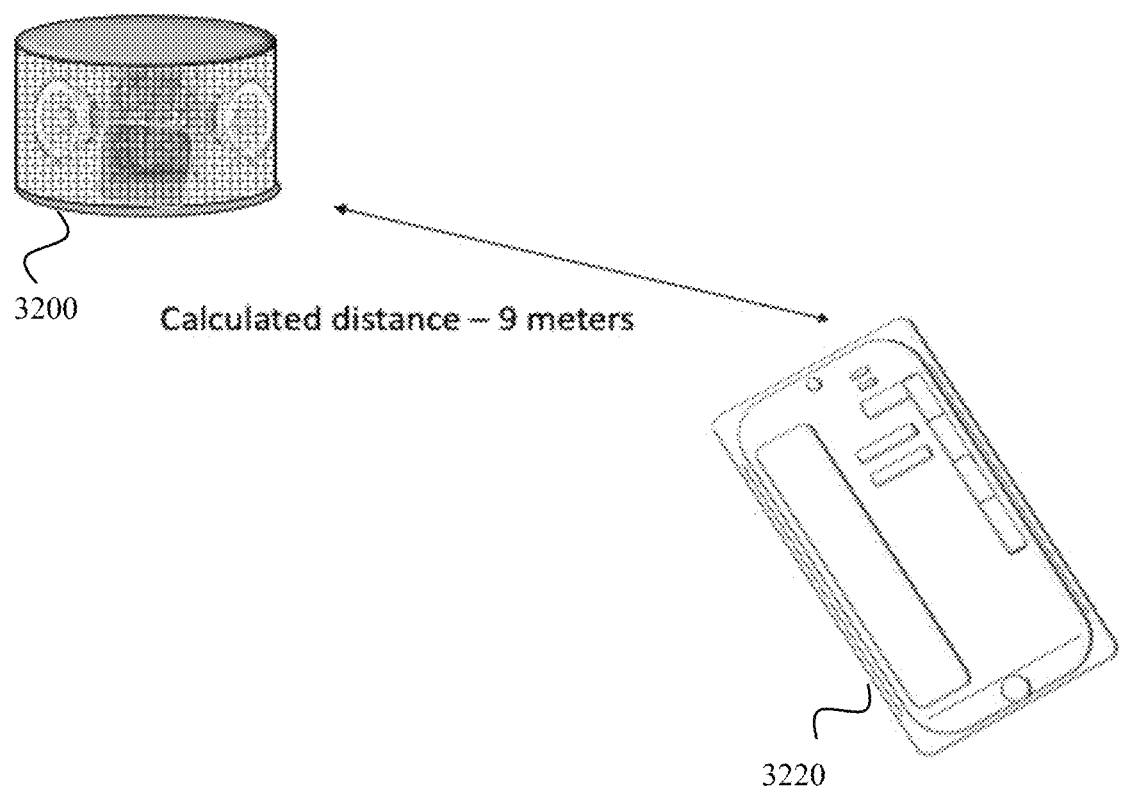

FIG. 32E shows the devices 3210 and 3220 estimating the distance between them using the distance estimated and the directional factor.

FIGS. 33A-33H show the delay caused when the signal propagates via electrical devices' components, according to exemplary embodiments of the subject matter.

Figure 33A:
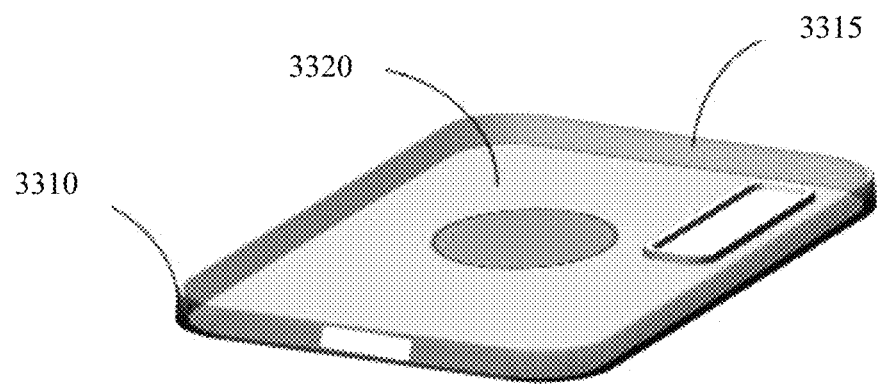
FIGS. 33A-33H show the delay caused when the signal propagates via electrical devices' components, according to exemplary embodiments of the subject matter.

FIG. 33A shows an exemplary cover of an electronic device. The cover may comprise elements such as a metal member 3310, magnets or electronic circuitries 3320 and plastic covers 3315. Each of the plastics, metals and circuitries may have different attenuation properties.

Figure 33B:
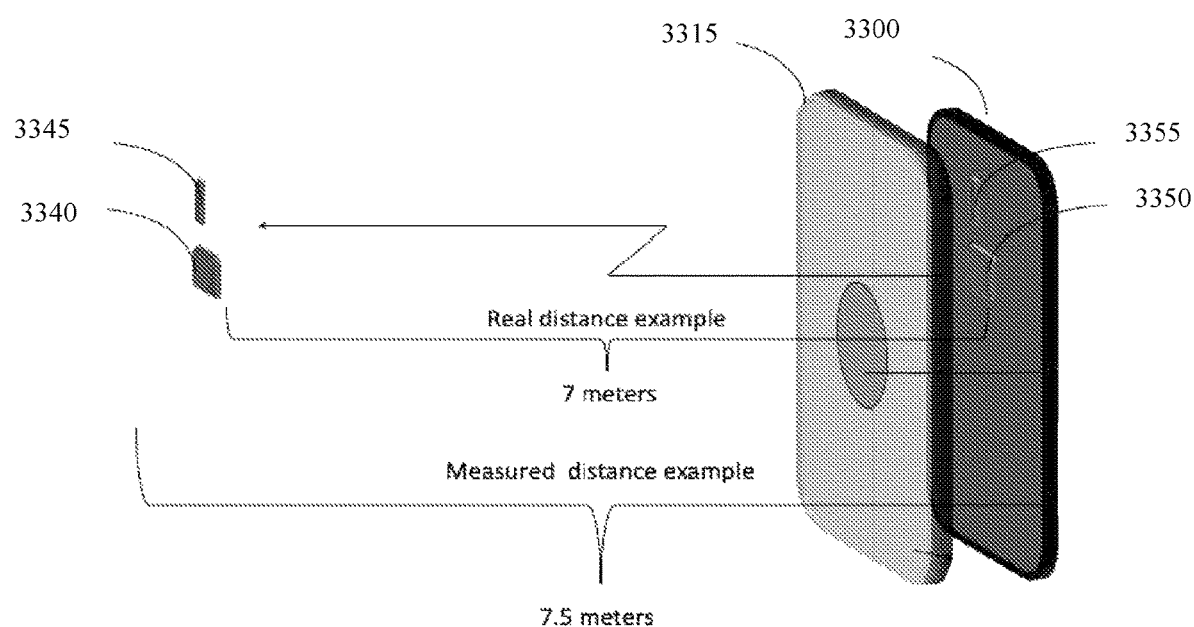

FIG. 33B shows a signal sent from a measuring device transceiver 3340 via a measuring device antenna 3345 to a target transceiver 3350 via target antenna 3355 located inside target device 3300. The actual distance between the antennas 3345 and 3355 is seven (7) meters. The signal propagates between the antennas via device cover 3315 which covers the target device 3300. A delay caused by the device cover 3315 results in distance estimation of 7.5 meters between the antennas 3345 and 3355. Hence, the delaying effect of the device cover 3315 is 0.5 meters.

Figure 33C:
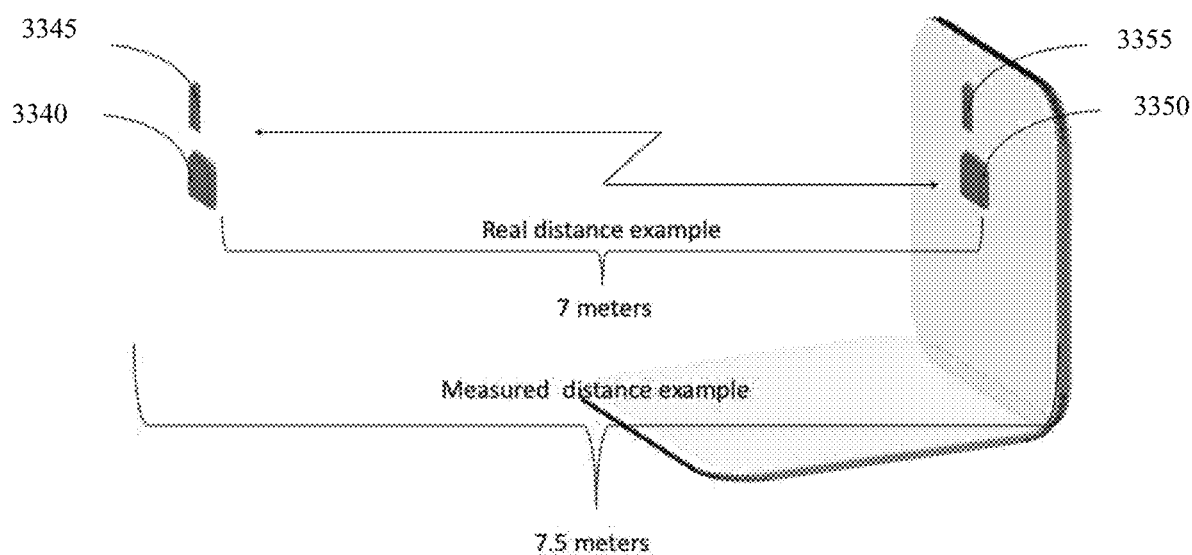

FIG. 33C shows a signal sent from a measuring device transceiver 3340 via a measuring device antenna 3345 to a target transceiver 3350 via folded target device 3300 in an open configuration. The actual distance between the antennas 3345 and 3355 is seven (7) meters. The signal propagates between the antennas via a portion of the target device 3300. A delay caused by the target device 3300 results in distance estimation of 7.5 meters between the antennas 3345 and 3355. Hence, the delaying effect of the device cover 3315 is 0.5 meters.

Figure 33D:
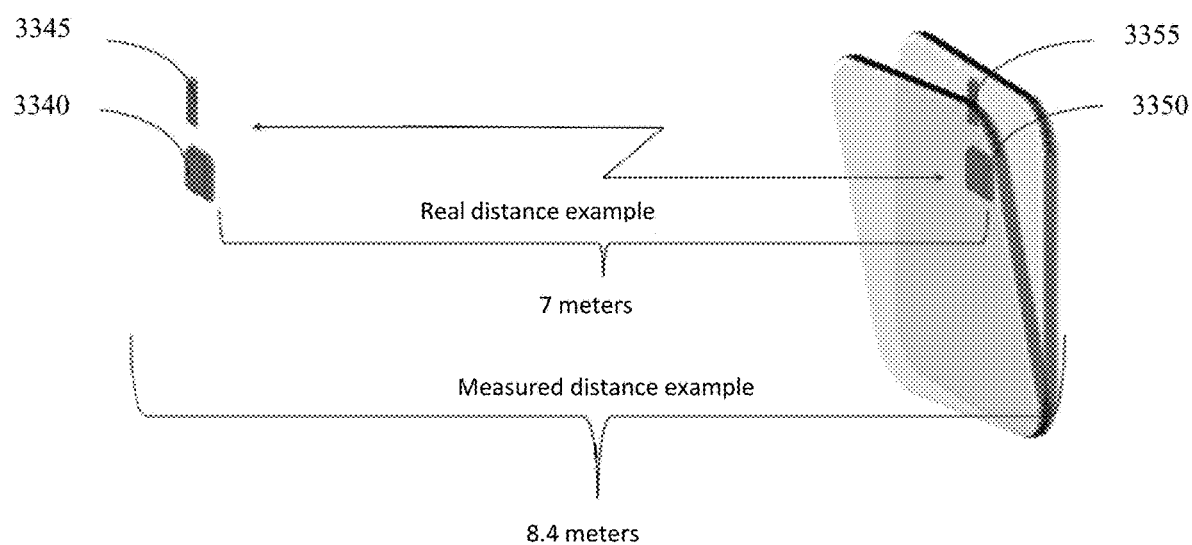

FIG. 33D shows a signal sent from a measuring device transceiver 3340 via a measuring device antenna 3345 to a target transceiver 3350 via folded target device 3300 in a closed configuration. The actual distance between the antennas 3345 and 3355 is seven (7) meters. The signal propagates between the antennas via a portion of the target device 3300. A delay caused by the target device 3300 results in distance estimation of 8.4 meters between the antennas 3345 and 3355. Hence, the delaying effect of the device cover 3315 is 1.4 meters.

Figure 33E:
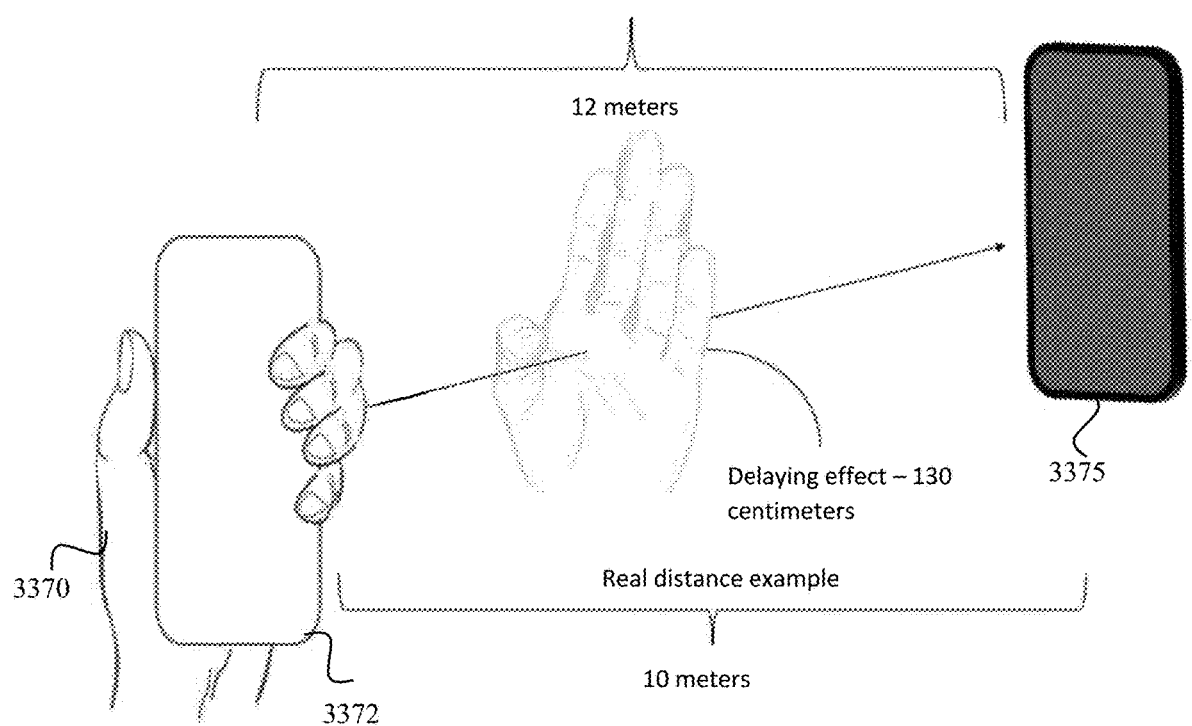

FIG. 33E shows a signal sent from a measuring device 3372 to a target device 3375. The measuring device is held by a user's palm 3370. The actual distance between the antennas of the measuring device 3372 and the target device 3375 is ten (10) meters. The signal propagates between the antennas via components of both the measuring device 3372 and the target device 3375. A delay caused by the measuring device 3372 is equivalent to a directional factor of 0.7 meters and the delay caused by the target device 3375 is equivalent to a directional factor of 1.3 meters. Hence, the estimated distance is 12 meters, a total offset of 2 meters.

Figure 33F:
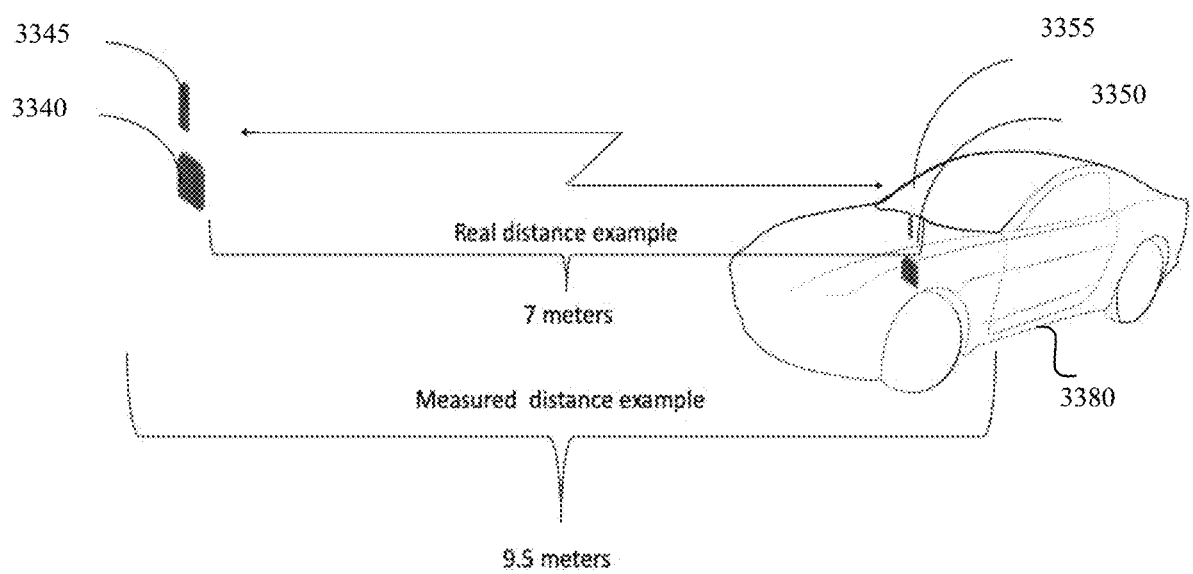

FIG. 33F shows a signal sent from a measuring device transceiver 3340 via a measuring device antenna 3345 to a target transceiver 3350 via vehicle 3380. The actual distance between the antennas 3345 and 3355 is seven (7) meters. The signal propagates between the antennas via a portion of the vehicle 3380. A delay caused by the vehicle 3380 results in distance estimation of 9.5 meters between the antennas 3345 and 3355. Hence, the delaying effect of the device cover 3315 is 2.5 meters.

Figure 33G:
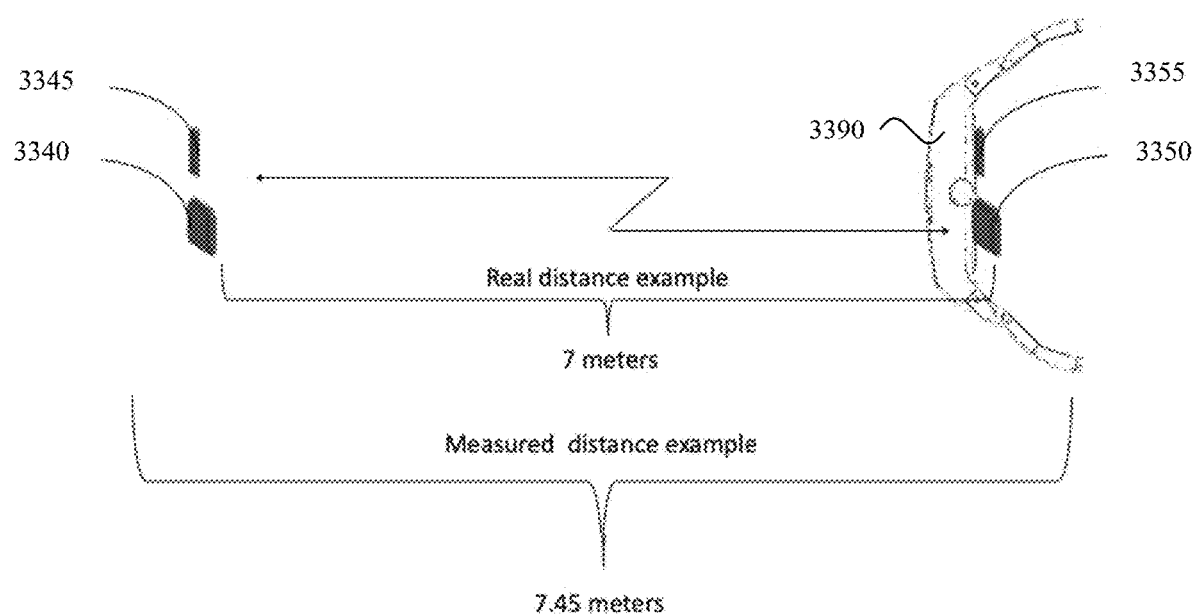

FIG. 33G shows a signal sent from a measuring device transceiver 3340 via a measuring device antenna 3345 to a target transceiver 3350 via wrist watch 3390. The actual distance between the antennas 3345 and 3355 is seven (7) meters. The signal propagates between the antennas via a portion of the wrist watch 3390. A delay caused by the wrist watch 3390 results in distance estimation of 7.45 meters between the antennas 3345 and 3355. Hence, the delaying effect of the wrist watch 3390 is 0.45 meters.

Figure 33H:
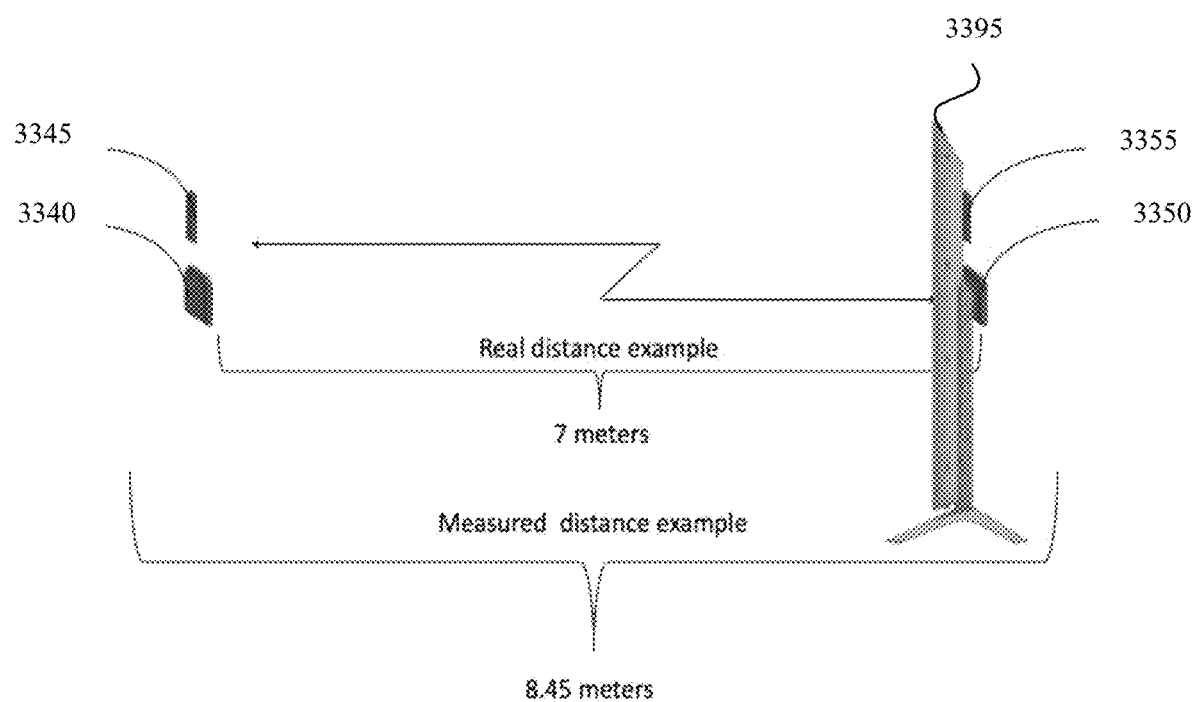

FIG. 33H shows a signal sent from a measuring device transceiver 3340 via a measuring device antenna 3345 to a target transceiver 3350 via display device 3395, such as a television or a personal computer's screen. The actual distance between the antennas 3345 and 3355 is seven (7) meters. The signal propagates between the antennas via a portion of the display device 3395. A delay caused by the display device 3395 results in distance estimation of 8.45 meters between the antennas 3345 and 3355. Hence, the delaying effect of the display device 3395 is 1.45 meters.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method, comprising:
   obtaining a set of directional factors between a measuring device to a target device, each of the set of directional factors defines an offset in a distance computation caused by a relative direction between the target device and the measuring device;
   wherein the set of directional factors is provided in multiple directions between the target device and the measuring device;
   computing a distance measurement between the target device and the measuring device;
   computing a relative direction between the measuring device and the target device;
   extracting a directional factor associated with the relative direction from the set of directional factors;
   computing the distance between the target device and a measuring device based on the distance measurement and the extracted directional factor.

2. The method of claim 1, further comprising sending the estimated distance from the measuring device to the target device.

3. The method of claim 1, wherein the Directional Factor is computed according to a Time of Flight (TOF) delay of signals exchanged between the measuring device and the target device.

4. The method of claim 1, wherein the Directional Factor is computed according to signal strength attenuation of signals exchanged between the measuring device and the target device.

5. The method of claim 4, wherein the signal strength attenuation comprises at least the directional factor and attenuation caused by the distance between the measuring device to the target device.

6. The method of claim 1, further comprising storing the set of directional factors in the measuring device.

7. The method of claim 1, wherein the relative direction is between a heading of the measuring device and a heading of the target device.

8. The method of claim 1, wherein the directional factor is computed according to components of the measuring device and the target device located between a first antenna located in the measuring device and a second antenna located in the target device.

9. The method of claim 1, wherein the directional factor is caused by components of the measuring device and the target device located between a first antenna located in the measuring device and a second antenna located in the target device.

10. The method of claim 1, further comprising sensing an area surrounded by a user's body and determining whether the user's body is located between the measuring device and the target device.

11. The method of claim 1, wherein retrieving the directional factor from a table associating directional factors and relative directions from the measuring device to the target device.

* * * * *